United States Patent
Yoshinaga et al.

(10) Patent No.: US 7,151,354 B2
(45) Date of Patent: Dec. 19, 2006

(54) MAGNETIC NOISE REDUCTION METHOD FOR AC ROTARY ELECTRIC MACHINE, AND MOTOR CONTROL APPARATUS AND AC ROTARY ELECTRIC MACHINE APPARATUS USING THE SAME

(75) Inventors: Soichi Yoshinaga, Nagoya (JP); Kenichi Wakabayashi, Kariya (JP); Takatoshi Takai, Anjyo (JP); Tatsuru Morioka, Okazaki (JP); Hiroya Tsuji, Yokkaichi (JP); Makoto Okamura, Nisshin (JP); Shinobu Yamakawa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/868,095

(22) Filed: Jun. 16, 2004

(65) Prior Publication Data

US 2005/0073280 A1 Apr. 7, 2005

Related U.S. Application Data

(63) Continuation of application No. PCT/JP03/13303, filed on Oct. 17, 2003.

(30) Foreign Application Priority Data

| Oct. 17, 2002 | (JP) | ............................. 2002-303650 |
| Oct. 17, 2002 | (JP) | ............................. 2002-303651 |
| Sep. 16, 2003 | (JP) | ............................. 2003-323779 |
| Sep. 16, 2003 | (JP) | ............................. 2003-323782 |

(51) Int. Cl.
*G05B 5/01* (2006.01)

(52) U.S. Cl. ....................... 318/611; 318/375; 318/376; 318/599; 318/611; 318/629; 318/632; 318/801; 318/805; 318/806; 318/807; 318/811

(58) Field of Classification Search ................ 318/375, 318/376, 599, 611, 629, 632, 801, 805, 806, 318/807, 811

See application file for complete search history.

(56) References Cited

U.S. PATENT DOCUMENTS 5,038,092 A * 8/1991 Asano et al. ................ 318/811

(Continued)

FOREIGN PATENT DOCUMENTS

EP 1 087 517 A1 3/2001

(Continued)

*Primary Examiner*—Lincoln Donovan
*Assistant Examiner*—Erick Glass
(74) *Attorney, Agent, or Firm*—Oliff & Berridge, PLC

(57) ABSTRACT

The invention provides techniques for reducing or altering the magnetic noise of an AC rotary electric machine. A magnetic noise reducing harmonic current of order n, whose frequency is n times the frequency of the fundamental frequency component of a polyphase AC current fed to an armature of a polyphase AC rotary electric machine, is superimposed on the polyphase AC current, thereby reducing or altering a harmonic component having a frequency (n−1) times the frequency of the fundamental frequency component and occurring due to a radial magnetic excitation force acting radially on an iron core of the AC rotary electric machine. Magnetic noise is caused by a vibration whose energy is the sum of the circumferential and radial vibrations of the iron core occurring due to the magnetomotive force of the rotor, and altering the radial vibration is particularly effective in altering the magnetic noise; as the harmonic component of the radially acting magnetic excitation force, occurring due to harmonic components having frequencies 3, 5, 7, and 13 times the fundamental frequency, has a frequency 6 or 12 times the fundamental frequency, the magnetomotive force of the rotor can be effectively reduced or altered when a current having a frequency 7 or 13 times the fundamental frequency is superimposed on the stator current.

40 Claims, 24 Drawing Sheets

U.S. PATENT DOCUMENTS

| | | | |
|---|---|---|---|
| 5,481,166 A * | 1/1996 | Moreira | 318/254 |
| 5,565,752 A * | 10/1996 | Jansen et al. | 318/807 |
| 5,585,709 A * | 12/1996 | Jansen et al. | 318/807 |
| 5,691,590 A | 11/1997 | Kawai et al. | |
| 5,886,493 A | 3/1999 | Ueda et al. | |
| 6,043,624 A * | 3/2000 | Masaki et al. | 318/723 |
| 6,259,226 B1 * | 7/2001 | Kaitani et al. | 318/798 |
| 6,404,152 B1 | 6/2002 | Kobayashi et al. | |
| 2002/0117579 A1 | 8/2002 | Kotoulas et al. | |
| 2005/0029982 A1 * | 2/2005 | Stancu et al. | 318/801 |

FOREIGN PATENT DOCUMENTS

| | | |
|---|---|---|
| EP | 1 211 798 A2 | 6/2002 |
| JP | A 59-41187 | 3/1984 |
| JP | A 4-200294 | 7/1992 |
| JP | A 5-176584 | 7/1993 |
| JP | A-6-315259 | 11/1994 |
| JP | B2 7-89753 | 9/1995 |
| JP | A 11-55986 | 2/1999 |
| JP | B2 2928594 | 5/1999 |
| JP | A 11-341864 | 12/1999 |
| JP | A 2003-174794 | 6/2003 |

\* cited by examiner

Fmag: ROTOR MAGNETOMOTIVE FORCE
Fcoil: STATOR MAGNETOMOTIVE FORCE
Icoil: STATOR CURRENT
x: GAP DISTANCE
S: OPPOSING AREA SIZE OF GAP
$\mu 0$: PERMEABILITY OF AIR

MAGNETIC NOISE REDUCTION METHOD FOR AC ROTARY ELECTRIC MACHINE, AND MOTOR CONTROL APPARATUS AND AC ROTARY ELECTRIC MACHINE APPARATUS USING THE SAME

CROSS REFERENCE TO RELATED APPLICATION

This application is based upon and claims the benefit of priority from the prior Japanese Patent Application No. 2002-303650, filed on Oct. 17, 2002, the prior Japanese Patent Application No. 2002-303651, filed on Oct. 17, 2002, the prior Japanese Patent Application No. 2003-323779, filed on Sep. 16, 2003, and the prior Japanese Patent Application No. 2003-323782, filed on Sep. 16, 2003, the entire contents of which are incorporated herein by reference, and a continuation of PCT/JP03/13303 filed as Oct. 17, 2003.

TECHNICAL FIELD

The present invention relates to a magnetic noise reduction method for an AC rotary electric machine, and to a motor control apparatus and AC rotary electric machine apparatus using the same.

BACKGROUND ART

Electric vehicles, hybrid vehicles, fuel-cell vehicles, etc. are currently in the development or in the practical implementation stage. These vehicles employ high-output AC rotary electric machines as primary means for generating vehicle driving power, but such high-output AC rotary electric machines have had the problem that their magnetic noise (magnetic sound) is large. Furthermore, quiet AC motors are needed in various applications, and a variety of techniques have been proposed for reduction of magnetic noise of AC rotary electric machines. For example, Japanese Patent No. 2928594 proposes that voltage components that cancel out the harmonics contained in the induced voltage of an electric motor be superimposed on the output voltage of an inverter, thereby bringing the waveform of the electric current to the motor closer to a sinusoidal wave and thus achieving a reduction in torque pulsation and its associated noise.

On the other hand, Japanese Unexamined Patent Publication No. 11-55986, for example, proposes to reduce the torque pulsation of an electric motor by deliberately superimposing a harmonic component (hereinafter sometimes referred to as the harmonic current) on the fundamental frequency component of the electric current fed to the motor.

Further, Japanese Unexamined Patent Publication No. H04-200294 and Japanese Examined Patent Publication No. H07-89753 disclose that the carrier frequency of a PWM control inverter is altered in a prescribed pattern to alter the electromagnetic sound of a motor.

DISCLOSURE OF THE INVENTION

However, the above prior art magnetic noise reduction techniques of the harmonic superimposing type, despite its name, have fallen far short of being able to reduce the noise of AC rotary electric machines to a satisfactory level. The reasons for this will be described below.

As noise is generated due to mechanical vibrations of a vibrating member (in this case, the iron core of the AC rotary electric machine), if some kind of vibrating means is added and vibration energy equal in frequency and amplitude but opposite in phase to the vibration energy of the frequency to be attenuated is applied, it should be possible to cancel out the vibrations of the vibrating member at that frequency. Further, the notion itself that the magnetic noise can be reduced by adding a certain harmonic component to the fundamental frequency component of the armature current has been presented in various ways in the prior art as described above.

However, the above prior art documents do not provide concrete descriptions about the numerical relations between the acoustic energy (vibration energy) to be reduced and the electric current (or power) to be supplied, that is, the parameters defining the frequency, phase, and amplitude (magnitude) of the electric current or power that should be applied to the armature coil of the AC rotary electric machine in order to reduce the magnetic noise (acoustic energy) at a designated frequency, and it is therefore not known what electric current should be applied to reduce the magnetic noise of a particular frequency; as a result, its practical implementation has been difficult. Furthermore, the relationship between the magnetic noise and the electric current (or power) applied to suppress it should vary in various ways depending on the structure and the use conditions of the AC rotary electric machine and, while the magnetic noise reduction techniques of the harmonic superimposing type described above are known as a concept, none of them have been practically implemented as yet.

On the other hand, Japanese Unexamined Patent Publication No. H04-200294 and Japanese Examined Patent Publication No. H07-89753 propose that the frequency of the electromagnetic sound of a motor be altered by altering the frequency of the PWM carrier signal of the motor, but since there is a limit to the range over which the frequency of the PWM carrier signal can be altered, there has been the problem that it is not easy to obtain a sound of the intended frequency.

In view of the above problems, it is an object of the present invention to provide a magnetic noise reduction method for an AC rotary electric machine that can reduce the magnetic noise of various kinds of AC rotary electric machines in a simple and reliable manner, and a motor control apparatus using the same.

It is another object of the present invention to provide an AC rotary electric machine apparatus that can alter the electromagnetic sound of various kinds of AC rotary electric machines as desired.

A magnetic noise reduction method for an AC rotary electric machine according to claim 1 is characterized in that a radial vibration reducing harmonic current, whose frequency is n times (n is a natural number) the frequency of the fundamental frequency component of a polyphase AC current fed to an armature of a polyphase AC rotary electric machine, is superimposed on the polyphase AC current, thereby attenuating an (n−1)th harmonic component, having a frequency (n−1) times the frequency of the fundamental frequency component, that is contained in a radial vibration occurring radially about an axial center of a rotating shaft of the AC rotary electric machine due to an excitation force generated by the AC rotary electric machine or externally applied to the AC rotary electric machine. This has made it possible, for the first time, to effectively reduce the magnetic noise of AC rotary electric machines of various sizes and in any output condition. In open-loop control, the phase and amplitude of the radial vibration reducing harmonic current may be set as predetermined values, or the value of the radial vibration reducing harmonic current detected in feedback control may be set as a predetermined value. However, these predetermined values can be changed according to the operating condition, based on a prestored map defining correspondences between the amplitude of the fundamental current and the number of revolutions and the phase and amplitude.

A further detailed description will be given below.

Magnetic noise is caused by a vibration (also known as magnetic vibration) induced by the magnetic force (magnetic excitation force) of the iron core of the AC rotary electric machine, and this magnetic vibration is the sum of circumferential and radial vibrations.

The circumferential vibration of the iron core causes torque ripple but, as the iron core of the stator or the iron core of the rotor is substantially cylindrical or columnar in shape, if the iron core periodically vibrates in the circumferential direction, the noise caused by the vibration of the air surrounding the vibrating iron core is small. On the other hand, the radial vibration of the iron core causes the outer or inner circumferential surface of the iron core of the stator or rotor to vibrate in the radial direction; here, since the outer or inner circumferential surface directly contacts the air, the radial vibration of the iron core of the stator or rotor causes the outer or inner circumferential surface to vibrate in the radial direction, which causes a large amount of noise.

That is, the torque pulsation is reduced by reducing the circumferential component of the magnetic excitation force, and the magnetic noise is reduced by reducing the radial component of the magnetic excitation force.

In the present invention, in order to reduce a given order harmonic component of the radial component of the magnetic excitation force (also called the radially acting magnetic excitation force) induced by the rotor magnetomotive force and the stator current (fundamental frequency component), usually a radial vibration reducing harmonic current whose order is higher by one than that given order is superimposed on the stator current (polyphase AC current) thereby applying a magnetic excitation force of that given order that has a phase and amplitude such that the amplitude of its vector sum with the harmonic component becomes smaller. It has been found that this can effectively reduce the magnetic noise. It will be noted here that, by superimposing the above-described radial vibration reducing harmonic current, not only can the radial component of the magnetic excitation force induced by the rotor magnetomotive force and the stator current (fundamental frequency component) be reduced, but also other radiation vibrations of the AC rotary electric machine, such as an externally applied radial vibration, can likewise be reduced.

That is, according to the present invention, the radial vibration reducing harmonic current, whose frequency is n times the fundamental frequency, is superimposed on the energizing current supplied for generating torque. It has been found that this can reduce the harmonic component of the radial vibration that has a frequency (n−1) times the fundamental frequency of the energizing current. The reason why this can be accomplished will be described later.

In a preferred mode (claim 2), a radial vibration reducing harmonic current, whose frequency is 6k+1 times (k is a natural number) the frequency of the fundamental frequency component of a stator current of a three-phase AC rotary electric machine as the AC rotary electric machine, is superimposed on the stator current, thereby reducing the radial vibration of the AC rotary electric machine that has a frequency 6k times the frequency of the fundamental frequency component, as compared to the case where the superimposition is not performed. In this way, the 6k-th harmonic component of the magnetic noise, which constitutes the dominant magnetic noise component in the three-phase AC rotary electric machine, can be effectively reduced or canceled.

In a preferred mode (claim 3), by superimposing the radial vibration reducing harmonic current of order 7, the sixth harmonic component of the radial vibration is attenuated as compared to the case where the superimposition is not performed. In this way, the sixth harmonic component of the radial vibration, which has previously been the magnetic noise component having the largest amplitude, can be effectively reduced.

In a preferred mode (claim 4), by superimposing the radial vibration reducing harmonic current of order 13, the 12th harmonic component of the radial vibration is attenuated as compared to the case where the superimposition is not performed. It has been found that, by so doing, the 12th harmonic component of the radial vibration, which has previously been the second largest magnetic noise component uncomfortable to the ear, can be effectively reduced.

In a preferred mode (claim 5), by superimposing the radial vibration reducing harmonic currents of orders 7 and 13, the sixth and 12th harmonic components of the radial vibration are simultaneously attenuated as compared to the case where the superimposition is not performed. It has been found that, by so doing, the sixth and 12th harmonic components of the radial vibration, which have previously been the largest and the second largest magnetic noise components uncomfortable to the ear, can be effectively reduced.

In a preferred mode (claim 6), the phases and amplitudes of the radial vibration reducing seventh and 13th harmonic currents are set so that the amplitude of a vector sum, taken between the sixth and 12th harmonic components of the radial vibration occurring due to the fundamental wave current and the radial vibration reducing seventh and 13th harmonic currents and the sixth and 12th harmonic components of the radial vibration, becomes smaller than a predetermined value. The phases and amplitudes of the seventh and 13th radial vibration reducing harmonic currents may be obtained by calculating mathematical equations or by computation using a finite element method, or may be determined by experiment. It has been found that, by so doing, the sixth and 12th harmonic components of the radial vibration, which have previously been the largest and the second largest magnetic noise components uncomfortable to the ear, can be effectively reduced.

In a preferred mode (claim 7), by superimposing the radial vibration reducing harmonic current of order 19, the 18th harmonic component of the radial vibration is attenuated as compared to the case where the superimposition is not performed. This achieves a quiet operation of the rotary electric machine.

In a preferred mode (claim 8), by superimposing the radial vibration reducing harmonic current of order 25, the 24th harmonic component of the radial vibration is attenuated as compared to the case where the superimposition is not performed. This achieves a quiet operation of the rotary electric machine.

In a preferred mode (claim 9), when I1 denotes the amplitude of the fundamental frequency, In denotes the amplitude of the harmonic current, and t, x, and y respectively denote prescribed phase angles, the fundamental frequency component of the polyphase AC current contains a first phase fundamental frequency component Iu1 (=I1 sin (θ)), a second phase fundamental frequency component Iv1 (=I1 sin(θ−x)), and a third phase fundamental frequency component Iw1 (=I1 sin(θ−y)), and the radial vibration reducing harmonic current whose frequency is n times contains a first phase harmonic component Iun (=In sin n(θ+t)), a second phase harmonic component Ivn (=In sin {n(θ+t)−x}), and a third phase harmonic component Iwn (=In sin {n(θ+t)−y}), wherein the first phase harmonic component Iun is superimposed on the first phase fundamental frequency component Iu1, the second phase harmonic component Ivn is superimposed on the second phase fundamental frequency component Iv1, and the third phase harmonic component Iwn is superimposed on the third phase fundamental frequency component Iw1. By so doing, as the rotating sequence, i.e., the phase sequence, of the fundamental frequency component of each phase coincides with the rotating sequence of the n-th harmonic component of the vibration reducing current of each phase, the (n−1)th component of the radial vibration can be effectively reduced.

The above description has been given dealing with the case where the harmonic phase current whose frequency is n times that of the fundamental frequency component is superimposed on the phase current of the fundamental frequency in order to reduce the radial vibration whose frequency is (n−1) times that of the fundamental frequency component of the stator current. It will, however, be appreciated that a harmonic current whose order is higher by one than the above may be additionally superimposed in order to reduce a higher order radial vibration component.

A motor control apparatus according to the present invention (claim 10) comprises: rotational position detecting means for detecting the rotational position of an automotive M-phase synchronous AC rotary electric machine (M is a positive integer not smaller than 3); and motor current control means for applying, based on the detected rotational position, a prescribed phase current having a prescribed fundamental frequency and amplitude to each individual phase winding of an armature of the AC rotary electric machine, wherein the motor current control means superimposes, on the polyphase AC current, a radial vibration reducing harmonic current of order n having a frequency n times the frequency of the fundamental frequency component of the phase current, and thereby attenuates an (n−1)th harmonic component, having a frequency (n−1) times the frequency of the fundamental frequency component, that is contained in a radial vibration occurring radially about an axial center of a rotating shaft of the AC rotary electric machine due to an excitation force generated by the AC rotary electric machine or externally applied to the AC rotary electric machine. Thus, an AC rotary electric machine quiet in operation can be achieved using the magnetic noise reduction method of the present invention.

Usually, a rotation angle sensor such as a resolver for detecting the rotation angle of the rotor is employed for use as the rotational position detecting means, but alternatively, a circuit generally known as a sensorless type may be employed which estimates the rotation angle of the rotor based on the phase of the motor current or motor voltage.

In a preferred mode (claim 11), the motor current control means superimposes at least either one of the seventh and 13th harmonic components on the phase current, and thereby attenuates the sixth or 12th harmonic component of the radial vibration occurring in a three-phase AC rotary electric machine as the AC rotary electric machine, as compared to the case where the superimposition is not performed. According to this mode, as the motor control using the above-described magnetic noise reduction method is performed, the magnetic noise can be reduced effectively and reliably.

In a preferred mode (claim 12), by superimposing the radial vibration reducing harmonic current of order 19, the motor current control means attenuates the 18th harmonic component of the radial vibration as compared to the case where the superimposition is not performed. This achieves a quiet operation of the rotary electric machine.

In a preferred mode (claim 13), by superimposing the radial vibration reducing harmonic current of order 25, the motor current control means attenuates the 24th harmonic component of the radial vibration as compared to the case where the superimposition is not performed. This achieves a quiet operation of the rotary electric machine.

In a preferred mode (claim 14), the AC rotary electric machine is coupled to an automotive engine and/or to an axle, and the motor current control means superimposes the radial vibration reducing harmonic current on the polyphase AC current when the automotive engine is in a stopped condition. This serves to enhance comfort by reducing vehicle noise during stoppage of the engine when the magnetic noise of the rotary electric machine becomes noticeable.

In a preferred mode (claim 15), the AC rotary electric machine is coupled to an automotive engine and/or to an axle so as to be capable of regenerative braking, and the motor current control means superimposes the radial vibration reducing harmonic current on the polyphase AC current at least either when the automotive engine is in a stopped condition or when regenerative braking is being imposed. This serves to enhance comfort by reducing vehicle noise during stoppage of the engine when the magnetic noise of the rotary electric machine becomes noticeable, or during regenerative braking when the engine noise is small.

In a preferred mode (claim 16), the motor current control means obtains the radial vibration reducing harmonic current of order n that reduces or minimizes the radial vibration having a frequency (n−1) times the frequency of the fundamental frequency component and occurring due to the application of the phase current containing at least the fundamental frequency component and a harmonic current whose frequency is n times the frequency of the fundamental frequency component (but not containing the radial vibration reducing harmonic current of the present invention), and the motor current control means superimposes the thus obtained radial vibration reducing harmonic current on the phase current. Here, the radial vibration reducing harmonic current may be obtained from a prestored map or computed using a mathematical equation. The important point here is that the phase current contains not only the fundamental frequency component but also the harmonic current whose frequency is n times that of the fundamental frequency component. Then, in this mode, the radial vibration reducing harmonic current, that is, the harmonic current that reduces or minimizes the radial vibration occurring due to the phase current (actual phase current) which also contains the above-stated harmonic current, is superimposed on the phase current. The phase and amplitude of the radial vibration reducing harmonic current of the prescribed order to be superimposed vary according to the frequency, amplitude, etc. of the fundamental frequency component; therefore, these parameters are determined in advance by experiment or by a finite element method, and are stored in the form of a map so that the desired phase and amplitude can be read out or computed by entering the detected frequency and amplitude of the fundamental frequency component into the map. In this way, the radial vibration occurring due to the actual harmonic-containing phase current can be effectively reduced.

Alternatively, assuming that the armature current does not contain the n-th harmonic current, a magnetic noise reducing harmonic current of order n that reduces or minimizes the radial vibration having a frequency (n−1) times that of the detected or obtained fundamental frequency component of the armature current may be computed and, after subtracting the said harmonic current currently contained in the armature current from the magnetic noise reducing harmonic current, the resulting magnetic noise reducing harmonic current may be superimposed on the armature current. For example, in open-loop control, the magnetic noise reducing harmonic current of order n is obtained that minimizes the magnetic noise of order (n−1) which occurs due to the fundamental frequency component of the armature current to be supplied. Further, the n-th harmonic current that is expected to occur due to the fundamental frequency component of the armature current is obtained as an introduced harmonic current from the prestored map or from a mathematical equation, and the value obtained by subtracting the introduced harmonic current from the magnetic noise reducing harmonic current is superimposed on the fundamental frequency component of the armature current to be supplied and is used as the target value for the armature current control.

In a preferred mode (claim 17), the motor current control means detects as an introduced harmonic current a harmonic current contained in the phase current and having a frequency n times the frequency of the fundamental frequency component, obtains the radial vibration reducing harmonic current of order n as a feedback control target value for reducing or minimizing the (n−1)th harmonic component of the radial vibration for the case where the phase current does not contain the introduced harmonic current but contains only the fundamental frequency component, and performs feedback control to asymptotically reduce the difference between the introduced harmonic current and the target value to zero. This serves to further simplify circuit processing for magnetic noise reduction.

To describe more specifically, the magnetic noise reducing harmonic current is obtained that minimizes the magnetic noise for the case where the detected armature current contains only its fundamental frequency component. Next, feedback control is performed so that the difference between the harmonic current of the detected armature current and the magnetic noise reducing harmonic current is reduced to zero.

Likewise, from the detected phase current, the harmonic current (referred to as the introduced harmonic current), excluding its fundamental frequency component, is extracted. Next, radial vibration reducing harmonic currents of one or more particular orders are obtained that minimize radial vibrations of one or more particular orders for the case where the phase current contains only its fundamental frequency component, and the resulting value is set as the feedback target value. Then, feedback control is performed so as to asymptotically reduce the difference between the introduced harmonic current and the feedback target value to zero. In this case, and as, in the end, only the fundamental frequency component of the phase current and the radial vibration reducing harmonic current are contained in the detected phase current, the radial vibration can be minimized by using simple circuitry.

An AC rotary electric machine apparatus according to claim 18 comprises: an AC rotary electric machine having M-phase stator coils (M is a positive integer not smaller than 3); an inverter having a transistor device for controlling on and off a stator current for each phase of the synchronous machine; and an inverter control circuit which controls the transistor device on and off based on a detected or estimated rotation angle of the AC rotary electric machine, wherein the inverter control circuit includes harmonic PWM signal generating means for performing processing to output to the inverter a harmonic PWM signal having a frequency n times (n is an integer not smaller than 2) the frequency of the fundamental frequency component of the stator current, and thereby altering the amplitude of the magnetic noise of the AC rotary electric machine that has a frequency (n−1) times the frequency of the fundamental frequency component, as compared to the case where the processing is not performed.

That is, according to this invention, the harmonic PWM signal that has a frequency n times that of the fundamental frequency component of the stator current is input to the inverter that controls the stator current of the AC rotary electric machine operating in motor mode or in generator mode, and the magnetic sound (for example, the radially acting magnetic excitation force) of the AC rotary electric machine that has a frequency (n−1) times that of the fundamental frequency component is thus increased or reduced as compared to the normal case, thereby increasing or reducing the magnetic sound of the AC rotary electric machine. This can achieve an AC rotary electric machine that is extremely quiet in operation or that produces a desired magnetic sound.

For example, in the case of a hybrid vehicle, when the vehicle is running by operating the AC rotary electric machine with the engine stopped, if a sound similar to engine rotating sound is generated, the driver will feel secure. Here, a sound similar to engine rotating sound or unique to the AC rotary electric machine may be produced. Further, when a fault occurs in the vehicle or the AC rotary electric machine or when the driving condition changes, the magnetic noise can be varied according to the situation to alert the driver. The level, frequency, etc. of the magnetic noise can be preset by the driver to match the driver's preference for each driving condition range (rpm, output level, etc.) of the AC rotary electric machine. It is preferable that the level of the harmonic PWM signal be set within such a range that the resulting torque ripple does not exceed a predetermined level.

As earlier described, the circumferential vibration of the iron core causes torque ripple, while the radial vibration of the iron core causes magnetic sound on the outer or inner circumferential surface of the stator or rotor iron core. Accordingly, by altering the circumferential component of the magnetic excitation force, torque pulsation is altered, and by altering the radial component of the magnetic excitation force, the magnetic sound can be altered.

In the present invention, in order to alter a given order harmonic component of the radial component of the magnetic excitation force (also called the radially acting magnetic excitation force) induced by the rotor magnetomotive force and the stator current (fundamental frequency component), the harmonic current whose order is higher by one than that given order is superimposed on the stator current (polyphase AC current) thereby applying a magnetic excitation force of that given order that has a phase and amplitude such that the amplitude of its vector sum, with the harmonic component, changes. It has been found that this can effectively alter the magnetic sound.

That is, according to this invention, the harmonic current, whose frequency is n times the fundamental frequency of the stator current, is superimposed on the original stator current. It has been found that this can reduce or increase the radially acting magnetic excitation force that has a frequency (n−1)

times the fundamental frequency of the energizing current. The reason why this can be accomplished will be described later.

In a preferred mode (claim 19), the harmonic PWM signal generating means performs processing to output to the inverter a first harmonic PWM signal having a frequency n1 times the frequency of the fundamental frequency component of the stator current and a second harmonic PWM signal having a frequency n2 times the frequency of the fundamental frequency component, and thereby increases (or reduces) the magnetic sound of the AC rotary electric machine that has a frequency (n1−1) times the frequency of the fundamental frequency component, as compared to the case where the processing is not performed, while at the same time, reducing (or increasing) the magnetic noise of the AC rotary electric machine that has a frequency (n2−1) times the frequency of the fundamental frequency component, as compared to the case where the processing is not performed. This makes it possible to alter and control each frequency component of the magnetic sound that the AC rotary electric machine generates.

In a preferred mode (claim 20), the inverter control circuit includes fundamental PWM signal generating means for outputting to the inverter a fundamental PWM signal for feeding the fundamental frequency component to each of the stator coils. In this way, the fundamental current having a frequency (fundamental frequency) corresponding to the fundamental PWM signal can be fed to the stator coil of the AC rotary electric machine. For example, when in motor mode, the electric machine can produce rotation at the rpm given by the fundamental frequency, and when in generator mode, the stator current having the fundamental frequency can be synchronously rectified.

In a preferred mode (claim 21), the harmonic PWM signal generating means increases the noise generated by the AC rotary electric machine when the harmonic PWM signal generating means is in an operating condition, as compared to when the harmonic PWM signal generating means is in an stopped condition. In this way, the AC rotary electric machine can generate larger magnetic sound than usual, for example, when in a prescribed operating condition of the AC rotary electric machine, or in accordance with the driver's taste.

In a preferred mode (claim 22), the harmonic PWM signal generating means reduces the magnetic sound of the AC rotary electric machine when the harmonic PWM signal generating means is in an operating condition, as compared to when the harmonic PWM signal generating means is in an stopped condition. This achieves an AC rotary electric machine that is extremely quiet in operation compared to the prior art.

In a preferred mode (claim 23), the harmonic PWM signal generating means increases or reduces the magnetic sound as compared to when the harmonic PWM signal generating means is in an stopped condition, by altering the phase and/or amplitude of the harmonic current to be added to the stator current in accordance with the number of revolutions. As the amplitude of the magnetic sound producing harmonic current contained in the stator current varies with the number of revolutions, i.e., the frequency of the fundamental current (fundamental frequency) contained in the stator current, the harmonic PWM signal is controlled accordingly to adjust the phase or amplitude of the harmonic current. With this arrangement, the magnetic sound reducing effect constantly works regardless of variations in the number of revolutions of the AC rotary electric machine, and thus an AC rotary electric machine quiet in operation, or capable of producing magnetic sound of desired frequency, can be achieved.

In a preferred mode (claim 24), the harmonic PWM signal generating means in the inverter control circuit performs processing to output to the inverter a harmonic PWM signal having a frequency n=6k+1 times (k is a natural number) the frequency of the fundamental frequency component of the stator current, and thereby alters the magnetic sound of a three-phase AC rotary electric machine as the AC rotary electric machine that has a frequency 6k times the frequency of the fundamental frequency component, as compared to the case where the processing is not performed. In this way, the 6k-th harmonic component, which is particularly noticeable in the three-phase AC rotary electric machine, can be easily altered, that is, reduced or increased.

In a preferred mode (claim 25), the harmonic PWM signal generating means outputs a harmonic PWM signal for superimposing a seventh harmonic current on the fundamental frequency component of the stator current, and thereby alters the sixth harmonic component of the magnetic sound as compared to the case where the superimposition is not implemented. In this way, the sixth harmonic component of the magnetic sound of the three-phase AC rotary electric machine can be effectively altered. For example, the sixth harmonic component of the radially acting magnetic excitation force, which has previously been the cause of the largest amplitude magnetic sound component, can be effectively reduced.

In a preferred mode (claim 26), the harmonic PWM signal generating means outputs a harmonic PWM signal for superimposing a 13th harmonic current on the fundamental frequency component of the stator current, and thereby alters the 12th harmonic component of the magnetic sound as compared to the case where the superimposition is not implemented. In this way, the 12th harmonic component of the magnetic noise of the three-phase AC rotary electric machine can be effectively altered. For example, the 12th harmonic component of the radial acting magnetic excitation force, which has previously been the cause of the second largest magnetic sound component uncomfortable to the ear, can be effectively reduced.

In a preferred mode (claim 27), the harmonic PWM signal generating means outputs a harmonic PWM signal for superimposing seventh and 13th harmonic currents on the fundamental frequency component of the stator current, and thereby alters the sixth and 12th harmonic components of the magnetic sound as compared to the case where the superimposition is not implemented. In this way, the sixth and 12th harmonic components of the magnetic sound of the three-phase AC rotary electric machine can be simultaneously altered. For example, the sixth and 12th harmonic components of the radial acting magnetic excitation force, which have previously been the causes of the largest and the second largest magnetic sound components uncomfortable to the ear, can be effectively reduced.

In a preferred mode (claim 28), the harmonic PWM signal generating means outputs a harmonic PWM signal for superimposing 19th and/or 25th harmonic currents on the fundamental frequency component of the stator current, and thereby alters the 18th and/or 24th harmonic components of the magnetic sound as compared to the case where the superimposition is not implemented. In this way, the 18th and/or 24th harmonic components of the magnetic sound of the three-phase AC rotary electric machine can be altered.

In a preferred mode (claim 29), n1 is 6k1+1 (k1 is a natural number), n2 is 6k2+1 (k2 is a natural number), and the harmonic PWM signal generating means, as compared to the case where the processing is not performed, reduces the magnetic sound of the three-phase AC rotary electric machine as the AC rotary electric machine that has a frequency 6k1 times the frequency of the fundamental frequency component and, at the same time, increases the magnetic sound of the three-phase AC rotary electric machine as the AC rotary electric machine that has a frequency 6k2 times (k2 is a natural number) the frequency of the fundamental frequency component.

In this way, magnetic sound of the desired frequency can be output while reducing the inherent magnetic sound of the three-phase AC rotary electric machine.

In a preferred mode (claim 30), k1 is 1. In this case, magnetic sound of the desired frequency can be produced while reducing the sixth harmonic of the magnetic noise.

In a preferred mode (claim 31), k1 is 2. In this case, magnetic sound of the desired frequency can be produced while reducing the 12th harmonic of the magnetic noise.

In a preferred mode (claim 32), k1 is 3. In this case, magnetic sound of the desired frequency can be produced while reducing the 18th harmonic of the magnetic noise.

In a preferred mode (claim 33), k1 is 4. In this case, magnetic sound of the desired frequency can be produced while reducing the 24th harmonic of the magnetic noise.

In a preferred mode (claim 34), the harmonic PWM signal generating means performs processing to output to the inverter a harmonic PWM signal having frequencies 7 and 13 times the frequency of the fundamental frequency component of the stator current and a harmonic PWM signal having at least either one of frequencies 19 and 25 times the frequency of the fundamental frequency component, and thereby attenuates the magnetic sound of the three-phase AC rotary electric machine as the AC rotary electric machine that has frequencies 6 and 12 times the frequency of the fundamental frequency component and the magnetic sound of the three-phase AC rotary electric machine as the AC rotary electric machine that has at least either one of frequencies 19 and 25 times the frequency of the fundamental frequency component, as compared to the case where the processing is not performed. This achieves an AC rotary electric machine that is quieter in operation.

In a preferred mode (claim 35), when I1 denotes the amplitude of the fundamental frequency of the stator current, In denotes the amplitude of the harmonic current of the stator current, and t, x, and y respectively denote prescribed phase angles, the fundamental frequency component of the stator current contains at least a first phase fundamental frequency component $Iu1$ ($=I1 \sin(\theta)$), a second phase fundamental frequency component $Iv1$ ($=I1 \sin(\theta-x)$), and a third phase fundamental frequency component $Iw1$ ($=I1 \sin(\theta-y)$), and the harmonic current whose frequency is n times contains at least a first phase harmonic component $Iun$ ($=In \sin n(\theta+t)$), a second frequency harmonic component $Ivn$ ($=In \sin\{n(\theta+t)-x\}$), and a third harmonic component $Iwn$ ($=In \sin\{n(\theta+t)-y\}$), wherein the first phase harmonic component $Iun$ is superimposed on the first phase fundamental frequency component $Iu1$, the second phase harmonic component $Ivn$ is superimposed on the second phase fundamental frequency component $Iv1$, and the third phase harmonic component $Iwn$ is superimposed on the third phase fundamental frequency component $Iw1$. By so doing, as the rotating sequence, i.e., the phase sequence, of the fundamental frequency component of each phase coincides with the rotating sequence of the n-th harmonic component of the vibration reducing current of each phase, the (n−1)th component of the radial vibration can be effectively reduced.

In a preferred mode (claim 36), the AC rotary electric machine is coupled to an automotive engine so as to be decouplable therefrom, and the inverter control circuit causes the magnetic sound to vary by performing processing to output the harmonic PWM signal to the inverter when the automotive engine is in a stopped condition. This serves to enhance comfort by reducing vehicle noise during stoppage of the engine when the magnetic noise of the rotary electric machine becomes noticeable.

In a preferred mode (claim 37), the AC rotary electric machine is coupled to an automotive engine and/or to an axle so as to be capable of regenerative braking, and the inverter control circuit causes the magnetic sound to vary by performing processing to output the harmonic PWM signal to the inverter at least either when the automotive engine is in a stopped condition or when regenerative braking is being imposed. This serves to enhance comfort by reducing vehicle noise during stoppage of the engine when the magnetic noise of the rotary electric machine becomes noticeable, or during regenerative braking when the engine noise is small.

(Modified Modes)

1. It will be appreciated that n, which denotes the order of the radial vibration reducing harmonic current (and the radial vibration altering harmonic current) (order n means that the frequency of the radial vibration reducing harmonic current (or the radial vibration altering harmonic current) is the n-th multiple of that of the fundamental frequency component), can contain manufacturing tolerances of the harmonic current generating circuit. For example, n may be set within a range of (n)−0.1 to (n)+0.1.

2. Each of the above configurations has been described for the case of reducing or altering the radial vibration, but at the same time, the a harmonic current for reducing or altering the circumferentially acting magnetic excitation force (torque ripple) may be additionally superimposed.

3. Various types of synchronous machines can be advantageously employed for use as the AC rotary electric machine, and either operating mode, the motor mode or the generator mode, may be employed as its operating mode.

4. Further, the radial vibration reducing harmonic current (and the radial vibration altering harmonic current) may be superimposed in all rpm ranges, or the radial vibration reducing harmonic current (and the radial vibration altering harmonic current) may be superimposed only in rpm ranges where the magnetic noise becomes a particular problem.

A radial vibration component of a given order may be reduced (or altered) by superimposing a radial vibration reducing harmonic current (or a radial vibration altering harmonic current) of a given order, or a plurality of radial vibration components of given orders may be reduced or altered by superimposing a plurality of radial vibration reducing harmonic currents (radial vibration altering harmonic currents) of given orders. Further, the harmonic current superimposing operation may be switched, according to the rpm range, between the superimposition of the radial vibration reducing (or altering) harmonic current and the superimposition of the torque ripple reducing (or altering) harmonic current.

5. The phases and amplitudes of the harmonic currents to be superimposed may be obtained by calculating the mathematical equations to be given later or by computation using a finite element method, or may be determined by experiment.

6. For rotational position detection, a rotation angle sensor such as a resolver for detecting the rotation angle of the rotor is usually employed, but alternatively, a circuit generally known as a sensorless type may be employed which estimates the rotation angle of the rotor based on the phase of the motor current or motor voltage.

7. The armature current of the rotary electric machine contains harmonic currents of various orders in addition to its fundamental frequency component, and the magnitude of each harmonic current varies depending on such conditions as the operating condition of the rotary electric machine. If magnetic noise reducing (or altering) harmonic currents were to be calculated for the armature current having such a complex waveform, the calculation procedures would become very complex, and the amount of circuitry required would increase. In view of this, assuming that the armature current does not contain the n-th harmonic current, a magnetic noise reducing (or altering) harmonic current of order n that reduces or minimizes the radial vibration having a frequency (n−1) times that of the detected or obtained fundamental frequency component of the armature current is computed and, after subtracting the said harmonic current currently contained in the armature current from the magnetic noise reducing (or altering) harmonic current, the resulting magnetic noise reducing (or altering) harmonic current is superimposed on the armature current. In this way, even if the armature current contains harmonic components in addition to its fundamental frequency component, the calculation and superimposition process of the radial vibration reducing harmonic current (and the radial vibration altering harmonic current) can be simplified. For example, in open-loop control, the magnetic noise reducing (or altering) harmonic current of order n is obtained that minimizes the magnetic noise of order (n−1) which occurs due to the fundamental frequency component of the armature current to be supplied. Further, the n-th harmonic current that is expected to occur due to the fundamental frequency component of the armature current is obtained as an introduced harmonic current from the prestored map or from a mathematical equation, and the value obtained by subtracting the introduced harmonic current from the magnetic noise reducing (or altering) harmonic current is superimposed on the fundamental frequency component of the armature current to be supplied and is used as the target value for the armature current control.

BEST MODE FOR CARRYING OUT THE INVENTION

The preferred modes of the present invention will be described below with reference to the accompanying drawings.

(Description of the Basic Principle)

The basic principle will be described below for the case where the present invention is applied to a polyphase AC rotary electric machine.

Figure 1:
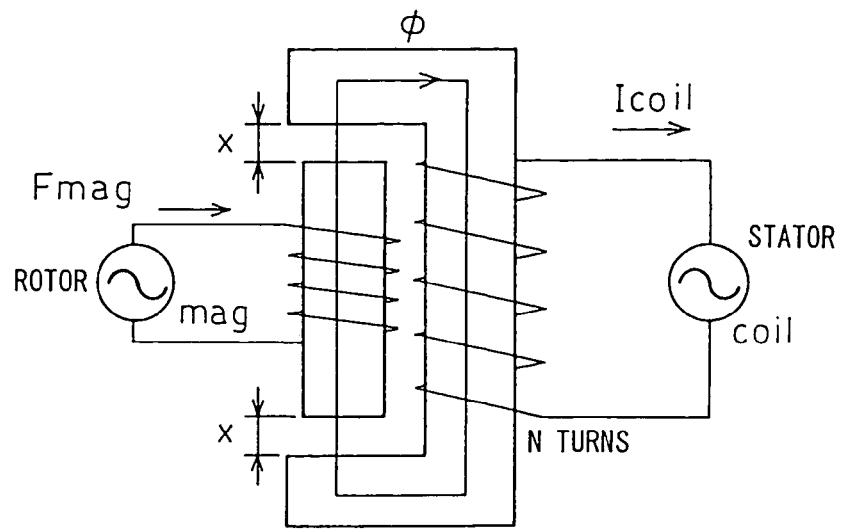
FIG. 1 is a diagram schematically showing a magnetic circuit for one phase of a polyphase AC rotary electric machine.
Figure 2:
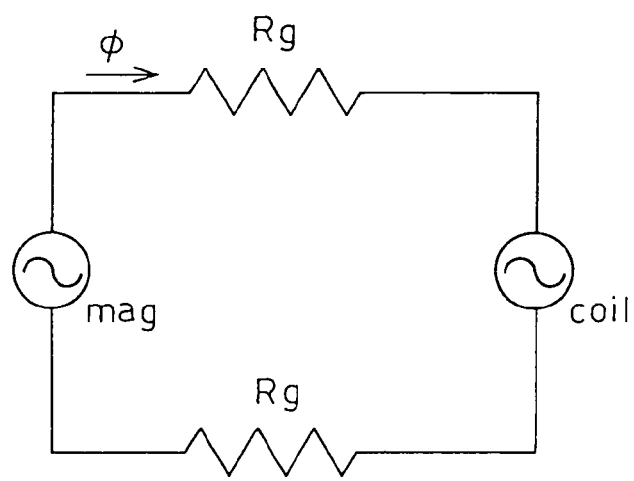
FIG. 2 is an equivalent circuit diagram of the magnetic circuit of FIG. 1.

FIG. 1 is a diagram schematically showing a magnetic circuit for one phase of an N-phase AC rotary electric machine, and FIG. 2 is an equivalent circuit diagram of the magnetic circuit of FIG. 1. In a synchronous machine, magnetic flux φ is formed by the magnetic poles of a rotor (formed from a coil or a permanent magnet), and rotor magnetomotive force Fmag represents the magnetomotive force, i.e., the magnetic field intensity, of the rotor's magnetic poles in the magnetic circuit, while stator magnetomotive force Fcoil represents the magnetomotive force, i.e., the magnetic field intensity, formed in the magnetic circuit by a stator current. Rg denotes the magnetic resistance of a gap between the stator and the rotor.

As seen from FIGS. 1 and 2, the magnetic flux φ, magnetic energy W, and radially acting magnetic excitation force f, per phase, are defined respectively by Magnetic flux $$\phi = \frac{F_{mag} + F_{coil}}{2R_g} = \frac{F_{mag} + NI_{coil}}{2R_g} \quad (1)$$

Magnetic energy $$W = \frac{1}{2}\phi^2 R_g = \frac{1}{8R_g}(F_{mag} + NI_{coil})^2 = \frac{1}{8x}(F_{mag} + NI_{coil})^2 \mu_0 S \quad (2)$$

Magnetic excitation force $$f = \frac{\partial W}{\partial x} \quad (3)$$

$$= -\frac{1}{8x^2}\mu_0 S(F_{mag} + NI_{coil})^2 \propto (F_{mag} + NI_{coil})^2$$

$$= F_{mag}^2 + 2NF_{mag}I_{coil} + N^2 I_{coil}^2$$

That is, the magnetic excitation force f is defined as the sum of the square of the rotor magnetomotive force, the square of the stator magnetomotive force, and the product of the rotor magnetomotive force and the stator magnetomotive force.

In the above figures and equations, Icoil is the stator current (the phase current of the armature), x is the gap width, S is the opposing area size of the gap, μ0 is the permeability of air, N is the number of turns in each phase coil of the armature, and M is the number of phases.

The rotor magnetomotive force Fmag and the stator current (phase current) Icoil for each of the first phase (U phase in the case of three phases), second phase (V phase in the case of three phases), and M-th phase (W phase in the case of three phases) of the polyphase AC rotary electric machine are shown below.

U phase $$\begin{cases} \text{Rotor magnetomotive force} \\ F_{mag} = F_1\sin(\theta + \alpha) + F_j\sin j(\theta + \beta) + F_k\sin k(\theta + \gamma) + F_l\sin l(\theta + \delta) \\ \quad \text{Fundamental} \quad \text{j-th harmonic} \quad \text{k-th harmonic} \quad \text{L-th harmonic} \\ \quad \text{(first harmonic)} \\ \text{Stator current} \\ I_{coil} = I_1\sin(\theta + s) + I_m\sin m(\theta + t) + I_n\sin n(\theta + u) \\ \quad \text{Fundamental} \quad \text{m-th harmonic} \quad \text{n-th harmonic} \\ \quad \text{(first harmonic)} \end{cases} \quad (4)$$

-continued

V phase $\quad x = 360/M$ $$\begin{cases} \text{Rotor magnetomotive force} \\ F_{mag} = F_1\sin(\theta + \alpha - x) + F_j\sin j(\theta + \beta - x) + \\ \quad F_k\sin k(\theta + \gamma - x) + F_l\sin l(\theta + \delta - x) \\ \text{Stator current} \\ I_{coil} = I_1\sin(\theta + s - x) + I_m\sin\{m(\theta + t) - x\} + I_n\sin\{n(\theta + u) - x\} \end{cases} \quad (5)$$

W phase $\quad y = 360(M-1)/M$ $$\begin{cases} \text{Rotor magnetomotive force} \\ F_{mag} = F_1\sin(\theta + \alpha - y) + F_j\sin j(\theta + \beta - y) + \\ \quad F_k\sin k(\theta + \gamma - y) + F_l\sin l(\theta + \delta - y) \\ \text{Stator current} \\ I_{coil} = I_1\sin(\theta + s - y) + I_m\sin\{m(\theta + t) - y\} + I_n\sin\{n(\theta + u) - y\} \end{cases} \quad (6)$$

The rotor magnetomotive forces given above are expressed by trigonometric functions to express the rotor rotation. The rotor magnetomotive forces Fmag and the stator currents Icoil for the remaining phases when the number of phases is larger than three will not be given herein, since they can be easily derived by a person skilled in the art. As a matter of course, x is 360/M=120 degrees in the case of three phases.

Here, Fi (i is a subscript) represents the amplitude of the i-th harmonic of the rotor magnetomotive force, Ii represents the amplitude of the i-th harmonic of the stator current, θ denotes the rotation angle of the rotor, α, β, γ, δ, s, t, and u respectively denote phase angles, and j, k, L, m, and n are integer values.

The above equations have assumed that the rotor magnetomotive force Fmag has only the j-th, k-th, and L-th harmonics as the harmonic components, and that the stator current Icoil has only the m-th and n-th harmonics as the harmonic components, but it is apparent that they may further include other harmonics. When the application is limited to a three-phase AC rotary electric machine for simplicity, the equations (4), (5), and (6) can be written as shown below.

U phase $$\begin{cases} \text{Rotor magnetomotive force} \\ F_{mag} = F_1\sin(\theta + \alpha) + F_j\sin j(\theta + \beta) + F_k\sin k(\theta + \gamma) + F_l\sin l(\theta + \delta) \\ \quad \text{Fundamental} \quad \text{j-th harmonic} \quad \text{k-th harmonic} \quad \text{L-th harmonic} \\ \quad \text{(first harmonic)} \\ \text{Stator current} \\ I_{coil} = I_1\sin(\theta + s) + I_m\sin m(\theta + t) + I_n\sin n(\theta + u) \\ \quad \text{Fundamental} \quad \text{m-th harmonic} \quad \text{n-th harmonic} \\ \quad \text{(first harmonic)} \end{cases} \quad (7)$$

V phase $$\begin{cases} \text{Rotor magnetomotive force} \\ F_{mag} = F_1\sin(\theta + \alpha - 120) + F_j\sin j(\theta + \beta - 120) + \\ \quad F_k\sin k(\theta + \gamma - 120) + F_l\sin l(\theta + \delta - 120) \\ \text{Stator current} \\ I_{coil} = I_1\sin(\theta + s - 120) + I_m\sin\{m(\theta + t) - 120\} + \\ \quad I_n\sin\{n(\theta + u) - 120\} \end{cases} \quad (8)$$

W phase

-continued $$\begin{cases} \text{Rotor magnetomotive force} \\ F_{mag} = F_1 \sin(\theta + \alpha - 240) + F_j \sin j(\theta + \beta - 240) + \\ \qquad F_k \sin k(\theta + \gamma - 240) + F_l \sin l(\theta + \delta - 240) \\ \text{Stator current} \\ I_{coil} = I_1 \sin(\theta + s - 240) + I_m \sin\{m(\theta + t) - 240\} + \\ \qquad I_n \sin\{n(\theta + u) - 240\} \end{cases} \quad (9)$$

The U-phase excitation force fu is found from the following equation (10) which is obtained by substituting the equation (7) into the equation (3).

U-phase excitation force $fu \propto$ (10)

$$\frac{1}{2}(F_1^2 + F_j^2 + F_k^2 + F_l^2) - \frac{F_1^2}{2}\cos 2(\theta + \alpha) - \frac{F_j^2}{2}\cos 2j(\theta + \beta) -$$

$$\frac{F_k^2}{2}\cos 2k(\theta + \gamma) - \frac{F_l^2}{2}\cos 2l(\theta + \delta) -$$

$$F_1 F_j[\cos\{(j+1)\theta + \alpha + j\beta\} - \cos\{(j-1)\theta - \alpha + j\beta\}] -$$

$$F_1 F_k[\cos\{(k+1)\theta + \alpha + k\gamma\} - \cos\{(k-1)\theta - \alpha + k\gamma\}] -$$

$$F_1 F_l[\cos\{(l+1)\theta + \alpha + l\delta\} - \cos\{(l-1)\theta - \alpha + l\delta\}] -$$

$$F_j F_k[\cos\{(k+j)\theta + j\beta + k\gamma\} - \cos\{(k-j)\theta - j\beta + k\gamma\}] -$$

$$F_j F_l[\cos\{(l+j)\theta + j\beta + l\delta\} - \cos\{(l-j)\theta - j\beta + l\delta\}] -$$

$$F_k F_l[\cos\{(l+k)\theta + k\gamma + l\delta\} - \cos\{(l-k)\theta - k\gamma + l\delta\}] +$$

$$2N\left\{\begin{array}{l} -\dfrac{F_1 I_1}{2}\{\cos(2\theta + \alpha + s) - \cos(\alpha - s)\} - \\ \dfrac{F_1 I_m}{2}[\cos\{(m+1)\theta + \alpha + mt\} - \cos\{(m-1)\theta - \alpha + mt\}] - \\ \dfrac{F_1 I_n}{2}[\cos\{(n+1)\theta + \alpha + nu\} - \cos\{(n-1)\theta - \alpha + nu\}] - \\ \dfrac{F_j I_1}{2}[\cos\{(j+1)\theta + j\beta + s\} - \cos\{(j-1)\theta + j\beta - s\}] - \\ \dfrac{F_j I_m}{2}[\cos\{(j+m)\theta + j\beta + mt\} - \cos\{(j-m)\theta + j\beta - mt\}] - \\ \dfrac{F_j I_n}{2}[\cos\{(j+n)\theta + j\beta + nu\} - \cos\{(j-n)\theta + j\beta - nu\}] - \\ \dfrac{F_k I_1}{2}[\cos\{(k+1)\theta + k\gamma + s\} - \cos\{(k-1)\theta + k\gamma - s\}] - \\ \dfrac{F_k I_m}{2}[\cos\{(k+m)\theta + k\gamma + mt\} - \cos\{(k-m)\theta + k\gamma - mt\}] - \\ \dfrac{F_k I_n}{2}[\cos\{(k+n)\theta + k\gamma + nu\} - \cos\{(k-n)\theta + k\gamma - nu\}] - \\ \dfrac{F_l I_1}{2}[\cos\{(l+1)\theta + l\delta + s\} - \cos\{(l-1)\theta + l\delta - s\}] - \\ \dfrac{F_l I_m}{2}[\cos\{(l+m)\theta + l\delta + mt\} - \cos\{(l-m)\theta + l\delta - mt\}] - \\ \dfrac{F_l I_n}{2}[\cos\{(l+n)\theta + l\delta + nu\} - \cos\{(l-n)\theta + l\delta - nu\}] \end{array}\right\} +$$

$$N^2\left\{\begin{array}{l} \dfrac{1}{2}(I_1^2 + I_m^2 + I_n^2) - \dfrac{I_1^2}{2}\cos 2(\theta + s) - \dfrac{I_m^2}{2}\cos 2m(\theta + t) - \\ \dfrac{I_n^2}{2}\cos 2n(\theta + u) - \\ I_1 I_m[\cos\{(m+1)\theta + s + mt\} - \cos\{(m-1)\theta - s + mt\}] - \\ I_1 I_n[\cos\{(n+1)\theta + s + nu\} - \cos\{(n-1)\theta - s + nu\}] - \\ I_m I_n[\cos\{(m+n)\theta + mt + nu\} - \cos\{(n-m)\theta - mt + nu\}] \end{array}\right\}$$

The V-phase excitation force fv is found from the following equation (11) which is obtained by substituting the equation (8) into the equation (3).

V-phase excitation force $fv \propto$ (11)

$$\frac{1}{2}(F_1^2 + F_j^2 + F_k^2 + F_l^2) - \frac{F_1^2}{2}\cos 2(\theta + \alpha - 120) -$$

$$\frac{F_j^2}{2}\cos 2j(\theta + \beta - 120) - \frac{F_k^2}{2}\cos 2k(\theta + \gamma - 120) -$$

$$\frac{F_l^2}{2}\cos 2l(\theta + \delta - 120) -$$

$$F_1 F_j[\cos\{(j+1)\theta + \alpha + j\beta - 120(j+1)\} -$$

$$\cos\{(j-1)\theta - \alpha + j\beta - 120(j-1)\}] -$$

$$F_1 F_k[\cos\{(k+1)\theta + \alpha + k\gamma - 120(k+1)\} -$$

$$\cos\{(k-1)\theta - \alpha + k\gamma - 120(k-1)\}] -$$

$$F_1 F_l[\cos\{(l+1)\theta + \alpha + l\delta - 120(l+1)\} -$$

$$\cos\{(l-1)\theta - \alpha + l\delta - 120(l-1)\}] -$$

$$F_j F_k[\cos\{(k+j)\theta + j\beta + k\gamma - 120(k+j)\} -$$

$$\cos\{(k-j)\theta - j\beta + k\gamma - 120(k-j)\}] -$$

$$F_j F_l[\cos\{(l+j)\theta + j\beta + l\delta - 120(l+j)\} -$$

$$\cos\{(l-j)\theta - j\beta + l\delta - 120(l-j)\}] -$$

$$F_k F_l[\cos\{(l+k)\theta + k\gamma + l\delta - 120(l+k)\} -$$

$$\cos\{(l-k)\theta - k\gamma + l\delta - 120(l-k)\}] +$$

-continued $$-\frac{F_1 I_1}{2}\{\cos(2\theta + \alpha + s - 240) - \cos(\alpha - s)\} -$$

$$\frac{F_1 I_m}{2}[\cos\{(m+1)\theta + \alpha + mt - 240\} -$$

$$\cos\{(m-1)\theta - \alpha + mt\}] -$$

$$\frac{F_1 I_n}{2}[\cos\{(n+1)\theta + \alpha + nu - 240\} -$$

$$\cos\{(n-1)\theta - \alpha + nu\}] -$$

$$\frac{F_j I_1}{2}[\cos\{(j+1)\theta + j\beta + s - 120(j+1)\} -$$

$$\cos\{(j-1)\theta + j\beta - s - 120(j-1)\}] -$$

$$\frac{F_j I_m}{2}[\cos\{(j+m)\theta + j\beta + mt - 120(j+1)\} -$$

$$\cos\{(j-m)\theta + j\beta - mt - 120(j-1)\}] -$$

$$\frac{F_j I_n}{2}[\cos\{(j+n)\theta + j\beta + nu - 120(j+1)\} -$$

$$\cos\{(j-n)\theta + j\beta - nu - 120(j-1)\}] -$$

$$2N\left\{\frac{F_k I_1}{2}[\cos\{(k+1)\theta + k\gamma + s - 120(k+1)\} - \atop \cos\{(k-1)\theta + k\gamma - s - 120(k-1)\}] - \right\} +$$

$$\frac{F_k I_m}{2}[\cos\{(k+m)\theta + k\gamma + mt - 120(k+1)\} -$$

$$\cos\{(k-m)\theta + k\gamma - mt - 120(k-1)\}] -$$

$$\frac{F_k I_n}{2}[\cos\{(k+n)\theta + k\gamma + nu - 120(k+1)\} -$$

$$\cos\{(k-n)\theta + k\gamma - nu - 120(k-1)\}] -$$

$$\frac{F_l I_1}{2}[\cos\{(l+1)\theta + l\delta + s - 120(l+1)\} -$$

$$\cos\{(l-1)\theta + l\delta - s - 120(l-1)\}] -$$

$$\frac{F_l I_m}{2}[\cos\{(l+m)\theta + l\delta + mt - 120(l+1)\} -$$

$$\cos\{(l-m)\theta + l\delta - mt - 120(l-1)\}] -$$

$$\frac{F_l I_n}{2}[\cos\{(l+n)\theta + l\delta + nu - 120(l+1)\} -$$

$$\cos\{(l-n)\theta + l\delta - nu - 120(l-1)\}]$$

$$N^2 \left\{ \begin{array}{l} \frac{1}{2}(I_1^2 + I_m^2 + I_n^2) - \frac{I_1^2}{2}\cos 2(\theta + s - 120) - \\ \frac{I_m^2}{2}\cos\{2m(\theta + t) - 240\} - \\ \frac{I_n^2}{2}\cos\{2n(\theta + u) - 240\} - \\ I_1 I_m[\cos\{(m+1)\theta + s + mt - 240\} - \\ \cos\{(m-1)\theta - s + mt\}] - \\ I_1 I_n[\cos\{(n+1)\theta + s + nu - 240\} - \\ \cos\{(n-1)\theta - s + nu\}] - \\ I_m I_n[\cos\{(m+n)\theta + mt + nu - 240\} - \\ \cos\{(n-m)\theta - mt + nu\}] \end{array} \right\}$$

The W-phase excitation force fw is found from the following equation (12) which is obtained by substituting the equation (9) into the equation (3).

$$W\text{-phase excitation force } fw \propto \quad (12)$$

$$\frac{1}{2}(F_1^2 + F_j^2 + F_k^2 + F_l^2) - \frac{F_1^2}{2}\cos 2(\theta + \alpha - 240) -$$

-continued $$\frac{F_j^2}{2}\cos 2j(\theta + \beta - 240) - \frac{F_k^2}{2}\cos 2k(\theta + \gamma - 240) -$$

$$\frac{F_l^2}{2}\cos 2l(\theta + \delta - 240) -$$

$$F_1 F_j[\cos\{(j+1)\theta + \alpha + j\beta - 240(j+1)\} -$$

$$\cos\{(j-1)\theta - \alpha + j\beta - 240(j-1)\}] -$$

$$F_1 F_k[\cos\{(k+1)\theta + \alpha + k\gamma - 240(k+1)\} -$$

$$\cos\{(k-1)\theta - \alpha + k\gamma - 240(k-1)\}] -$$

$$F_1 F_l[\cos\{(l+1)\theta + \alpha + l\delta - 240(l+1)\} -$$

$$\cos\{(l-1)\theta - \alpha + l\delta - 240(l-1)\}] -$$

$$F_j F_k[\cos\{(k+j)\theta + j\beta + k\gamma - 240(k+j)\} -$$

$$\cos\{(k-j)\theta - j\beta + k\gamma - 240(k-j)\}] -$$

$$F_j F_l[\cos\{(l+j)\theta + j\beta + l\delta - 240(l+j)\} -$$

$$\cos\{(l-j)\theta - j\beta + l\delta - 240(l-j)\}] -$$

$$F_k F_l[\cos\{(l+k)\theta + k\gamma + l\delta - 240(l+k)\} -$$

$$\cos\{(l-k)\theta - k\gamma + l\delta - 240(l-k)\}] +$$

$$-\frac{F_1 I_1}{2}\{\cos(2\theta + \alpha + s - 480) - \cos(\alpha - s)\} -$$

$$\frac{F_1 I_m}{2}[\cos\{(m+1)\theta + \alpha + mt - 480\} -$$

$$\cos\{(m-1)\theta - \alpha + mt\}] -$$

$$\frac{F_1 I_n}{2}[\cos\{(n+1)\theta + \alpha + nu - 480\} -$$

$$\cos\{(n-1)\theta - \alpha + nu\}] -$$

$$\frac{F_j I_1}{2}[\cos\{(j+1)\theta + j\beta + s - 240(j+1)\} -$$

$$\cos\{(j-1)\theta + j\beta - s - 240(j-1)\}] -$$

$$\frac{F_j I_m}{2}[\cos\{(j+m)\theta + j\beta + mt - 240(j+1)\} -$$

$$\cos\{(j-m)\theta + j\beta - mt - 240(j-1)\}] -$$

$$\frac{F_j I_n}{2}[\cos\{(j+n)\theta + j\beta + nu - 240(j+1)\} -$$

$$\cos\{(j-n)\theta + j\beta - nu - 240(j-1)\}] -$$

$$2N\left\{\frac{F_k I_1}{2}[\cos\{(k+1)\theta + k\gamma + s - 240(k+1)\} - \atop \cos\{(k-1)\theta + k\gamma - s - 240(k-1)\}] - \right\} +$$

$$\frac{F_k I_m}{2}[\cos\{(k+m)\theta + k\gamma + mt - 240(k+1)\} -$$

$$\cos\{(k-m)\theta + k\gamma - mt - 240(k-1)\}] -$$

$$\frac{F_k I_n}{2}[\cos\{(k+n)\theta + k\gamma + nu - 240(k+1)\} -$$

$$\cos\{(k-n)\theta + k\gamma - nu - 240(k-1)\}] -$$

$$\frac{F_l I_1}{2}[\cos\{(l+1)\theta + l\delta + s - 240(l+1)\} -$$

$$\cos\{(l-1)\theta + l\delta - s - 240(l-1)\}] -$$

$$\frac{F_l I_m}{2}[\cos\{(l+m)\theta + l\delta + mt - 240(l+1)\} -$$

$$\cos\{(l-m)\theta + l\delta - mt - 240(l-1)\}] -$$

$$\frac{F_l I_n}{2}[\cos\{(l+n)\theta + l\delta + nu - 240(l+1)\} -$$

$$\cos\{(l-n)\theta + l\delta - nu - 240(l-1)\}]$$

-continued $$\frac{1}{2}(I_1^2 + I_m^2 + I_n^2) - \frac{I_1^2}{2}\cos 2(\theta + s - 240) -$$

$$\frac{I_m^2}{2}\cos\{2m(\theta + t) - 480\} -$$

$$\frac{I_n^2}{2}\cos\{2n(\theta + u) - 480\} -$$

$$N^2 \Big\{ I_1 I_m[\cos\{(m+1)\theta + s + mt - 480\} -$$

$$\underline{\cos\{(m-1)\theta - s + mt\}}] -$$

$$I_1 I_n[\cos\{(n+1)\theta + s + nu - 480\} -$$

$$\underline{\cos\{(n-1)\theta - s + nu\}}] -$$

$$I_m I_n[\cos\{(m+n)\theta + mt + nu - 480\} -$$

$$\underline{\cos\{(n-m)\theta - mt + nu\}}] \Big\}$$

In the equations (4) to (6), θ is the angle of the fundamental wave. It is apparent that, when the angular velocity of the fundamental wave is denoted by ω, θ is equal to ωt and, when the frequency of the fundamental wave (the fundamental frequency) is denoted by f, θ is equal to 2πft. Further, in the equations (4) to (6), it is convenient to represent the numeric values 360, 120, and 240 as 2π, 2π/3, and 4π/3, respectively, in actual calculations.

Magnetic sound has positive correlation with the vector sum of the above phase excitation forces which, as shown by the equations (10), (11), and (12), are expressed by linear functions (equations containing sums or differences) comprising large numbers of terms. The sum of the phase excitation forces is a linear function (an equation containing sums or differences) comprising terms (hereinafter sometimes referred to as the vector sum terms) each obtained by vector summing the terms of the same order (same frequency) in the respective phases. Magnetic sound becomes a problem when the terms constituting each vector sum term are in phase (similar in phase) and are therefore reinforcing each other, but there is hardly any problem when the terms constituting each vector sum term greatly differ in phase because, in that case, the amplitude of the vector sum term is small.

More specifically, when the equations (10), (11), and (12) are summed together, the terms constituting each vector sum term are in phase and the amplitude of the vector sum term becomes much larger than the amplitude of each constituent term when the order is (m−1), (n−1), and (n−m).

From the equations (10), (11), and (12), it can be seen that when the m-th and n-th harmonic current components are superimposed on the stator current Icoil, excitation force components of orders (m−1), (n−1), and (n−m) are always markedly generated.

This means that, when the x-th harmonic current component having a certain phase is superimposed, an excitation force of order (x−1) can be induced.

Accordingly, if the x-th harmonic current that induces an excitation force equal in amplitude but opposite in phase to the (x−1)th component of the magnetic sound is superimposed in order to cancel the (x−1)th component which is responsible for the currently occurring magnetic sound, then the magnetic sound can be canceled. Here, if the phase is not exactly opposite, or if the amplitude is not exactly equal, the magnetic sound can be greatly reduced by reducing the amplitude of their vector sum.

Further, if the x-th harmonic current that induces the (x−1)th component of the magnetic sound is superimposed on the fundamental frequency component of the stator current in order to alter (increase or reduce) the same component as the (x−1)th component which is responsible for the currently occurring magnetic sound, then the magnetic sound can be altered (increased or reduced). That is, the amplitude of their vector sum can be increased or reduced.

The notion that the x-th harmonic current having a suitable phase and suitable amplitude should be superimposed to increase or reduce the (x−1)th component of the magnetic noise of the AC rotary electric machine has not been known in the prior art, and is expected to play a very important role in the future development of low-noise motors.

Likewise, as can be seen from the equations (10), (11), and (12), it is also possible to simultaneously alter (increase or reduce) the excitation force components of orders (m−1), (n−1), and (n−m) by superimposing the m-th and n-th harmonic current components on the stator current Icoil. In this case, however, as the excitation force components of orders (m−1), (n−1), and (n−m) are induced by the phases and amplitudes of the superimposed m-th and n-th harmonic current components, it is not easy to make all the vector sums equal to zero between these excitation forces and the corresponding (m−1)th, (n−1)th, and (n−m)th components inherently contained in the magnetic sound. However, the phases and amplitudes of the respectively superimposed currents can be adjusted so that the amplitude of the vector sum with the excitation force of each order becomes as small as possible or becomes equal to the desired magnitude.

The notion that the m-th and n-th harmonic current components each having a suitable phase and suitable amplitude should be superimposed to simultaneously alter (increase or reduce) the (m−1)th, (n−1)th, and (n−m)th components of the magnetic sound of the AC rotary electric machine has not been known in the prior art, and is expected to play a very important role in the future development of low-noise motors.

The equations (10), (11), and (12) are simplified as shown below by eliminating those terms for which the vector sum is zero.

U-phase excitation force $fu \propto$ (13)

$$\frac{1}{2}(F_1^2 + F_j^2 + F_k^2 + F_l^2) - \frac{F_j^2}{2}\cos 2j(\theta + \beta) -$$

$$\frac{F_k^2}{2}\cos 2k(\theta + \gamma) - \frac{F_l^2}{2}\cos 2l(\theta + \delta) -$$

$$F_1 F_j[\cos\{(j+1)\theta + \alpha + j\beta\} - \cos\{(j-1)\theta - \alpha + j\beta\}] -$$

$$F_1 F_k[\cos\{(k+1)\theta + \alpha + k\gamma\} - \underline{\cos\{(k-1)\theta - \alpha + k\gamma\}}] -$$

$$F_1 F_l[\cos\{(l+1)\theta + \alpha + l\delta\} - \underline{\cos\{(l-1)\theta - \alpha + l\delta\}}] -$$

$$F_j F_k[\cos\{(k+j)\theta + j\beta + k\gamma\} - \cos\{(k-j)\theta - j\beta + k\gamma\}] -$$

$$F_j F_l[\cos\{(l+j)\theta + j\beta + l\delta\} - \cos\{(l-j)\theta - j\beta + l\delta\}] -$$

$$F_k F_l[\cos\{(l+k)\theta + k\gamma + l\delta\} - \cos\{(l-k)\theta - k\gamma + l\delta\}] +$$

$$2N\left\{\begin{array}{l}\dfrac{F_1I_1}{2}\cos(\alpha-s)+\dfrac{F_1I_m}{2}\cos\{(m-1)\theta-\alpha+mt\}+\\ \dfrac{F_1I_n}{2}\cos\{(n-1)\theta-\alpha+nu\}-\\ \dfrac{F_jI_1}{2}[\cos\{(j+1)\theta+j\beta+s\}-\cos\{(j-1)\theta+j\beta-s\}]-\\ \dfrac{F_jI_m}{2}[\cos\{(j+m)\theta+j\beta+mt\}-\cos\{(j-m)\theta+j\beta-mt\}]-\\ \dfrac{F_jI_n}{2}[\cos\{(j+n)\theta+j\beta+nu\}-\cos\{(j-n)\theta+j\beta-nu\}]-\\ \dfrac{F_kI_1}{2}[\cos\{(k+1)\theta+k\gamma+s\}-\cos\{(k-1)\theta+k\gamma-s\}]-\\ \dfrac{F_kI_m}{2}[\cos\{(k+m)\theta+k\gamma+mt\}-\\ \cos\{(k-m)\theta+k\gamma-mt\}]-\\ \dfrac{F_kI_n}{2}[\cos\{(k+n)\theta+k\gamma+nu\}-\\ \cos\{(k-n)\theta+k\gamma-nu\}]-\\ \dfrac{F_lI_1}{2}[\cos\{(l+1)\theta+l\delta+s\}-\cos\{(l-1)\theta+l\delta-s\}]-\\ \dfrac{F_lI_m}{2}[\cos\{(l+m)\theta+l\delta+mt\}-\\ \cos\{(l-m)\theta+l\delta-mt\}]-\\ \dfrac{F_lI_n}{2}[\cos\{(l+n)\theta+l\delta+nu\}-\\ \cos\{(l-n)\theta+l\delta-nu\}]\end{array}\right\}+$$

$$N^2\left\{\begin{array}{l}\dfrac{1}{2}(I_1^2+I_m^2+I_n^2)+I_1I_m\cos\{(m-1)\theta-s+mt\}+\\ I_1I_n\cos\{(n-1)\theta-s+nu\}+I_mI_n\cos\{(n-m)\theta-mt+nu\}\end{array}\right\}$$

V-phase excitation force $fv \propto$ (14)

$$\dfrac{1}{2}(F_1^2+F_j^2+F_k^2+F_l^2)-\dfrac{F_j^2}{2}\cos 2j(\theta+\beta-120)-$$

$$\dfrac{F_k^2}{2}\cos 2k(\theta+\gamma-120)-\dfrac{F_l^2}{2}\cos 2l(\theta+\delta-120)-$$

$$F_1F_j[\cos\{(j+1)\theta+\alpha+j\beta-120(j+1)\}-$$
$$\cos\{(j-1)\theta-\alpha+j\beta-120(j-1)\}]-$$

$$F_1F_k[\cos\{(k+1)\theta+\alpha+k\gamma-120(k+1)\}-$$
$$\cos\{(k-1)\theta-\alpha+k\gamma-120(k-1)\}]-$$

$$F_1F_l[\cos\{(l+1)\theta+\alpha+l\delta-120(l+1)\}-$$
$$\cos\{(l-1)\theta-\alpha+l\delta-120(l-1)\}]-$$

$$F_jF_k[\cos\{(k+j)\theta+j\beta+k\gamma-120(k+j)\}-$$
$$\cos\{(k-j)\theta-j\beta+k\gamma-120(k-j)\}]-$$

$$F_jF_l[\cos\{(l+j)\theta+j\beta+l\delta-120(l+j)\}-$$
$$\cos\{(l-j)\theta-j\beta+l\delta-120(l-j)\}]-$$

$$F_kF_l[\cos\{(l+k)\theta+k\gamma+l\delta-120(l+k)\}-$$
$$\cos\{(l-k)\theta-k\gamma+l\delta-120(l-k)\}]+$$

$$2N\left\{\begin{array}{l}\dfrac{F_1I_1}{2}\cos(\alpha-s)+\dfrac{F_1I_m}{2}\cos\{(m-1)\theta-\alpha+mt\}+\\ \dfrac{F_1I_n}{2}\cos\{(n-1)\theta-\alpha+nu\}-\\ \dfrac{F_jI_1}{2}[\cos\{(j+1)\theta+j\beta+s-120(j+1)\}-\\ \cos\{(j-1)\theta+j\beta-s-120(j-1)\}]-\\ \dfrac{F_jI_m}{2}[\cos\{(j+m)\theta+j\beta+mt-120(j+1)\}-\\ \cos\{(j-m)\theta+j\beta-mt-120(j-1)\}]-\\ \dfrac{F_jI_n}{2}[\cos\{(j+n)\theta+j\beta+nu-120(j+1)\}-\\ \cos\{(j-n)\theta+j\beta-nu-120(j-1)\}]-\\ \dfrac{F_kI_1}{2}[\cos\{(k+1)\theta+k\gamma+s-120(k+1)\}-\\ \cos\{(k-1)\theta+k\gamma-s-120(k-1)\}]-\\ \dfrac{F_kI_m}{2}[\cos\{(k+m)\theta+k\gamma+mt-120(k+1)\}-\\ \cos\{(k-m)\theta+k\gamma-mt-120(k-1)\}]-\\ \dfrac{F_kI_n}{2}[\cos\{(k+n)\theta+k\gamma+nu-120(k+1)\}-\\ \cos\{(k-n)\theta+k\gamma-nu-120(k-1)\}]-\\ \dfrac{F_lI_1}{2}[\cos\{(l+1)\theta+l\delta+s-120(l+1)\}-\\ \cos\{(l-1)\theta+l\delta-s-120(l-1)\}]-\\ \dfrac{F_lI_m}{2}[\cos\{(l+m)\theta+l\delta+mt-120(l+1)\}-\\ \cos\{(l-m)\theta+l\delta-mt-120(l-1)\}]-\\ \dfrac{F_lI_n}{2}[\cos\{(l+n)\theta+l\delta+nu-120(l+1)\}-\\ \cos\{(l-n)\theta+l\delta-nu-120(l-1)\}]\end{array}\right\}+$$

$$N^2\left\{\begin{array}{l}\dfrac{1}{2}(I_1^2+I_m^2+I_n^2)+I_1I_m\cos\{(m-1)\theta-s+mt\}+\\ I_1I_n\cos\{(n-1)\theta-s+nu\}+I_mI_n\cos\{(n-m)\theta-mt+nu\}\end{array}\right\}$$

W-phase excitation force $fw \propto$ (15)

$$\dfrac{1}{2}(F_1^2+F_j^2+F_k^2+F_l^2)-\dfrac{F_j^2}{2}\cos 2j(\theta+\beta-240)-$$

$$\dfrac{F_k^2}{2}\cos 2k(\theta+\gamma-240)-\dfrac{F_l^2}{2}\cos 2l(\theta+\delta-240)-$$

$$F_1F_j[\cos\{(j+1)\theta+\alpha+j\beta-240(j+1)\}-$$
$$\cos\{(j-1)\theta-\alpha+j\beta-240(j-1)\}]-$$

$$F_1F_k[\cos\{(k+1)\theta+\alpha+k\gamma-240(k+1)\}-$$
$$\cos\{(k-1)\theta-\alpha+k\gamma-240(k-1)\}]-$$

$$F_1F_l[\cos\{(l+1)\theta+\alpha+l\delta-240(l+1)\}-$$
$$\cos\{(l-1)\theta-\alpha+l\delta-240(l-1)\}]-$$

$$F_jF_k[\cos\{(k+j)\theta+j\beta+k\gamma-240(k+j)\}-$$
$$\cos\{(k-j)\theta-j\beta+k\gamma-240(k-j)\}]-$$

$$F_jF_l[\cos\{(l+j)\theta+j\beta+l\delta-240(l+j)\}-$$
$$\cos\{(l-j)\theta-j\beta+l\delta-240(l-j)\}]-$$

-continued $$2N\left\{\begin{array}{l}F_kF_l[\cos\{(l+k)\theta+k\gamma+l\delta-240(l+k)\}-\\\cos\{(l-k)\theta-k\gamma+l\delta-240(l-k)\}]+\\\dfrac{F_1I_1}{2}\cos(\alpha-s)+\dfrac{F_1I_m}{2}\cos\{(m-1)\theta-\alpha+mt\}+\\\dfrac{F_1I_n}{2}\cos\{(n-1)\theta-\alpha+nu\}-\\\dfrac{F_jI_1}{2}[\cos\{(j+1)\theta+j\beta+s-240(j+1)\}-\\\cos\{(j-1)\theta+j\beta-s-240(j-1)\}]-\\\dfrac{F_jI_m}{2}[\cos\{(j+m)\theta+j\beta+mt-240(j+1)\}-\\\cos\{(j-m)\theta+j\beta-mt-240(j-1)\}]-\\\dfrac{F_jI_n}{2}[\cos\{(j+n)\theta+j\beta+nu-240(j+1)\}-\\\cos\{(j-n)\theta+j\beta-nu-240(j-1)\}]-\\\dfrac{F_kI_1}{2}[\cos\{(k+1)\theta+k\gamma+s-240(k+1)\}-\\\cos\{(k-1)\theta+k\gamma-s-240(k-1)\}]-\\\dfrac{F_kI_m}{2}[\cos\{(k+m)\theta+k\gamma+mt-240(k+1)\}-\\\cos\{(k-m)\theta+k\gamma-mt-240(k-1)\}]-\\\dfrac{F_kI_n}{2}[\cos\{(k+n)\theta+k\gamma+nu-240(k+1)\}-\\\cos\{(k-n)\theta+k\gamma-nu-240(k-1)\}]-\\\dfrac{F_lI_1}{2}[\cos\{(l+1)\theta+l\delta+s-240(l+1)\}-\\\cos\{(l-1)\theta+l\delta-s-240(l-1)\}]-\\\dfrac{F_lI_m}{2}[\cos\{(l+m)\theta+l\delta+mt-240(l+1)\}-\\\cos\{(l-m)\theta+l\delta-mt-240(l-1)\}]-\\\dfrac{F_lI_n}{2}[\cos\{(l+n)\theta+l\delta+nu-240(l+1)\}-\\\cos\{(l-n)\theta+l\delta-nu-240(l-1)\}]\end{array}\right\}$$

$$N^2\left\{\begin{array}{l}\dfrac{1}{2}(I_1^2+I_m^2+I_n^2)+I_1I_m\cos\{(m-1)\theta-s+mt\}+\\I_1I_n\cos\{(n-1)\theta-s+nu\}+I_mI_n\cos\{(n-m)\theta-mt+nu\}\end{array}\right\}$$

Of the harmonics of the rotor magnetomotive force Fmag of a three-phase AC rotary electric machine, generally the third harmonic, the fifth harmonic, and the seventh harmonic are much more dominant than the other harmonics, though it depends on the number of poles and the number of stator slots; therefore, a description will be given below of the magnetic noise (sound) that has the fundamental frequency of the rotor magnetomotive force Fmag and contains the third, fifth, and seventh harmonics, for the case where no harmonic currents for altering the magnetic sound are superimposed.

The integer values (order values) are j=3, k=5, and L=7, which are substituted into the equations (7) to (9) to yield the following equations.

U phase

-continued $$\begin{cases}\text{Rotor magnetomotive force}\\F_{mag}=F_1\sin(\theta+\alpha)+F_3\sin 3(\theta+\beta)+F_5\sin 5(\theta+\gamma)+F_7\sin 7(\theta+\delta)\\\quad\text{Fundamental} \quad\text{3rd harmonic}\quad\text{5th harmonic}\quad\text{7th harmonic}\\\quad\text{(first harmonic)}\\\text{Stator current}\\I_{coil}=I_1\sin(\theta+s)\\\quad\text{Fundamental}\\\quad\text{(first harmonic)}\end{cases} \quad (16)$$

V phase $$\begin{cases}\text{Rotor magnetomotive force}\\F_{mag}=F_1\sin(\theta+\alpha-120)+F_3\sin 3(\theta+\beta-120)+\\\qquad F_5\sin 5(\theta+\gamma-120)+F_7\sin 7(\theta+\delta-120)\\\text{Stator current}\\I_{coil}=I_1\sin(\theta+s-120)\end{cases} \quad (17)$$

W phase $$\begin{cases}\text{Rotor magnetomotive force}\\F_{mag}=F_1\sin(\theta+\alpha-240)+F_3\sin 3(\theta+\beta-240)+\\\qquad F_5\sin 5(\theta+\gamma-240)+F_7\sin 7(\theta+\delta-240)\\\text{Stator current}\\I_{coil}=I_1\sin(\theta+s-240)\end{cases} \quad (18)$$

Substituting these equations (16), (17), and (18) into the equation (3), and setting m=0 (Im=0) and n=0 (In=0) since no harmonic currents are superimposed, the following equations are obtained.

PRIOR ART

U-phase excitation force $fu\propto$ (19)

$$\dfrac{1}{2}(F_1^2+F_3^2+F_5^2+F_7^2)-\dfrac{F_1^2}{2}\cos 2(\theta+\alpha)-$$

$$\dfrac{F_3^2}{2}\cos 6(\theta+\beta)-\dfrac{F_5^2}{2}\cos 10(\theta+\gamma)-\dfrac{F_7^2}{2}\cos 14(\theta+\delta)-$$

$$F_1F_3[\cos\{4\theta+\alpha+3\beta\}-\cos\{2\theta-\alpha+3\beta\}]-$$

$$F_1F_5[\cos\{6\theta+\alpha+5\gamma\}-\cos\{4\theta-\alpha+5\gamma\}]-$$

$$F_1F_7[\cos\{8\theta+\alpha+7\delta\}-\cos\{6\theta-\alpha+7\delta\}]-$$

$$F_3F_5[\cos\{8\theta+3\beta+5\gamma\}-\cos\{2\theta-3\beta+5\gamma\}]-$$

$$F_3F_7[\cos\{10\theta+3\beta+7\delta\}-\cos\{4\theta-3\beta+7\delta\}]-$$

$$F_5F_7[\cos\{12\theta+5\gamma+7\delta\}-\cos\{2\theta-5\gamma+7\delta\}]+$$

$$2N\left\{\begin{array}{l}-\dfrac{F_1I_1}{2}\{\cos(2\theta+\alpha+s)-\cos(\alpha-s)\}-\\\dfrac{F_3I_1}{2}[\cos\{4\theta+3\beta+s\}-\cos\{2\theta+3\beta-s\}]-\\\dfrac{F_5I_1}{2}[\cos\{6\theta+5\gamma+s\}-\cos\{4\theta+5\gamma-s\}]-\\\dfrac{F_7I_1}{2}[\cos\{8\theta+7\delta+s\}-\cos\{6\theta+7\delta-s\}]\end{array}\right\}+$$

-continued $$N^2 \left\{ \frac{1}{2} I_1^2 - \frac{I_1^2}{2} \cos 2(\theta + s) \right\}$$

V-phase excitation force $fv \propto$ (20)

$$\frac{1}{2}(F_1^2 + F_3^2 + F_5^2 + F_7^2) - \frac{F_1^2}{2}\cos 2(\theta + \alpha - 120) -$$

$$\frac{F_3^2}{2}\cos 6(\theta + \beta - 120) -$$

$$\frac{F_5^2}{2}\cos 10(\theta + \gamma - 120) - \frac{F_7^2}{2}\cos 14(\theta + \delta - 120) -$$

$$F_1 F_3 [\cos\{4\theta + \alpha + 3\beta - 480\} - \cos\{2\theta - \alpha + 3\beta - 240\}] -$$

$$F_1 F_5 [\cos\{6\theta + \alpha + 5\gamma - 720\} - \cos\{4\theta - \alpha + 5\gamma - 480\}] -$$

$$F_1 F_7 [\cos\{8\theta + \alpha + 7\delta - 960\} - \cos\{6\theta - \alpha + 7\delta - 720\}] -$$

$$F_3 F_5 [\cos\{8\theta + 3\beta + 5\gamma - 960\} - \cos\{2\theta - 3\beta + 5\gamma - 240\}] -$$

$$F_3 F_7 [\cos\{10\theta + 3\beta + 7\delta - 1200\} - \cos\{4\theta - 3\beta + 7\delta - 480\}] -$$

$$F_5 F_7 [\cos\{12\theta + 5\gamma + 7\delta - 1440\} - \cos\{2\theta - 5\gamma + 7\delta - 240\}] +$$

$$2N \left\{ \begin{array}{l} -\dfrac{F_1 I_1}{2}\{\cos(2\theta + \alpha + s - 240) - \cos(\alpha - s)\} - \\[4pt] \dfrac{F_3 I_1}{2}[\cos\{4\theta + 3\beta + s - 480\} - \cos\{2\theta + 3\beta - s - 240\}] - \\[4pt] \dfrac{F_5 I_1}{2}[\cos\{6\theta + 5\gamma + s - 720\} - \cos\{4\theta + 5\gamma - s - 480\}] - \\[4pt] \dfrac{F_7 I_1}{2}[\cos\{8\theta + 7\delta + s - 960\} - \cos\{6\theta + 7\delta - s - 720\}] \end{array} \right\} +$$

$$N^2 \left\{ \frac{1}{2} I_1^2 - \frac{I_1^2}{2} \cos 2(\theta + s - 120) \right\}$$

W-phase excitation force $fw \propto$ (21)

$$\frac{1}{2}(F_1^2 + F_3^2 + F_5^2 + F_7^2) - \frac{F_1^2}{2}\cos 2(\theta + \alpha - 240) -$$

$$\frac{F_3^2}{2}\cos 6(\theta + \beta - 240) -$$

$$\frac{F_5^2}{2}\cos 10(\theta + \gamma - 240) - \frac{F_7^2}{2}\cos 14(\theta + \delta - 240) -$$

$$F_1 F_3 [\cos\{4\theta + \alpha + 3\beta - 960\} - \cos\{2\theta - \alpha + j\beta - 480\}] -$$

$$F_1 F_5 [\cos\{6\theta + \alpha + 5\gamma - 1440\} - \cos\{4\theta - \alpha + 5\gamma - 960\}] -$$

$$F_1 F_7 [\cos\{8\theta + \alpha + 7\delta - 1920\} - \cos\{6\theta - \alpha + 7\delta - 1440\}] -$$

$$F_3 F_5 [\cos\{8\theta + 3\beta + 5\gamma - 1920\} - \cos\{2\theta - 3\beta + 5\gamma - 480\}] -$$

$$F_3 F_7 [\cos\{10\theta + 3\beta + 7\delta - 2400\} - \cos\{4\theta - 3\beta + 7\delta - 960\}] -$$

$$F_5 F_7 [\cos\{12\theta + 5\gamma + 7\delta - 2880\} - \cos\{2\theta - 5\gamma + 7\delta - 480\}] +$$

$$2N \left\{ \begin{array}{l} -\dfrac{F_1 I_1}{2}\{\cos(2\theta + \alpha + s - 480) - \cos(\alpha - s)\} - \\[4pt] \dfrac{F_3 I_1}{2}[\cos\{4\theta + 3\beta + s - 960\} - \cos\{2\theta + 3\beta - s - 480\}] - \\[4pt] \dfrac{F_5 I_1}{2}[\cos\{6\theta + 5\gamma + s - 1440\} - \cos\{4\theta + 5\gamma - s - 960\}] - \\[4pt] \dfrac{F_7 I_1}{2}[\cos\{8\theta + 7\delta + s - 1920\} - \cos\{6\theta + 7\delta - s - 1440\}] \end{array} \right\} +$$

$$N^2 \left\{ \frac{1}{2} I_1^2 - \frac{I_1^2}{2} \cos 2(\theta + s - 240) \right\}$$

Those terms for which the vector sum is zero are eliminated from the equations (19), (20), and (21), and the DC component terms and the terms where the constituent terms are in phase and therefore reinforcing each other are extracted to obtain the following equations.

U-phase excitation force (22)

$$fu \propto \frac{1}{2}(F_1^2 + F_3^2 + F_5^2 + F_7^2) - \frac{F_3^2}{2}\cos 6(\theta + \beta) -$$

$$F_1 F_5 \cos(6\theta + \alpha + 5\gamma) + F_1 F_7 \cos(6\theta - \alpha + 7\delta) -$$

$$F_5 F_7 \cos(12\theta + 5\gamma + 7\delta) + N\langle F_1 I_1 \cos(\alpha - s) -$$

$$F_5 I_1 \cos(6\theta + 5\gamma + s) + F_7 I_1 \cos(6\theta + 7\delta - s)\rangle + \frac{N^2}{2} I_1^2$$

V-phase excitation force (23)

$$f_v \propto \frac{1}{2}(F_1^2 + F_3^2 + F_5^2 + F_7^2) + \frac{F_3^2 \cos 6(\Theta + \beta - 120)}{2}$$

Same as $\frac{F_3^2 \cos 6(\Theta + \beta)}{2}$
Same as $F_1 F_7 \cos(6\Theta - \alpha + 7\delta)$
Same as $F_5 F_7 \cos(12\Theta + 5\gamma + 7\delta)$ $$- F_1 F_5 \cos(6\Theta + \alpha + 5\gamma - 720) + F_1 F_7 \cos(6\Theta - \alpha + 7\delta - 720) - F_5 F_7 \cos(12\Theta + 5\gamma + 7\delta - 1440)$$

$$+ N \Big\{ F_1 I_1 \cos(\alpha - s) - F_5 I_1 \cos(6\Theta + 5\gamma + s - 720) - F_7 I_1 \cos(6\Theta + 7\delta - s - 720) \Big\} + \frac{N^2}{2} I_1^2$$

Same as $F_1 F_5 \cos(6\Theta + \alpha + 5\gamma)$
Same as $F_5 I_1 \cos(6\Theta + 5\gamma + s)$
Same as $F_7 I_1 \cos(6\Theta + 7\delta - s)$ W-phase excitation force (24)

$$f_w \propto \frac{1}{2}(F_1^2 + F_3^2 + F_5^2 + F_7^2) + \frac{F_3^2 \cos 6(\Theta + \beta - 240)}{2}$$

Same as $\frac{F_3^2 \cos(6\Theta + \beta)}{2}$
Same as $F_1 F_7 \cos(6\Theta - \alpha + 7\delta)$
Same as $F_5 F_7 \cos(12\Theta + 5\gamma + 7\delta)$ $$- F_1 F_5 \cos(6\Theta + \alpha + 5\gamma - 1440) + F_1 F_7 \cos(6\Theta - \alpha + 7\delta - 1440) - F_5 F_7 \cos(12\Theta + 5\gamma + 7\delta - 2880)$$

$$+ N \Big\{ F_1 I_1 \cos(\alpha - s) - F_5 I_1 \cos(6\Theta + 5\gamma + s - 1440) + F_7 I_1 \cos(6\Theta + 7\delta - s - 1440) \Big\} + \frac{N^2}{2} I_1^2$$

Same as $F_1 F_5 \cos(6\Theta + \alpha + 5\gamma)$
Same as $F_5 I_1 \cos(6\Theta + 5\gamma + s)$
Same as $F_7 I_1 \cos(6\Theta + 7\delta - s)$ Hence, the sum of the excitation forces, obtained by summing together the equations (22), (23), and (24), is given by the following equation (25).

$$f_u + f_v + f_w \propto \underbrace{\frac{3}{2}(F_1^2 + F_3^2 + F_5^2 + F_7^2) + 3NF_1 I_1 \cos(\alpha - s) + \frac{3N^2}{2} I_1^2 -}_{(1)}$$

$$\underbrace{\frac{3F_3^2}{2} \cos 6(\theta + \beta)}_{(2)} - \underbrace{3F_1 F_5 \cos(6\theta + \alpha + 5\gamma)}_{(3)} -$$

$$\underbrace{3F_1 F_7 \cos(6\theta - \alpha + 7\delta)}_{(4)} - \underbrace{3F_5 F_7 \cos(12\theta - 5\gamma + 7\delta))}_{(5)} +$$

$$\underbrace{3N \langle -F_5 I_1 \cos(6\theta + 5\gamma + s)}_{(6)} + \underbrace{F_7 I_1 \cos(6\theta + 7\delta - s) \rangle}_{(7)}$$

Term (1): DC component . . . No pulsation, hence no magnetic sound

Term (2): Sixth component occurring due to the third harmonic of the rotor magnetomotive force Term (3): Sixth component occurring due to the first and fifth harmonics of the rotor magnetomotive force Term (4): Sixth component occurring due to the first and seventh harmonics of the rotor magnetomotive force Term (5): 12th component occurring due to the fifth and seventh harmonics of the rotor magnetomotive force Term (6): Sixth component occurring due to the fifth harmonic of the rotor magnetomotive force and the first harmonic of the stator current.

Term (7): Sixth component occurring due to the seventh harmonic of the rotor magnetomotive force and the first harmonic of the stator current These sixth and 12th excitation force pulsation components (term (2)–(7)) cause magnetic sound.

In the equation (25), the term (1) is the DC component term in the sum of the excitation forces; this term does not pulsate, and therefore does not cause magnetic sound.

On the other hand, the term (2) is the sixth harmonic component occurring due to the third harmonic of the rotor magnetomotive force Fmag, the term (3) is the sixth harmonic component occurring due to the first and fifth harmonics of the rotor magnetomotive force Fmag, the term (4) is the sixth harmonic component occurring due to the first and seventh harmonics of the rotor magnetomotive force Fmag, the term (5) is the 12th harmonic component occurring due to the fifth and seventh harmonics of the rotor magnetomotive force Fmag, the term (6) is the sixth harmonic component occurring due to the fifth harmonic of the rotor magnetomotive force Fmag and the first current component (fundamental) of the stator current, and the term (7) is the sixth harmonic component occurring due to the seventh harmonic of the rotor magnetomotive force Fmag and the first current component (fundamental) of the stator current. These sixth and 12th excitation force pulsation components cause magnetic noise.

That is, it can be seen from the equation (25) that the magnetic noise of the three-phase AC rotary electric machine is caused by the sixth and 12th magnetic noise components occurring due to the fundamental component and the third, fifth, and seventh harmonic components of the rotor magnetomotive force Fmag.

With this in mind, a description will be given below of the case where the seventh and 13th harmonic components are superimposed on the stator current Icoil in order to alter (reduce or increase) the sixth and 12th magnetic sound components.

In this case, setting j=3, k=5, L=7, m=7, and n=13 in the equations (7), (8), and (9), the following equations are obtained.

U phase (26)

$$\begin{cases} \text{Rotor magnetomotive force} \\ F_{mag} = \underset{\text{Fundamental}}{F_1\sin(\theta+\alpha)} + \underset{\text{3rd harmonic}}{F_3\sin3(\theta+\beta)} + \underset{\text{5th harmonic}}{F_5\sin5(\theta+\gamma)} + \underset{\text{7th harmonic}}{F_7\sin7(\theta+\delta)} \\ \text{(first harmonic)} \\ \text{Stator current} \\ I_{coil} = \underset{\text{Fundamental}}{I_1\sin(\theta+s)} + \underset{\text{7th harmonic}}{I_7\sin7(\theta+t)} + \underset{\text{13th harmonic}}{I_{13}\sin13(\theta+u)} \\ \text{(first harmonic)} \end{cases}$$

V phase (27)

$$\begin{cases} \text{Rotor magnetomotive force} \\ F_{mag} = F_1\sin(\theta+\alpha-120) + F_3\sin3(\theta+\beta-120) + \\ \qquad F_5\sin5(\theta+\gamma-120) + F_7\sin7(\theta+\delta-120) \\ \text{Stator current} \\ I_{coil} = I_1\sin(\theta+s-120) + I_7\sin\{7(\theta+t)-120\} + \\ \qquad I_{13}\sin\{13(\theta+u)-120\} \end{cases}$$

W phase (28)

$$\begin{cases} \text{Rotor magnetomotive force} \\ F_{mag} = F_1\sin(\theta+\alpha-240) + F_3\sin3(\theta+\beta-240) + \\ \qquad F_5\sin5(\theta+\gamma-240) + F_7\sin7(\theta+\delta-240) \\ \text{Stator current} \\ I_{coil} = I_1\sin(\theta+s-240) + I_7\sin\{7(\theta+t)-240\} + \\ \qquad I_{13}\sin\{13(\theta+u)-240\} \end{cases}$$

Calculating the equations (10), (11), and (12) using the equations (26), (27), and (28), the following equations are obtained.

U-phase excitation force
— Inphase term which, when vector summed between the three phases, contributes to producing reinforcement
- - - - Term for which the vector sum between the three phases is zero.

$$fu \propto \frac{1}{2}(F_1^2+F_3^2+F_5^2+F_7^2) - \frac{F_1^2}{2}\cos2(\theta+\alpha) - \frac{F_3^2}{2}\cos6(\theta+\beta) - \frac{F_5^2}{2}\cos10(\theta+\gamma) - \frac{F_7^2}{2}\cos14(\theta+\delta) -$$

$$F_1F_3\big[\cos\{4\theta+\alpha+3\beta\} - \cos\{2\theta-\alpha+3\beta\}\big] - F_1F_5\big[\underline{\cos\{6\theta+\alpha+5\gamma\}} - \cos\{4\theta-\alpha+5\gamma\}\big] -$$

$$F_1F_7[\cos\{8\theta+\alpha+7\delta\} - \underline{\cos\{6\theta-\alpha+7\delta\}}] - F_3F_5\big[\cos\{8\theta+3\beta+5\gamma\} - \cos\{2\theta-3\beta+5\gamma\}\big] -$$

$$F_3F_7\big[\underline{\cos\{10\theta+3\beta+7\delta\}} - \cos\{4\theta-3\beta+7\delta\}\big] - F_5F_7\big[\underline{\cos\{12\theta+5\gamma+7\delta\}} - \cos\{2\theta-5\gamma+7\delta\}\big] +$$

(29)

$$2N\Bigg\{\begin{array}{l} -\dfrac{F_1I_1}{2}\{\cos(2\theta+\alpha+s) - \cos(\alpha-s)\} - \dfrac{F_1I_7}{2}\big[\cos\{8\theta+\alpha+7t\} - \underline{\cos\{6\theta-\alpha+7t\}}\big] - \\[4pt] \dfrac{F_1I_{13}}{2}\big[\cos\{14\theta+\alpha+13u\} - \underline{\cos\{12\theta-\alpha+13u\}}\big] - \dfrac{F_3I_1}{2}\big[\cos\{4\theta+3\beta+s\} - \cos\{2\theta+3\beta-s\}\big] - \\[4pt] \dfrac{F_3I_7}{2}\big[\cos\{10\theta+3\beta+7t\} - \cos\{4\theta-3\beta+7t\}\big] - \dfrac{F_3I_{13}}{2}\big[\cos\{16\theta+3\beta+13u\} - \cos\{10\theta-3\beta+13u\}\big] - \\[4pt] \dfrac{F_5I_1}{2}\big[\cos\{6\theta+5\gamma+s\} - \cos\{4\theta+5\gamma-s\}\big] - \dfrac{F_5I_7}{2}\big[\cos\{12\theta+5\gamma+7t\} - \cos\{2\theta-5\gamma+7t\}\big] - \\[4pt] \dfrac{F_5I_{13}}{2}\big[\cos\{18\theta+5\gamma+13u\} - \cos\{8\theta-5\gamma+13u\}\big] - \dfrac{F_7I_1}{2}\big[\cos\{8\theta+7\delta+s\} - \underline{\cos\{6\theta+7\delta-s\}}\big] - \\[4pt] \dfrac{F_7I_7}{2}\big[\cos(14\theta+7\delta+7t) - \cos\{7\delta-7t\}\big] - \dfrac{F_7I_{13}}{2}\big[\cos\{20\theta+7\delta+13u\} - \underline{\cos\{6\theta-7\delta+13u\}}\big] \end{array}\Bigg\} +$$

$$N^2\Bigg\{\begin{array}{l} \dfrac{1}{2}(I_1^2+I_7^2+I_{13}^2) - \dfrac{I_1^2}{2}\cos2(\theta+s) - \dfrac{I_7^2}{2}\cos14(\theta+t) - \dfrac{I_{13}^2}{2}\cos26(\theta+u) - I_1I_7[\cos\{8\theta+s+7t\} - \underline{\cos\{6\theta-s+7t\}}] - \\[4pt] I_1I_{13}\big[\cos\{14\theta+s+13u\} - \underline{\cos\{12\theta-s+13u\}}\big] - I_7I_{13}\big[\cos\{20\theta+7t+13u\} - \underline{\cos\{6\theta+7t-13u\}}\big] \end{array}\Bigg\}$$

V-phase excitation force
— Inphase term which, when vector summed between the three phases, contributes to producing reinforcement
- - - - Term for which the vector sum between the three phases is zero.

-continued $$fu \propto \frac{1}{2}(F_1^2 + F_3^2 + F_5^2 + F_7^2) - \frac{F_1^2}{2}\cos2(\theta + \alpha - 120) - \frac{F_3^2}{2}\cos6(\theta + \beta - 120) - \frac{F_5^2}{2}\cos10(\theta + \gamma - 120) - \frac{F_7^2}{2}\cos14(\theta + \delta - 120) -$$

$$F_1F_3\left[\cos\{4\theta + \alpha + 3\beta - 480\} - \cos\{2\theta - \alpha + 3\beta - 240\}\right] - F_1F_5\left[\cos\{6\theta + \alpha + 5\gamma - 720\} - \cos\{4\theta - \alpha + 5\gamma - 480\}\right] -$$

$$F_1F_7\left[\cos\{8\theta + \alpha + 7\delta - 960\} - \cos\{6\theta - \alpha + 7\delta - 720\}\right] - F_3F_5\left[\cos\{8\theta + 3\beta + 5\gamma - 960\} - \cos\{2\theta - 3\beta + 5\gamma - 240\}\right] -$$

$$F_3F_7\left[\cos\{10\theta + 3\beta + 7\delta - 1200\} - \cos\{4\theta - 3\beta + 7\delta - 480\}\right] - F_5F_7\left[\cos\{12\theta + 5\gamma + 7\delta - 1440\} - \cos\{2\theta - 5\gamma + 7\delta - 240\}\right] +$$

$$2N\left\{\begin{array}{l} -\frac{F_1I_1}{2}\{\cos(2\theta + \alpha + s - 240) - \cos(\alpha - s)\} - \frac{F_1I_7}{2}\left[\cos\{8\theta + \alpha + 7t - 240\} - \cos\{6\theta - \alpha + 7t\}\right] - \\ \frac{F_1I_{13}}{2}\left[\cos\{14\theta + \alpha + 13u - 240\} - \cos\{12\theta - \alpha + 13u\}\right] - \frac{F_3I_1}{2}\left[\cos\{4\theta + 3\beta + s - 480\} - \cos\{2\theta + 3\beta - s - 240\}\right] - \\ \frac{F_3I_7}{2}\left[\cos\{10\theta + 3\beta + 7t - 480\} - \cos\{4\theta - 3\beta + 7t + 240\}\right] - \frac{F_3I_{13}}{2}\left[\cos\{16\theta + 3\beta + 13u - 480\} - \cos\{10\theta - 3\beta + 13u + 240\}\right] - \\ \frac{F_5I_1}{2}\left[\cos\{6\theta + 5\gamma + s - 720\} - \cos\{4\theta + 5\gamma - s - 480\}\right] - \frac{F_5I_7}{2}\left[\cos\{12\theta + 5\gamma + 7t - 720\} - \cos\{2\theta - 5\gamma + 7t + 480\}\right] - \\ \frac{F_5I_{13}}{2}\left[\cos\{18\theta + 5\gamma + 13u - 720\} - \cos\{8\theta - 5\gamma + 13u + 480\}\right] - \frac{F_7I_1}{2}\left[\cos\{8\theta + 7\delta + s - 960\} - \cos\{6\theta + 7\delta - s - 720\}\right] - \\ \frac{F_7I_7}{2}\left[\cos(14\theta + 7\delta + 7t - 960) - \cos\{7\delta - 7t - 720\}\right] - \frac{F_7I_{13}}{2}\left[\cos\{20\theta + 7\delta + 13u - 960\} - \cos\{6\theta - 7\delta + 13u + 720\}\right] \end{array}\right\} +$$

$$N^2\left\{\begin{array}{l} \frac{1}{2}(I_1^2 + I_7^2 + I_{13}^2) - \frac{I_1^2}{2}\cos2(\theta + s - 120) - \frac{I_7^2}{2}\cos14(\theta + t) - 240) - \frac{I_{13}^2}{2}\cos(26(\theta + u) - 240) - I_1I_7\left[\cos\{8\theta + s + 7t - 240\} - \cos\{6\theta - s + 7t\}\right] - \\ I_1I_{13}\left[\cos\{14\theta + s + 13u - 240\} - \cos\{12\theta - s + 13u\}\right] - I_7I_{13}\left[\cos\{20\theta + 7t + 13u - 240\} - \cos\{6\theta - 7t + 13u\}\right] \end{array}\right\}$$

(30)

W-phase excitation force ———— Inphase term which, when vector summed between contributes to producing reinforcement – – – – Term for which the vector sum between the three phases is zero.

$$fu \propto \frac{1}{2}(F_1^2 + F_3^2 + F_5^2 + F_7^2) - \frac{F_1^2}{2}\cos2(\theta + \alpha - 240) - \frac{F_3^2}{2}\cos6(\theta + \beta - 240) - \frac{F_5^2}{2}\cos10(\theta + \gamma - 240) - \frac{F_7^2}{2}\cos14(\theta + \delta - 240) -$$

$$F_1F_3\left[\cos\{4\theta + \alpha + 3\beta - 960\} - \cos\{2\theta - \alpha + 3\beta - 480\}\right] - F_1F_5\left[\cos\{6\theta + \alpha + 5\gamma - 1440\} - \cos\{4\theta - \alpha + 5\gamma - 960\}\right] -$$

$$F_1F_7\left[\cos\{8\theta + \alpha + 7\delta - 1920\} - \cos\{6\theta - \alpha + 7\delta - 1440\}\right] - F_3F_5\left[\cos\{8\theta + 3\beta + 5\gamma - 1920\} - \cos\{2\theta - 3\beta + 5\gamma - 480\}\right] -$$

$$F_3F_7\left[\cos\{10\theta + 3\beta + 7\delta - 2400\} - \cos\{4\theta - 3\beta + 7\delta - 960\}\right] - F_5F_7\left[\cos\{12\theta + 5\gamma + 7\delta - 2880\} - \cos\{2\theta - 5\gamma + 7\delta - 480\}\right] +$$

$$2N\left\{\begin{array}{l} -\frac{F_1I_1}{2}\{\cos(2\theta + \alpha + s - 480) - \cos(\alpha - s)\} - \frac{F_1I_7}{2}\left[\cos\{8\theta + \alpha + 7t - 480\} - \cos\{6\theta - \alpha + 7t\}\right] - \\ \frac{F_1I_{13}}{2}\left[\cos\{14\theta + \alpha + 13u - 480\} - \cos\{12\theta - \alpha + 13u\}\right] - \frac{F_3I_1}{2}\left[\cos\{4\theta + 3\beta + s - 960\} - \cos\{2\theta + 3\beta - s - 480\}\right] - \\ \frac{F_3I_7}{2}\left[\cos\{10\theta + 3\beta + 7t - 960\} - \cos\{4\theta - 3\beta + 7t + 480\}\right] - \frac{F_3I_{13}}{2}\left[\cos\{16\theta + 3\beta + 13u - 960\} - \cos\{10\theta - 3\beta + 13u + 480\}\right] - \\ \frac{F_5I_1}{2}\left[\cos\{6\theta + 5\gamma + s - 1440\} - \cos\{4\theta + 5\gamma - s - 960\}\right] - \frac{F_5I_7}{2}\left[\cos\{12\theta + 5\gamma + 7t - 1440\} - \cos\{2\theta - 5\gamma + 7t + 960\}\right] - \\ \frac{F_5I_{13}}{2}\left[\cos\{18\theta + 5\gamma + 13u - 1440\} - \cos\{8\theta - 5\gamma + 13u + 960\}\right] - \frac{F_7I_1}{2}\left[\cos\{8\theta + 7\delta + s - 1920\} - \cos\{6\theta + 7\delta - s - 1440\}\right] - \\ \frac{F_7I_7}{2}\left[\cos(14\theta + 7\delta + 7t - 1920) - \cos\{7\delta - 7t - 1440\}\right] - \frac{F_7I_{13}}{2}\left[\cos\{20\theta + 7\delta + 13u - 1920\} - \cos\{6\theta - 7\delta + 13u + 1440\}\right] \end{array}\right\} +$$

$$N^2\left\{\begin{array}{l} \frac{1}{2}(I_1^2 + I_7^2 + I_{13}^2) - \frac{I_1^2}{2}\cos2(\theta + s - 240) - \frac{I_7^2}{2}\cos14(\theta + t) - 480) - \frac{I_{13}^2}{2}\cos(26(\theta + u) - 480) - I_1I_7\left[\cos\{8\theta + s + 7t - 480\} - \cos\{6\theta - s + 7t\}\right] - \\ I_1I_{13}\left[\cos\{14\theta + s + 13u - 480\} - \cos\{12\theta - s + 13u\}\right] - I_7I_{13}\left[\cos\{20\theta + 7t + 13u - 480\} - \cos\{6\theta - 7t + 13u\}\right] \end{array}\right\}$$

(31)

In the equations (29), (30), and (31), the terms that are in phase and therefore reinforcing each other in the vector sum of the three phase are underlined with a solid line, while the terms for which the vector sum is zero are underlined with a dashed line. When the terms for which the vector sum is zero are eliminated from the equations (29), (30), and (31), and the DC component terms and the terms that are in phase and therefore reinforcing each other are extracted, the following equations are obtained.

$$fu \propto \frac{1}{2}(F_1^2 + F_3^2 + F_5^2 + F_7^2) - \frac{F_3^2}{2}\cos 6(\theta + \beta) - F_1 F_5 \cos(6\theta + \alpha + 5\gamma) + F_1 F_7 \cos(6\theta - \alpha + 7\delta) - F_5 F_7 \cos(12\theta + 5\gamma + 7\delta) + \quad (32)$$

$$2N\left\{\frac{F_1 I_1}{2}\cos(a-s) + \frac{F_1 I_7}{2}\cos(6\theta - a + 7t) + \frac{F_1 I_{13}}{2}\cos(12\theta - a + 13u) - \frac{F_5 I_1}{2}\cos(6\theta + 5\gamma + s) - \frac{F_5 I_7}{2}\cos(12\theta + 5\gamma + 7t) - \frac{F_5 I_{13}}{2}\cos(18\theta + 5\gamma + 13u) + \frac{F_7 I_1}{2}\cos(6\theta + 7\delta - s) + \frac{F_7 I_7}{2}\cos(7\delta - 7t) + \frac{F_7 I_{13}}{2}\cos(6\theta - 7\delta + 13u)\right\} +$$

$$N^2\left\{\frac{1}{2}(I_1^2 + I_7^2 + I_{13}^2) + I_1 I_7 \cos(6\theta - s + 7t) + I_1 I_{13}\cos(12\theta - s + 13u) + I_7 I_{13}\cos(6\theta + 7t - 13u)\right\}$$

$$fv \propto \frac{1}{2}(F_1^2 + F_3^2 + F_5^2 + F_7^2) - \frac{F_3^2}{2}\cos 6(\theta + \beta - 120) - F_1 F_5 \cos(6\theta + \alpha + 5\gamma - 720) + F_1 F_7 \cos(6\theta - \alpha + 7\delta - 720) - F_5 F_7 \cos(12\theta + 5\gamma + 7\delta - 1440) + \quad (33)$$

$$2N\left\{\frac{F_1 I_1}{2}\cos(a-s) + \frac{F_1 I_7}{2}\cos(6\theta - a + 7t) + \frac{F_1 I_{13}}{2}\cos(12\theta - a + 13u) - \frac{F_5 I_1}{2}\cos(6\theta + 5\gamma + s - 720) - \frac{F_5 I_7}{2}\cos(12\theta + 5\gamma + 7t - 720) - \frac{F_5 I_{13}}{2}\cos(18\theta + 5\gamma + 13u - 720) + \frac{F_7 I_1}{2}\cos(6\theta + 7\delta - s - 720) + \frac{F_7 I_7}{2}\cos(7\delta - 7t - 720) + \frac{F_7 I_{13}}{2}\cos(6\theta - 7\delta + 13u + 720)\right\} +$$

$$N^2\left\{\frac{1}{2}(I_1^2 + I_7^2 + I_{13}^2) + I_1 I_7 \cos(6\theta - s + 7t) + I_1 I_{13}\cos(12\theta - s + 13u) + I_7 I_{13}\cos(6\theta - 7t + 13u)\right\}$$

$$fw \propto \frac{1}{2}(F_1^2 + F_3^2 + F_5^2 + F_7^2) - \frac{F_3^2}{2}\cos 6(\theta + \beta - 240) - F_1 F_5 \cos(6\theta + \alpha + 5\gamma - 1440) + F_1 F_7 \cos(6\theta - \alpha + 7\delta - 1440) - F_5 F_7 \cos(12\theta + 5\gamma + 7\delta - 2880) + \quad (34)$$

$$2N\left\{\frac{F_1 I_1}{2}\cos(a-s) + \frac{F_1 I_7}{2}\cos(6\theta - a + 7t) + \frac{F_1 I_{13}}{2}\cos(12\theta - a + 13u) - \frac{F_5 I_1}{2}\cos(6\theta + 5\gamma + s - 1440) - \frac{F_5 I_7}{2}\cos(12\theta + 5\gamma + 7t - 1440) - \frac{F_5 I_{13}}{2}\cos(18\theta + 5\gamma + 13u - 1440) + \frac{F_7 I_1}{2}\cos(6\theta + 7\delta - s - 1440) + \frac{F_7 I_7}{2}\cos(7\delta - 7t - 1440) + \frac{F_7 I_{13}}{2}\cos(6\theta - 7\delta + 13u + 1440)\right\} +$$

$$N^2\left\{\frac{1}{2}(I_1^2 + I_7^2 + I_{13}^2) + I_1 I_7 \cos(6\theta - s + 7t) + I_1 I_{13}\cos(12\theta - s + 13u) + I_7 I_{13}\cos(6\theta - 7t + 13u)\right\}$$

Arranging the above equations similarly to the equation (25), the sum of the respective excitation forces is given by the following equation.

$$fu + fv + fw \propto \tag{35}$$

$$\underbrace{\frac{3}{2}(F_1^2 + F_3^2 + F_5^2 + F_7^2) + \frac{3}{2}N^2(I_1^2 + I_7^2 + I_{13}^2) + 3NF_1I_1\cos(\alpha - s) + 3NF_7I_7\cos(7\delta - 7t) -}_{(1)}$$

$$\underbrace{\frac{3F_3^2}{2}\cos 6(\theta + \beta)}_{(2)} - \underbrace{3F_1F_5\cos(6\theta + \alpha + 5\gamma)}_{(3)} + \underbrace{3F_1F_7\cos(6\theta - \alpha + 7\delta)}_{(4)} - \underbrace{3F_5F_7\cos(12\theta + 5\gamma + 7\delta)}_{(5)} +$$

$$N\left\{ \underbrace{3F_1I_7\cos(6\theta - \alpha + 7t)}_{(8)} + \underbrace{3F_1F_{13}\cos(12\theta - \alpha + 13u)}_{(9)} - \underbrace{3F_5F_1\cos(6\theta + 5\gamma + s)}_{(6)} - \right.$$
$$\left. \underbrace{3F_5I_7\cos(12\theta + 5\gamma + 7t)}_{(10)} - \underbrace{3F_5I_{13}\cos(18\theta + 5\gamma + 13u)}_{(11)} + \underbrace{3F_7I_1\cos(6\theta + 7\delta - s)}_{(7)} + \underbrace{3F_7I_{13}\cos(6\theta - 7\delta + 13u)}_{(12)} \right\} +$$

$$N^2\left\{ \underbrace{3I_1I_7\cos(6\theta - s + 7t)}_{(13)} + \underbrace{3I_1I_{13}\cos(12\theta - s + 13u)}_{(14)} + \underbrace{3I_7I_{13}\cos(6\theta + 7t - 13u)}_{(15)} \right\}$$

Term (1): DC component
Term (2): Sixth component occurring due to the third harmonic of the rotor magnetomotive force
Term (3): Sixth component occurring due to the first and fifth harmonics of the rotor magnetomotive force
Term (4): Sixth component occurring due to the first and seventh harmonics of the rotor magnetomotive force
Term (5): 12th component occurring due to the fifth and seventh harmonics of the rotor magnetomotive force
Term (6): Sixth component occurring due to the fifth harmonic of the rotor magnetomotive force and the first harmonic of the stator current
Term (7): Sixth component occurring due to the seventh harmonic of the rotor magnetomotive force and the first harmonic of the stator current
Terms occurring when the seventh and 13th harmonics of the stator current are superimposed
Term (8): Sixth component occurring due to the first harmonic of the rotor magnetomotive force and the seventh harmonic of the stator current
Term (9): 12th component occurring due to the first harmonic of the rotor magnetomotive force and the 13th harmonic of the stator current
Term (10): 12th component occurring due to the fifth harmonic of the rotor magnetomotive force and the seventh harmonic of the stator current
Term (11): 18th component occurring due to the fifth harmonic of the rotor magnetomotive force and the 13th harmonic of the stator current
Term (12): Sixth component occurring due to the seventh harmonic of the rotor magnetomotive force and the 13th harmonic of the stator current
Term (13): Sixth component occurring due to the first and seventh harmonics of the stator current
Term (14): 12th component occurring due to the first and 13th harmonics of the stator current
Term (15): Sixth component occurring due to the seventh and 13th harmonics of the stator current In the equation (35), the term (1) is the DC component term, the term (2) is the sixth harmonic component occurring due to the third harmonic of the rotor magnetomotive force Fmag, the term (3) is the sixth harmonic component occurring due to the first and fifth harmonics of the rotor magnetomotive force Fmag, the term (4) is the sixth harmonic component occurring due to the first and seventh harmonics of the rotor magnetomotive force Fmag, the term (5) is the 12th harmonic component occurring due to the fifth and seventh harmonics of the rotor magnetomotive force Fmag, the term (6) is the sixth harmonic component occurring due to the fifth harmonic of the rotor magnetomotive force Fmag and the first current component (fundamental) of the stator current, and the term (7) is the sixth harmonic component occurring due to the seventh harmonic of the rotor magnetomotive force Fmag and the first current component (fundamental) of the stator current.

Further, the term (8) is the sixth harmonic component occurring due to the first harmonic (fundamental) of the rotor magnetomotive force Fmag and the seventh harmonic of the stator current, the term (9) is the 12th harmonic component occurring due to the first harmonic (fundamental) of the rotor magnetomotive force Fmag and the 13th harmonic of the stator current, the term (10) is the 12th harmonic component occurring due to the fifth harmonic of the rotor magnetomotive force Fmag and the seventh harmonic of the stator current, the term (11) is the 18th harmonic component occurring due to the fifth harmonic of the rotor magnetomotive force Fmag and the 13th harmonic of the stator current, the term (12) is the sixth harmonic component occurring due to the seventh harmonic of the rotor magnetomotive force Fmag and the 13th harmonic of the stator current, the term (13) is the sixth harmonic component occurring due to the first (fundamental) and seventh harmonics of the stator current, the term (14) is the 12th harmonic component occurring due to the first (fundamental) and 13th harmonics of the stator current, and the term (15) is the sixth harmonic component occurring due to the seventh and 13th harmonics of the stator current.

After all, the sum of the excitation forces shown by the equation (35) consists of the sixth and 12th harmonics; therefore, by suitably setting the phase angle and amplitude of each of the terms (2), (3), (4), (6), (7), (8), (12), (13), and (15), the vector sum of the terms (2), (3), (4), (6), (7), (8), (12), (13), and (15) can be made equal to zero or reduced or increased, thereby canceling or reducing (or increasing) the sixth harmonic of the magnetic noise. Likewise, by suitably setting the phase angle and amplitude of each of the terms (5), (9), (10), and (14), the vector sum of the terms (5), (9), (10), and (14) can be made equal to zero or reduced or increased, thereby canceling or reducing (or increasing) the 12th harmonic of the magnetic noise.

That is, in the equation (35), by suitably adjusting the phases and amplitudes of the seventh and 13th harmonic current components, the respective sums of the terms shown in the equation (35), excluding the DC component term, can be made equal to zero, to cancel or reduce (or increase) the sixth and 12th harmonics of the magnetic sound which are the most critical sound factors in the three-phase AC rotary electric machine.

The condition for canceling the sixth harmonic of the magnetic sound is shown by the following equation.

(1) Cancellation of the Sixth Harmonic

The equation "Vector sum of the magnetic sound terms ((2)+(3)+(4)+(6)+(7))+Vector sum of the canceling terms ((8)+(12)+(13)+(15))=0" holds.

$$-\frac{3F_3^2}{2}\cos6(\theta+\beta)-3F_1F_5\cos(6\theta+\alpha+5\gamma)+3F_1F_7\cos(6\theta-\alpha+7\delta)-3NF_5I_1\cos(6\theta+5\gamma+s)+3NF_7I_1\cos(6\theta+7\delta-s)+ \underbrace{\qquad\qquad\qquad\qquad\qquad\qquad\qquad\qquad\qquad\qquad\qquad\qquad\qquad\qquad\qquad\qquad\qquad\qquad\qquad\qquad\qquad\qquad\qquad}_{\text{Vector sum of magnetic noise terms}}$$
$$\underbrace{N\langle 3F_1I_7\cos(6\theta-\alpha+7t)+3F_7I_{13}\cos(6\theta-7\delta+13u)\rangle+N^2\langle 3I_1I_7\cos(6\theta-s+7t)+3I_7I_{13}\cos(6\theta+7t-13u)\rangle}_{\text{Canceling terms}}=0 \quad (36)$$

In the equation (36), the sum or difference of the terms underlined with a dashed line indicates the vector sum of the sixth harmonics of the radially acting magnetic excitation force that contribute to the generation of the magnetic sound, and the sum or difference of the terms underlined with a solid line indicates the vector sum of the sixth harmonics of the excitation force occurring due to the canceling harmonic current. Accordingly, in the equation (36), the phase angle and amplitude should be set so as to make the sum of these vector sums equal to zero. The condition for canceling the 12th harmonic of the magnetic noise is shown by the following equation.

(2) Cancellation of the 12th Harmonic

Vector sum of the magnetic noise terms (5)+Vector sum of the canceling terms ((9)+(10)+(14))=0

$$\underbrace{-3F_5F_7\cos(12\theta+5\gamma+7\delta)+}_{\text{Vector sum of magnetic noise terms}}$$
$$\underbrace{N\langle+3F_1I_{13}\cos(12\theta-\alpha+13u)-3F_5I_7\cos(12\theta+5\gamma+7t)\rangle+N^2\langle 3I_1I_{13}\cos(12\theta-s+13u)\rangle}_{\text{Canceling terms}}=0 \quad (37)$$

In the equation (37), the sum or difference of the terms underlined with a dashed line indicates the vector sum of the 12th harmonics that contribute to the generation of the magnetic sound, and the sum or difference of the terms underlined with a solid line indicates the vector sum of the 12th harmonics of the excitation force occurring due to the canceling harmonic current. Accordingly, in the equation (37), the phase angle and amplitude should be set so as to make the sum of these vector sums equal to zero.

In the above equations (35), (36), and (37), as θ, as a function of the number of revolutions, changes from moment to moment, the amplitudes and phases of the harmonic currents for controlling the sum of magnetic sound shown by the equation (35) to the prescribed level also change from moment to moment as the number of revolutions and the phase and amplitude of the fundamental wave change with time. Likewise, the amplitudes and phases of the harmonic currents, that satisfy the equations (36) and (37), also change from moment to moment. Accordingly, the amplitudes and phases of the harmonic currents to be superimposed are computed at every predetermined time interval in accordance with the frequency, phase, and amplitude of the fundamental current.

CIRCUIT CONFIGURATION EXAMPLE 1

Figure 3:
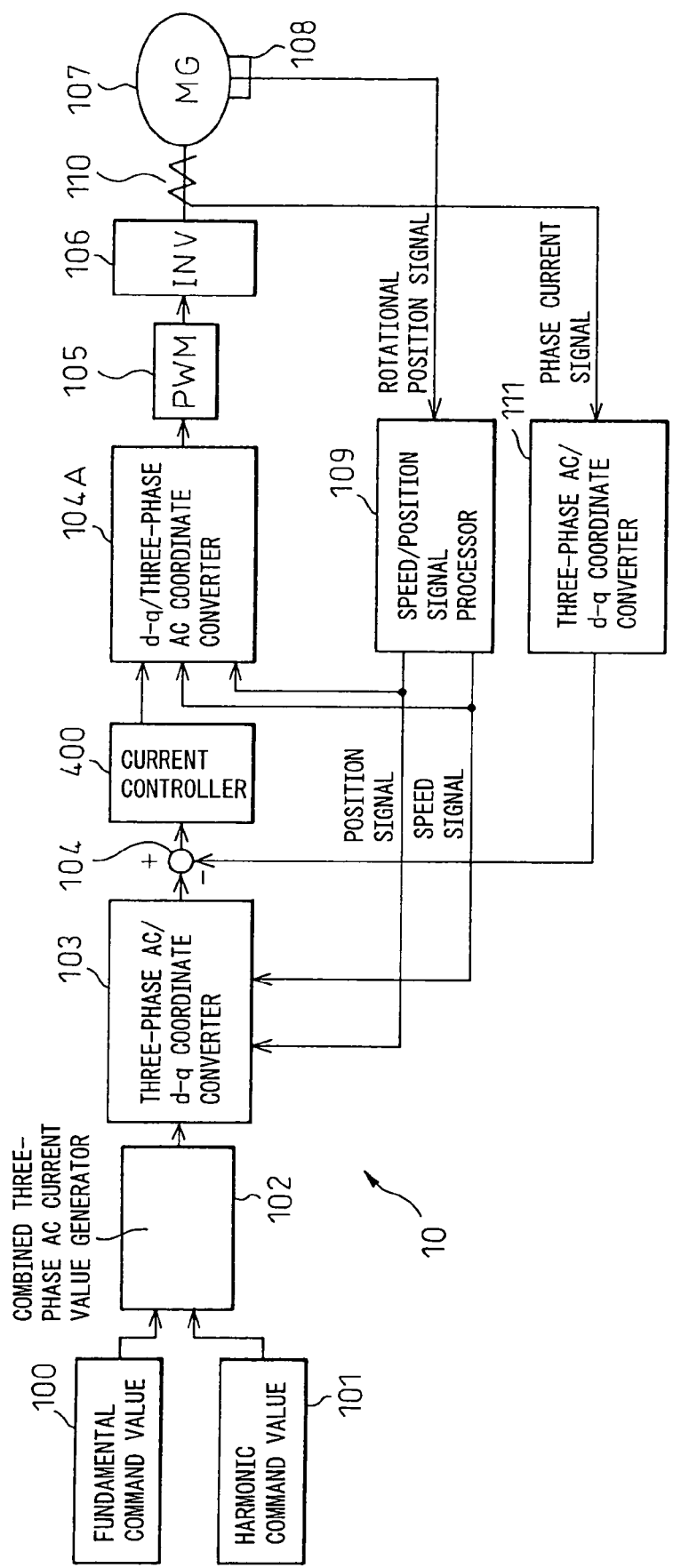
FIG. 3 is a block circuit diagram showing an example of a motor control circuit which employs a magnetic sound altering method according to the present invention.

An example of the circuit for superimposing the above-described harmonic currents is shown in FIG. 3. The motor control circuit shown here is an embodiment that performs the feedback control of the motor current.

Reference numeral 10 is a motor current control means for controlling the motor current of a three-phase synchronous machine 107, and has the following configuration.

Reference numeral 100 is an amplitude/phase commanding circuit block which commands the amplitude and phase of an electric current command value (in three-phase AC coordinate system) corresponding to the fundamental wave. Reference numeral 101 is an amplitude/phase commanding circuit block which commands the amplitude and phase of a harmonic current of a designated order (in three-phase AC coordinate system).

The amplitude/phase commanding circuit block 100 determines the amplitude and phase based on the current command (fundamental wave) received from an external control apparatus such as a vehicle control ECU or the like.

This circuit block 100 may be incorporated in the vehicle control ECU. The external control apparatus computes the electric current command value as the fundamental wave, based on a torque command and a rotation angle signal (rotational position signal) related to the three-phase synchronous machine 107.

The circuit block 101 determines the frequency, amplitude, and phase of a harmonic current of a predesignated order by substituting the frequency, amplitude, and phase of the current specified by the current command (fundamental wave) into the equation (13), (14), or (15) and calculating the equation, and outputs an amplitude/phase command that implements them. The other constants in the above equations are preset according to the purpose.

For example, when reducing or canceling the sixth and 12th harmonics of the magnetic sound, the amplitudes and phases of the seventh and/or 13th harmonic currents are determined so that the calculated values of the equations

(36) and (37) become lower than a predetermined value or equal to zero. The other constants are preset as numeric values unique to the AC rotary electric machine.

Similarly, when canceling only the sixth harmonic of the magnetic sound, the amplitude and phase of the harmonic current are determined so that the calculated value of the equation (36) becomes lower than a predetermined value or equal to zero. When canceling only the 12th harmonic of the magnetic sound, the amplitude and phase of the harmonic current are determined so that the calculated value of the equation (37) becomes lower than a predetermined value or equal to zero. In any case, by adjusting the phases and/or amplitudes of the seventh and/or 13th harmonic currents to be superimposed in the above equations, the sixth and/or 12th harmonics of the magnetic sound, i.e., most of the magnetic sound, can be amplified or reduced or canceled.

Instead of calculating the above equations, the frequency, phase, and amplitude of the fundamental frequency component may be entered in advance into a map or table corresponding to these equations, to provide the values of the phases and amplitudes of the seventh and/or 13th harmonic currents. Alternatively, based on the computed amplitude and phase of the fundamental frequency component of the stator current, the circuit block 100 may compute its present value for output, and the circuit block 101, based on the computed amplitude and phase of the harmonic current, may compute the present value of the harmonic current for output.

The commands concerning the fundamental current and the harmonic current are supplied to a circuit block 102. The circuit block 102 periodically computes a combined three-phase AC current value by combining on a phase-by-phase basis the fundamental current value and the harmonic current value determined for each phase based on the supplied information.

The thus computed combined three-phase AC current value is converted by a coordinate converting circuit block 103 into the d-q axis coordinate system; then, the converted values are compared in a subtractor 104 with their corresponding detection values (d-q axis) and, after their differences are gain-adjusted by a current amplifier 400, a coordinate converting circuit block 104A converts the values for output as a three-phase AC current value.

The circuit block 104A causes a circuit block 105 to generate a PWM control voltage for each phase for eliminating the above differences and, using the resulting three-phase PWM control voltage, performs on/off control of a switching device in a three-phase inverter 106, thereby performing control to apply the output voltage of the three-phase inverter 106 to the stator coil of the three-phase synchronous machine 107 as a generator-motor so that the three-phase AC current flowing in the three-phase synchronous machine 107 is the sum of the fundamental current and the harmonic current having the frequencies, amplitudes, and phases specified by the respective circuit blocks 100 and 101. This type of PWM feedback control is well known in the art, and will not be described in detail here.

The three-phase synchronous machine 107 includes a rotation angle sensor 108, and a speed/position signal processing circuit block 109 derives a speed signal and a position signal from the rotational position signal output from the rotation angle sensor 108 and supplies them to the circuit block 104A. On the other hand, the stator coil current of the three-phase synchronous machine 107 is detected by a current sensor 110, and converted by a coordinate converting circuit block 111 into a d-axis current detection value and a q-axis current detection value which are input to the subtractor 104.

CIRCUIT CONFIGURATION EXAMPLE 2

Figure 4:
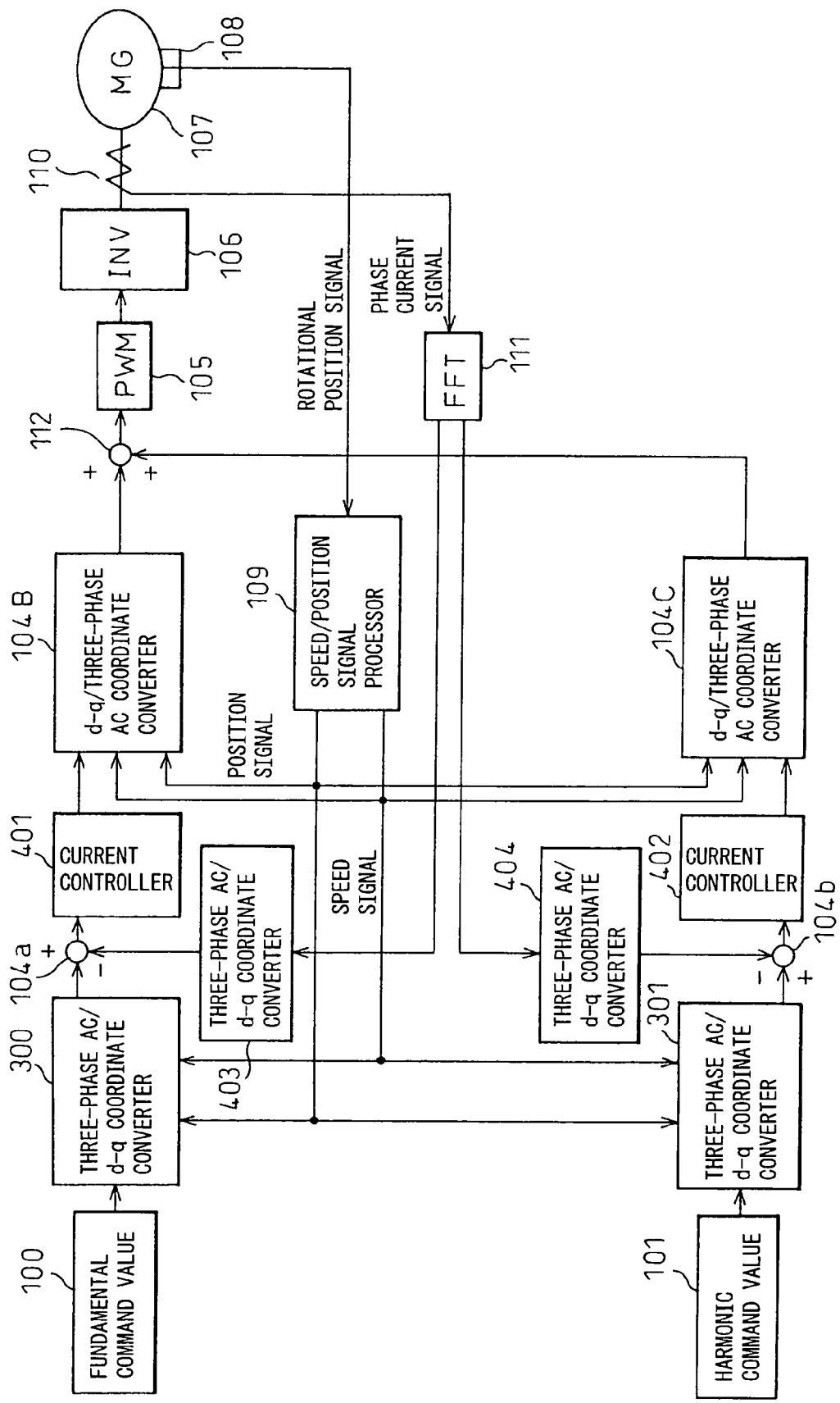
FIG. 4 is a block circuit diagram showing an example of a motor control circuit which employs a magnetic sound altering method according to the present invention.

An example of the circuit for superimposing the above-described harmonic currents is shown in FIG. 4.

Reference numeral 100 is an amplitude/phase commanding circuit block which determines amplitude and phase as an electric current command value (in three-phase AC coordinate system) corresponding to the fundamental wave. The command value output from the circuit block 100 is fed to a subtractor 104a via a circuit block 300 which performs conversion from the three-phase AC coordinate system into the d-q axis coordinate system as in the first circuit configuration example. An FFT 111 extracts the detected value of the fundamental component (in three-phase coordinate system) from the phase current output from the current detector. The detected value is first converted by a circuit block 403 from the three-phase AC coordinate system into the d-q axis coordinate system, and then compared in the subtractor 104a with the electric current command value, and their difference is supplied to a coordinate converting circuit block 104B via a gain-adjusting current controller 401. The circuit block 104B outputs a three-phase AC current command value for eliminating the above difference to an adder 112.

Reference numeral 101 is an amplitude/phase commanding circuit block which determines amplitude and phase as an electric current command value (in three-phase AC coordinate system) corresponding to a harmonic of a designated order. The command value output from the circuit block 101 is fed to a subtractor 104b via a circuit block 301 which performs conversion from the three-phase AC coordinate system into the d-q axis coordinate system as in the first circuit configuration example. The FFT 111 extracts the detected value of the harmonic component of the designated order (in three-phase coordinate system) from the motor current. The detected value is first converted by a circuit block 404 from the three-phase AC coordinate system into the d-q axis coordinate system, and then compared in the subtractor 104b with the electric current command value, and their difference is supplied to a coordinate converting circuit block 104C via a gain-adjusting current controller 402. The circuit block 104C outputs a three-phase AC current command value, for eliminating the above difference, to the adder 112.

The circuit block 104C outputs the three-phase AC current command value for eliminating the above difference to the adder 112. The circuit block 109 derives a position signal and a speed signal from the detected rotational position signal, and supplies them to the coordinate converting circuit blocks 104B, 104C, 300, and 301.

The circuit block 105 is caused to generate a PWM control voltage for each phase corresponding to the combined three-phase Ac current command value output from the adder 112 and, using the resulting three-phase PWM control voltage, performs on/off control of the switching device in the three-phase inverter 106, thereby performing control to apply the output voltage of the three-phase inverter 106 to the stator coil of the three-phase synchronous machine 107 as a generator-motor so that the three-phase AC current flowing in the three-phase synchronous machine 107 is the sum of the fundamental current and the harmonic current having the frequencies, amplitudes, and phases specified by the respective circuit blocks 100 and 101.

CIRCUIT CONFIGURATION EXAMPLE 3

Figure 5:
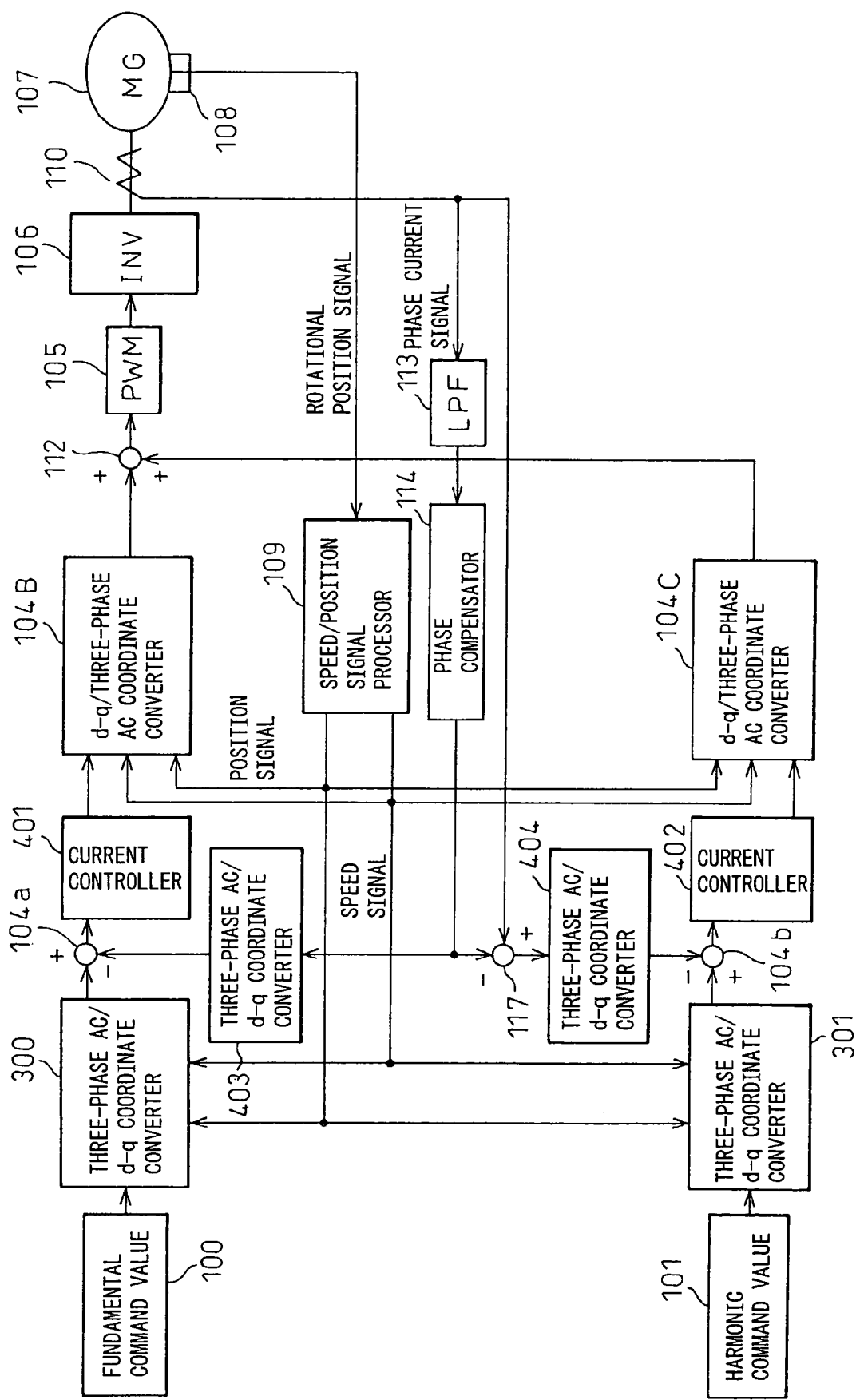
FIG. 5 is a block circuit diagram showing an example of a motor control circuit which employs a magnetic sound altering method according to the present invention.

An example of the circuit for superimposing the above-described harmonic currents is shown in FIG. 5. The circuit shown here employs a filter 113 replacing the FFT 111 shown in FIG. 4, and extracts a fundamental current detection value and a harmonic current detection value.

From the phase current signal detected by the current sensor 110, the detected value of its fundamental component (in three-phase coordinate system) is extracted. The detected value is first converted by the circuit block 403 from the three-phase AC coordinate system into the d-q axis coordinate system, and then compared in the subtractor 104$a$ with the fundamental electric current command value, and their difference is supplied to the coordinate converting circuit block 104B via the gain-adjusting current controller 401. The circuit block 104B outputs a three-phase AC current command value for eliminating the above difference to the adder 112.

A subtractor 117 subtracts the fundamental component (in three-phase coordinate system) from the phase current signal (in three-phase coordinate system) detected by the current sensor 110, and thus extracts its harmonic component. The detected harmonic component is first converted by the circuit block 404 from the three-phase AC coordinate system into the d-q axis coordinate system, and then compared in the subtractor 104$b$ with the harmonic electric current command value, and their difference is supplied to the coordinate converting circuit block 104C via the gain-adjusting current controller 402. The circuit block 104C outputs a three-phase AC current command value for eliminating the above difference to the adder 112.

The circuit can thus operate in the same manner as that described in the second circuit configuration example.

CIRCUIT CONFIGURATION EXAMPLE 4

Figure 6:
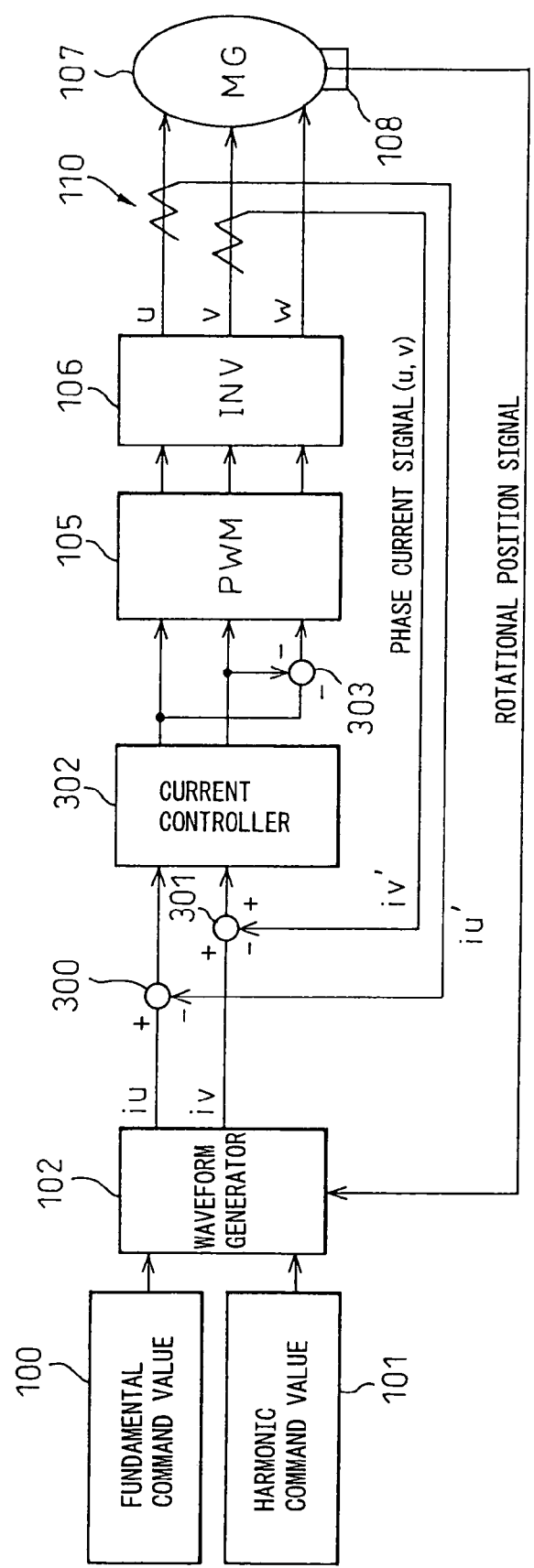
FIG. 6 is a block circuit diagram showing an example of a motor control circuit which employs a magnetic sound altering method according to the present invention.

An example of the circuit for superimposing the above-described harmonic currents is shown in FIG. 6. The motor control circuit shown here is an embodiment that performs the feedback control of the motor current in the three-phase coordinate system alone.

Reference numeral 100 is an amplitude/phase commanding circuit block which determines amplitude and phase as an electric current command value (in three-phase AC coordinate system) corresponding to the fundamental wave. Reference numeral 101 is an amplitude/phase commanding circuit block which determines the amplitude and phase of a harmonic current of a designated order (in three-phase AC coordinate system). The functions of these circuit blocks are the same as those in FIG. 3, and the harmonic block 101 determines the amplitude and phase of the harmonic by substituting the frequency, phase, and amplitude output from the circuit block into the equation (13), (14), or (15), or by performing substantially the same computation using a map or a table.

The amplitude/phase commands output from the circuit blocks 100 and 101 are supplied to the circuit block 102. Based on the amplitude/phase command of the fundamental current command value and the amplitude/phase command of the harmonic current command value thus supplied and on the detected rotational position signal, the circuit block 102 combines the fundamental current command value (in three-phase AC coordinate system) and the harmonic current command value (in three-phase AC coordinate system) for each of the U and V phases, and outputs a U-phase combined current command value (in three-phase AC coordinate system) iu and a V-phase combined current command value (in three-phase AC coordinate system) iv.

A subtractor 300 obtains the difference between the detected U-phase current detection value iu' and the U-phase combined current command value iu, and supplies the difference to a circuit block 302 which is a current controller. A subtractor 301 obtains the difference between the detected V-phase current detection value iv' and the V-phase combined current command value iv, and supplies the difference to the circuit block 302, i.e., the current controller. The circuit block 302 creates a U-phase voltage and a V-phase voltage for eliminating the above differences, and a circuit block 105 computes and outputs a U-phase and a V-phase PWM voltage corresponding to the U-phase and the V-phase voltage, respectively. A subtracting inverting circuit 303 computes a W-phase voltage by inverting an analog signal representing the difference between the U-phase voltage and the V-phase voltage, and the circuit block 105 computes and outputs a PWM voltage for the W-phase voltage. The three-phase inverter 106 is controlled on and off in accordance with the duty-cycle corresponding to these three phase PWM voltages.

CIRCUIT CONFIGURATION EXAMPLE 5

Figure 7:
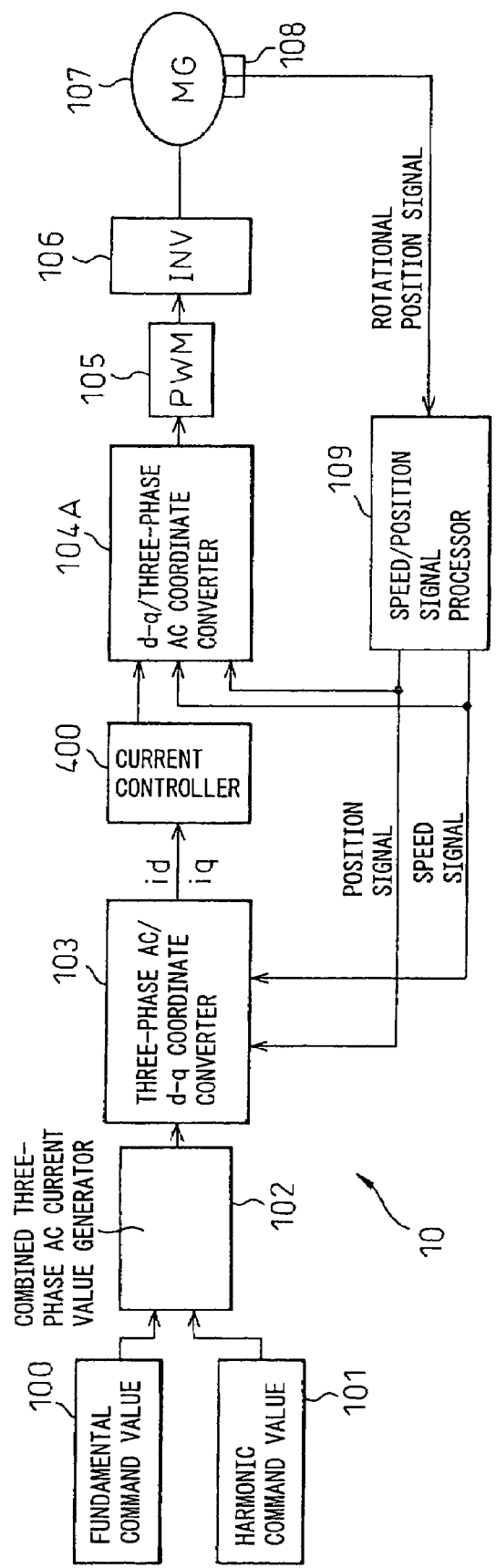
FIG. 7 is a block circuit diagram showing an example of a motor control circuit which employs a magnetic sound altering method according to the present invention.

An example of the circuit for superimposing the above-described harmonic currents is shown in FIG. 7. In this circuit, the circuit shown in FIG. 3 is changed to an open-loop control type.

The commands concerning the fundamental current and the harmonic current, respectively output from the fundamental circuit block 100 and the harmonic circuit block 101, are supplied to the circuit block 102. The circuit block 102 periodically computes a combined three-phase AC current value by combining, on a phase-by-phase basis, the fundamental current value and the harmonic current value determined for each phase based on the supplied information.

The thus computed combined three-phase AC current value is converted by the coordinate converting circuit block 103 into the d-q axis coordinate system and, after gain adjustment by the current amplifier 400, the coordinate converting circuit block 104A outputs the three-phase AC current value.

The circuit block 104A causes the circuit block 105 to generate a PWM control voltage for each phase and, using the resulting three-phase PWM control voltage, the switching device in the three-phase inverter 106 is controlled on and off, thereby performing control to apply the output voltage of the three-phase inverter 106 to the stator coil of the three-phase synchronous machine 107 as a generator-motor so that the three-phase AC current flowing in the three-phase synchronous machine 107 is the sum of the fundamental current and the harmonic current having the frequencies, amplitudes, and phases specified by the respective circuit blocks 100 and 101.

The three-phase synchronous machine 107 includes a rotation angle sensor 108, and the speed/position signal processing circuit block 109 derives a speed signal and a position signal from the rotational position signal output from the rotation angle sensor 108, and supplies them to the circuit blocks 103 and 104A for coordinate conversion.

EXPERIMENTAL EXAMPLE

Figure 8:
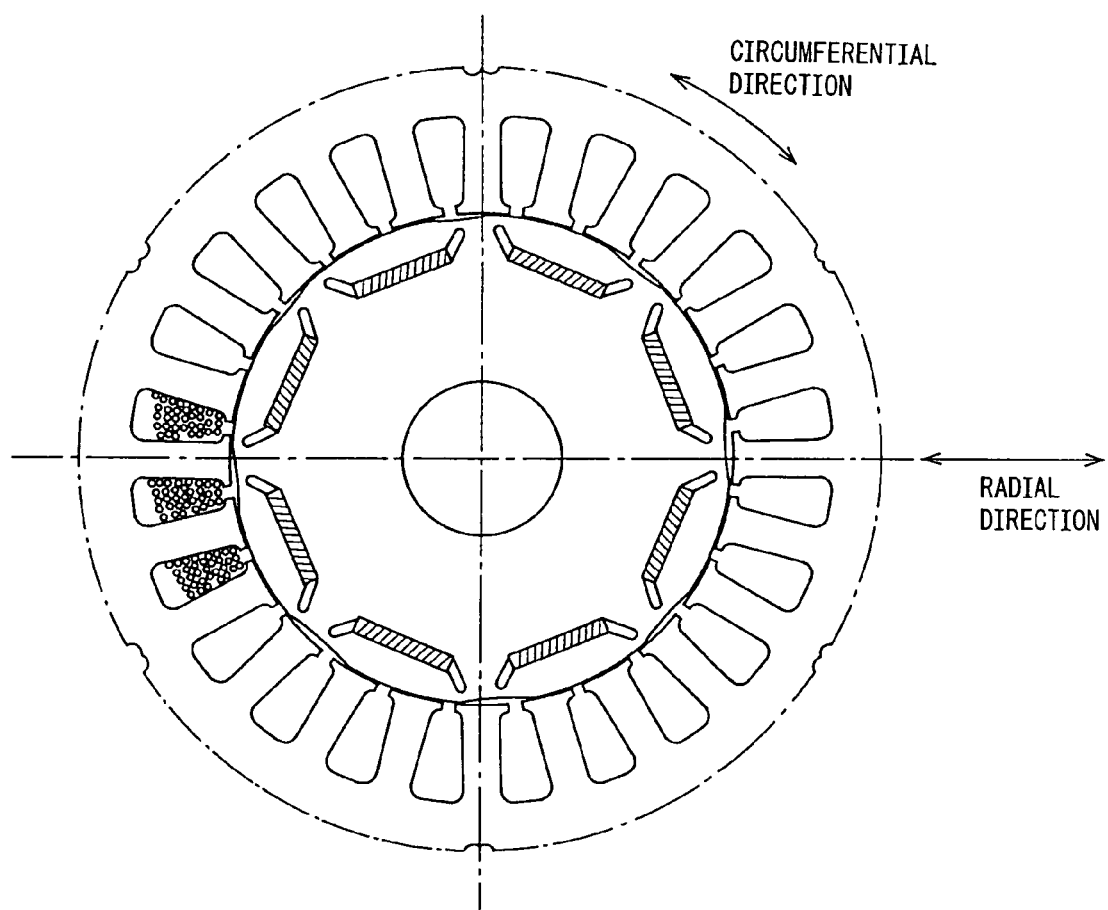
FIG. 8 is a schematic cross-sectional view, taken in a radial direction, of a three-phase synchronous machine used in an experiment.

An experiment for reduction of the magnetic noise was conducted using the three-phase synchronous machine (8-pole, 24-slot, IPM) shown in FIG. 8. The fundamental current was set to 43A, and the rotor phase angle was controlled to a value that maximizes torque.

Figure 9:
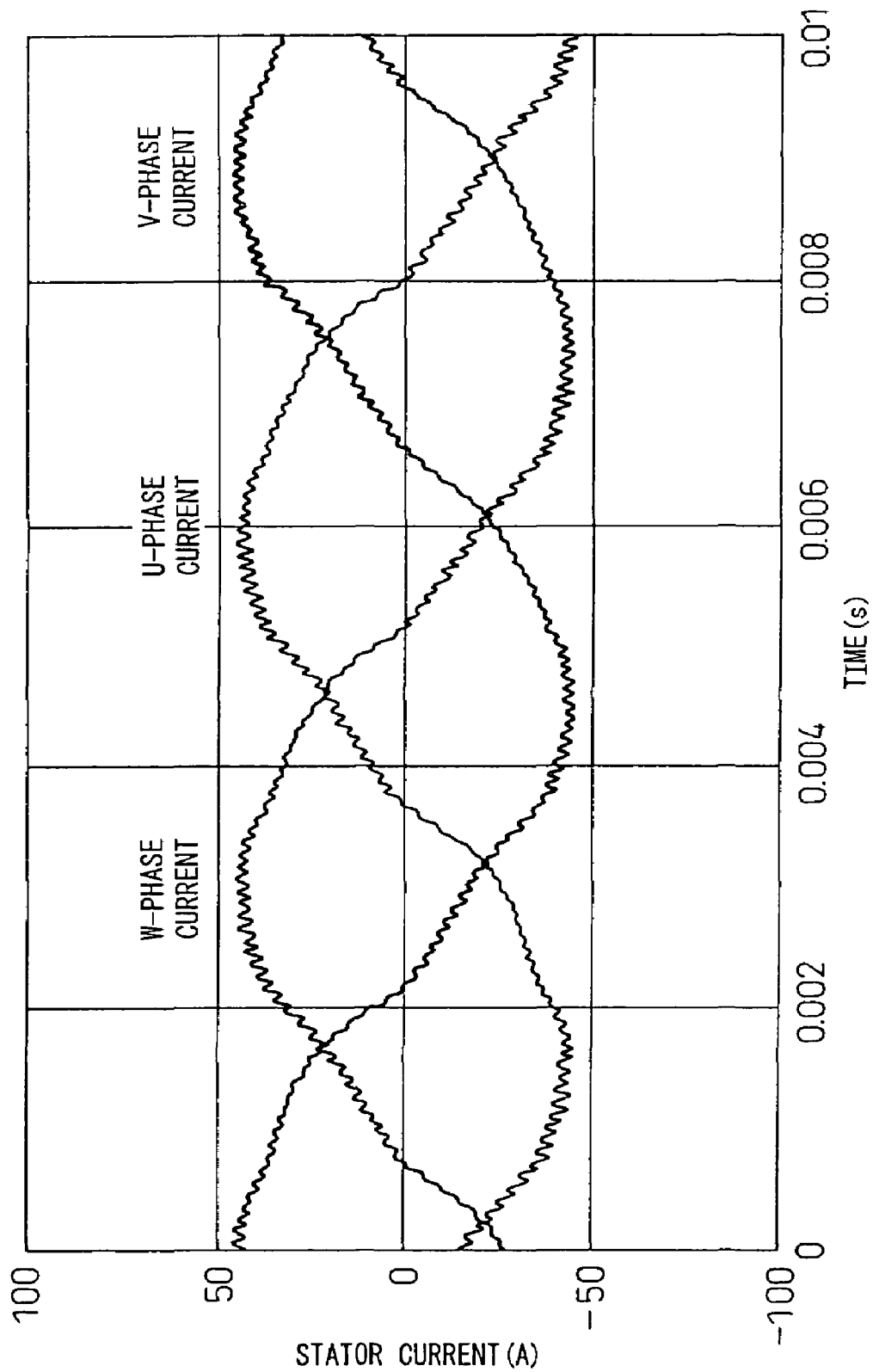
FIG. 9 is a diagram showing the waveforms (magnetic noise non-reduction mode) of the respective phase currents of the three-phase synchronous machine depicted in FIG. 8.
Figure 10:
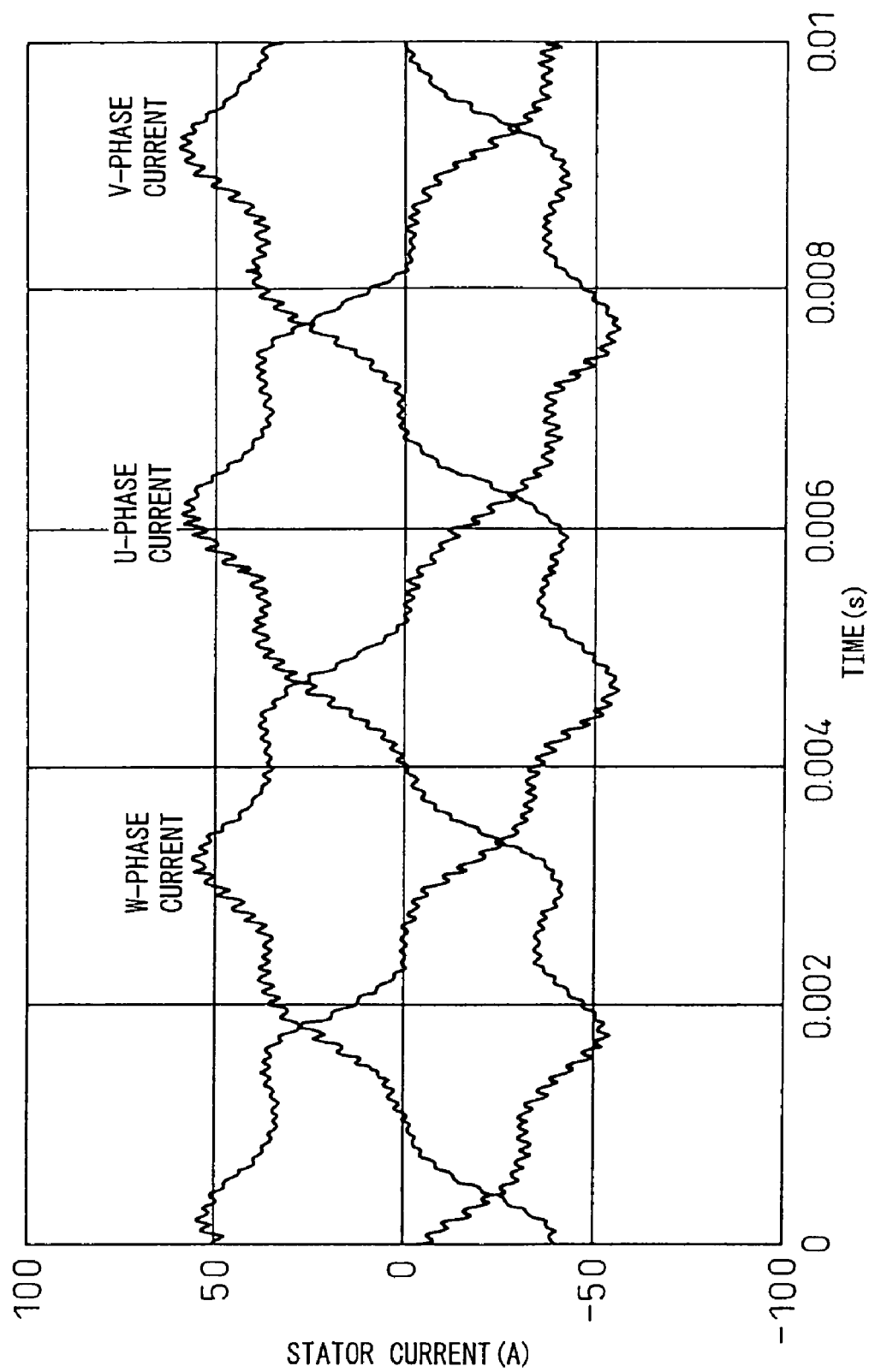
FIG. 10 is a diagram showing the waveforms (magnetic noise reduction mode) of the respective phase currents of the three-phase synchronous machine depicted in FIG. 8.

FIG. 9 shows the three-phase current waveforms obtained when the motor was driven without superimposing the magnetic noise reducing harmonic currents on the stator current of the synchronous machine. Each phase current contains relatively small harmonic components in addition to its fundamental frequency component. FIG. 10 shows the three-phase current waveforms obtained when the motor was driven by superimposing the magnetic noise reducing harmonic currents on the stator current shown in FIG. 9. In FIGS. 9 and 10, the number of revolutions was 1700 rpm. The magnetic noise reducing harmonic currents were superimposed via a feedback control loop using the circuit of FIG. 3.

Figure 11:
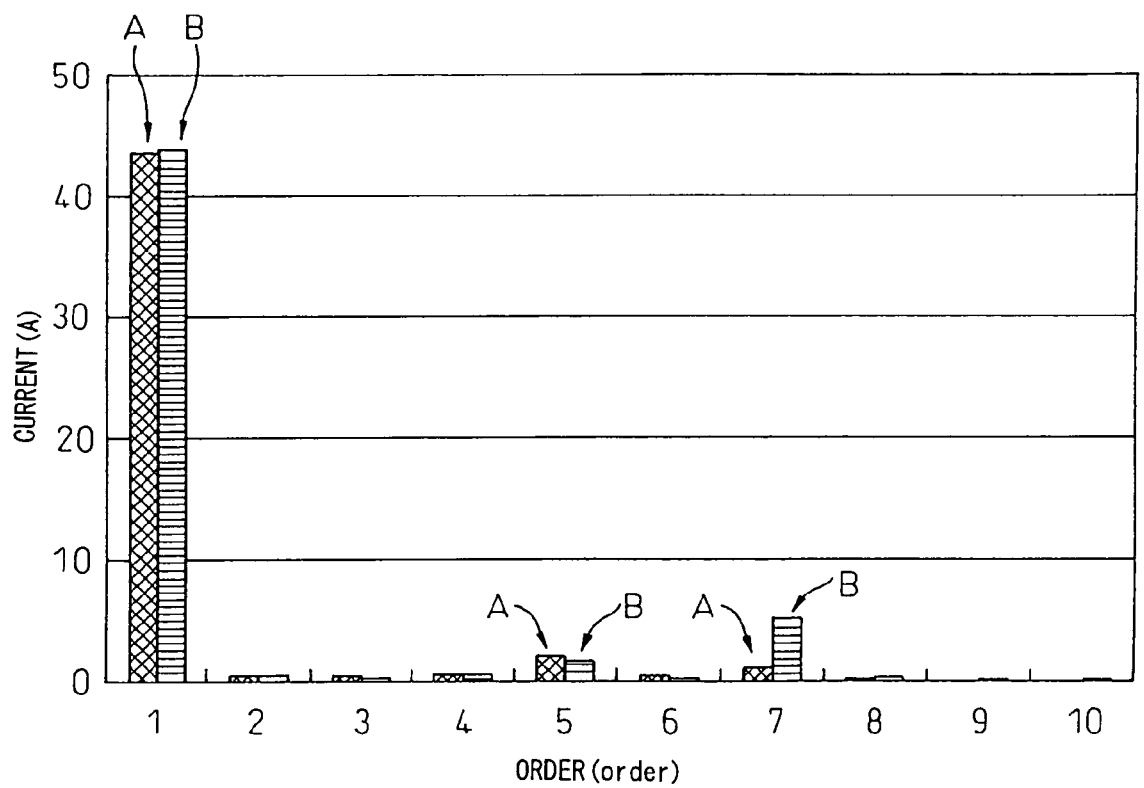
FIG. 11 is a diagram showing the frequency spectra (magnetic noise non-reduction mode versus magnetic noise reduction mode) of the phase currents of the three-phase synchronous machine depicted in FIG. 8.

The frequency spectrum A of the U-phase current shown in FIG. 9 and the frequency spectrum B of the U-phase current shown in FIG. 10 with the magnetic noise reducing harmonic currents superimposed thereon, each spectrum being obtained by FFT, are shown in FIG. 11. In the pair of bars shown for each order in FIG. 11, the bar on the left (shown by cross hatching) indicates the spectrum A of the U-phase current shown in FIG. 9, and the bar on the right (shown by horizontal hatching) indicates the spectrum B of the U-phase current shown in FIG. 10. In FIG. 9, the seventh current (the seventh harmonic component) has an amplitude equal to 3% of that of the first current (the fundamental frequency component). In FIG. 10, the seventh current (the seventh harmonic component) has an amplitude equal to 12% of that of the first current (the fundamental frequency component).

Figure 12:
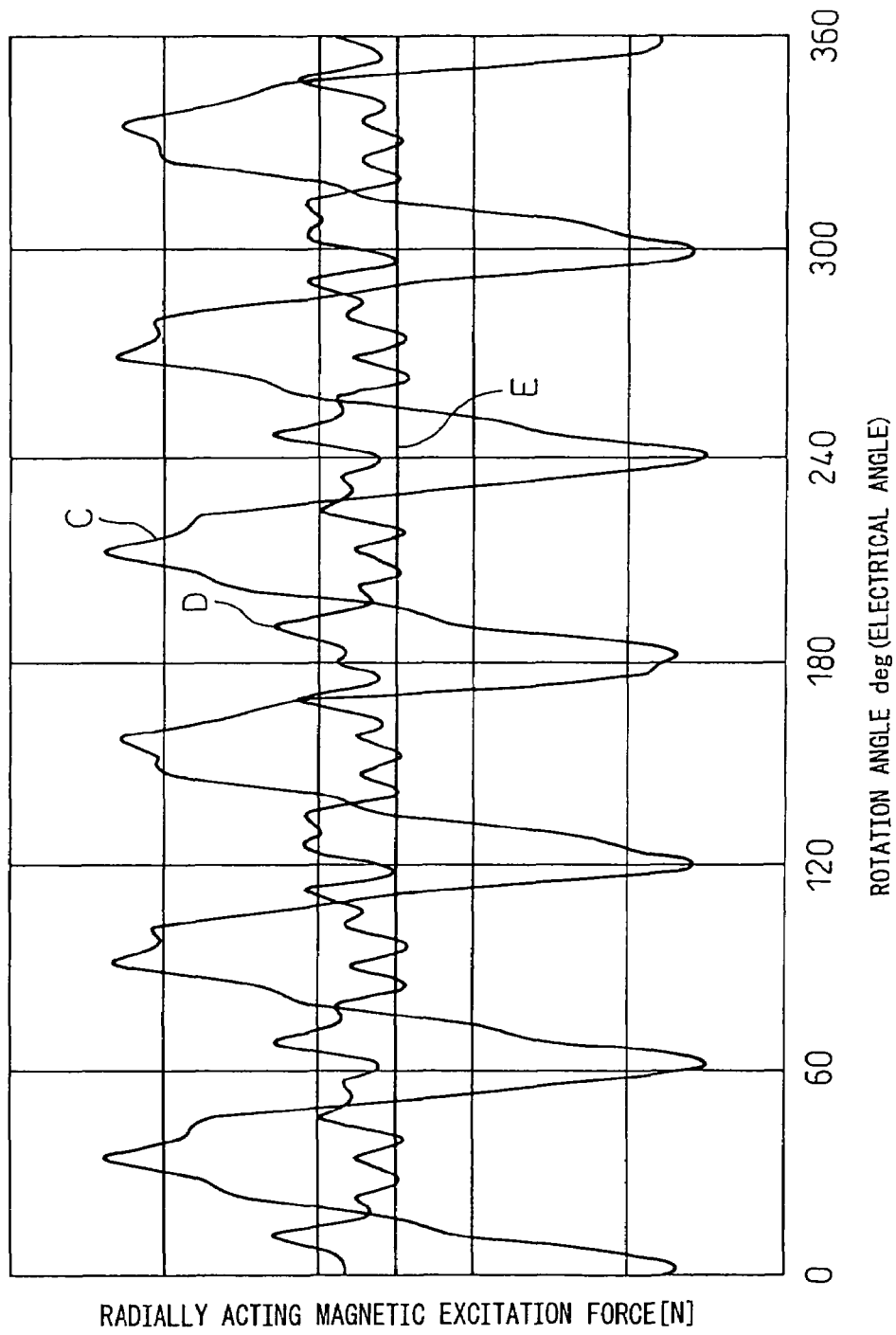
FIG. 12 is a diagram showing the waveforms (magnetic noise non-reduction mode versus magnetic noise reduction mode) of radially acting excitation forces in the three-phase synchronous machine depicted in FIG. 8.

FIG. 12 shows how the radially acting excitation force acting on three adjacent teeth of the stator varies with the rotation angle of the rotor when the currents shown in FIG. 9 are applied (hereinafter called the magnetic noise non-reduction mode) as compared to when the currents shown in FIG. 10 are applied (hereinafter called the magnetic noise reduction mode). Of the two periodically varying waveforms shown in FIG. 12, the larger periodically varying waveform C shows the variation of the radially acting excitation force in the magnetic noise non-reduction mode shown in FIG. 9, while the smaller periodically varying waveform D shows the variation of the radially acting excitation force in the magnetic noise non-reduction mode shown in FIG. 10. Further, E indicates the average value of the radially acting excitation force in the magnetic noise non-reduction mode. It will be noted that the radially acting excitation force contains a DC component due to the attraction being exerted by the permanent magnet of the rotor.

Figure 13:
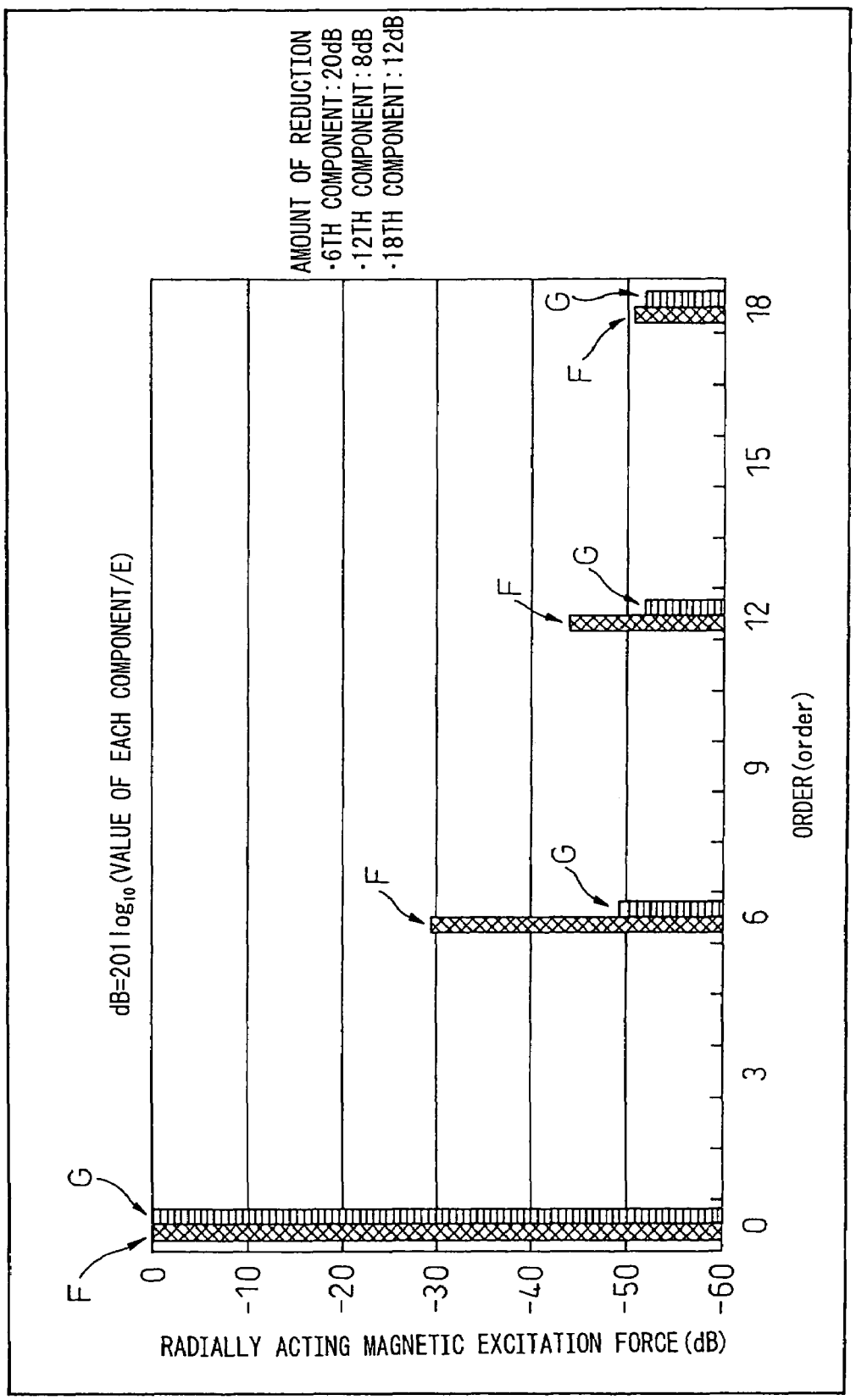
FIG. 13 is a diagram showing the frequency spectra (magnetic noise non-reduction mode versus magnetic noise reduction mode) of the radially acting excitation forces in the three-phase synchronous machine depicted in FIG. 8.

In FIG. 13, F indicates the frequency spectrum of the radially acting excitation force (the larger periodically varying waveform) C in the magnetic noise non-reduction mode, and G indicates the frequency spectrum of the radially acting excitation force (the smaller periodically varying waveform) D in the magnetic noise reduction mode. In the pair of bars shown for each order, the frequency spectrum F is shown by the bar on the left (indicated by cross hatching). On the other hand, the frequency spectrum G is shown by the bar on the right (indicated by horizontal hatching).

Figure 14:
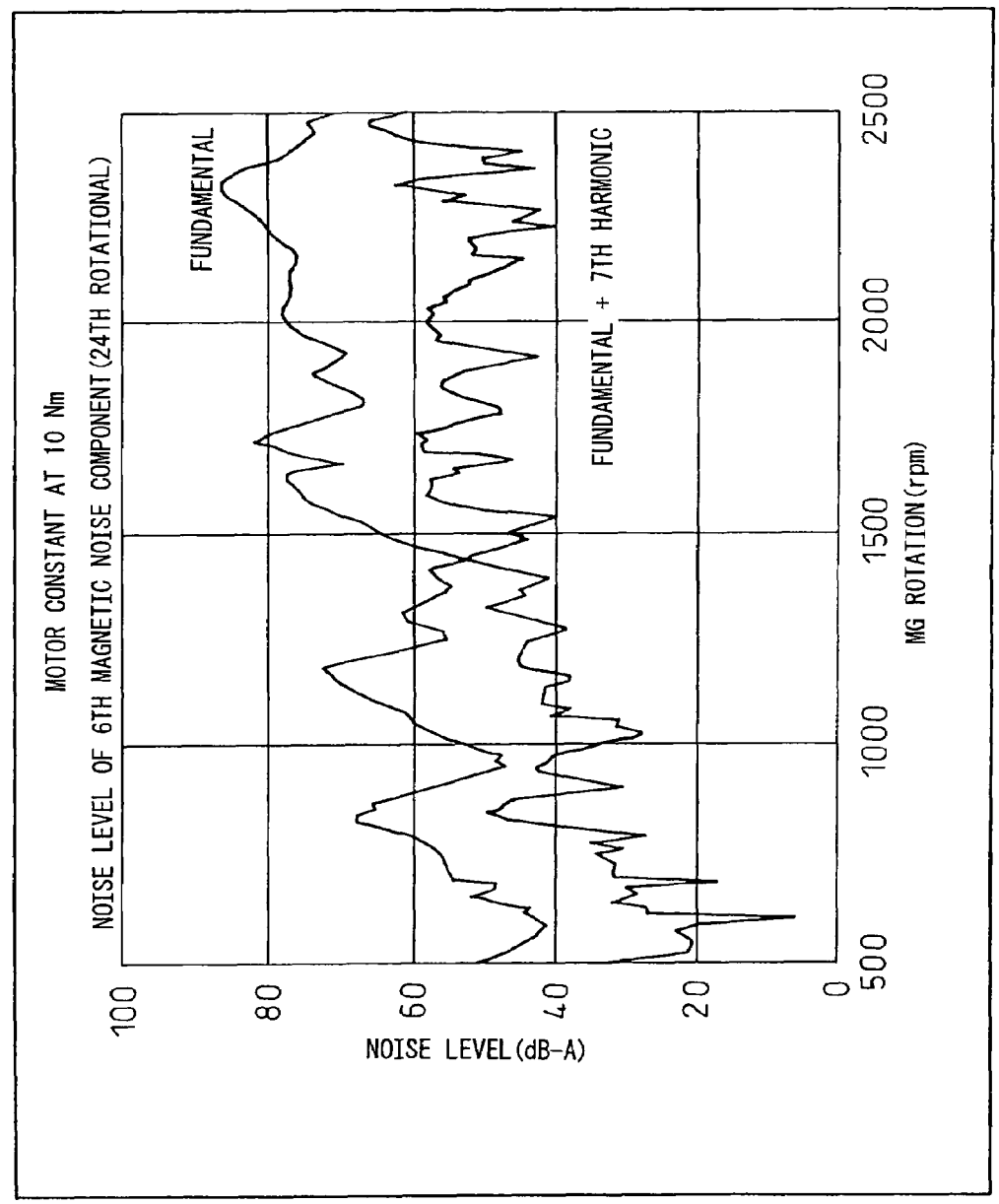
FIG. 14 is a diagram showing the result of the measurement (in motor mode) taken of the magnetic noise (sound) of the three-phase synchronous machine depicted in FIG. 8.
Figure 15:
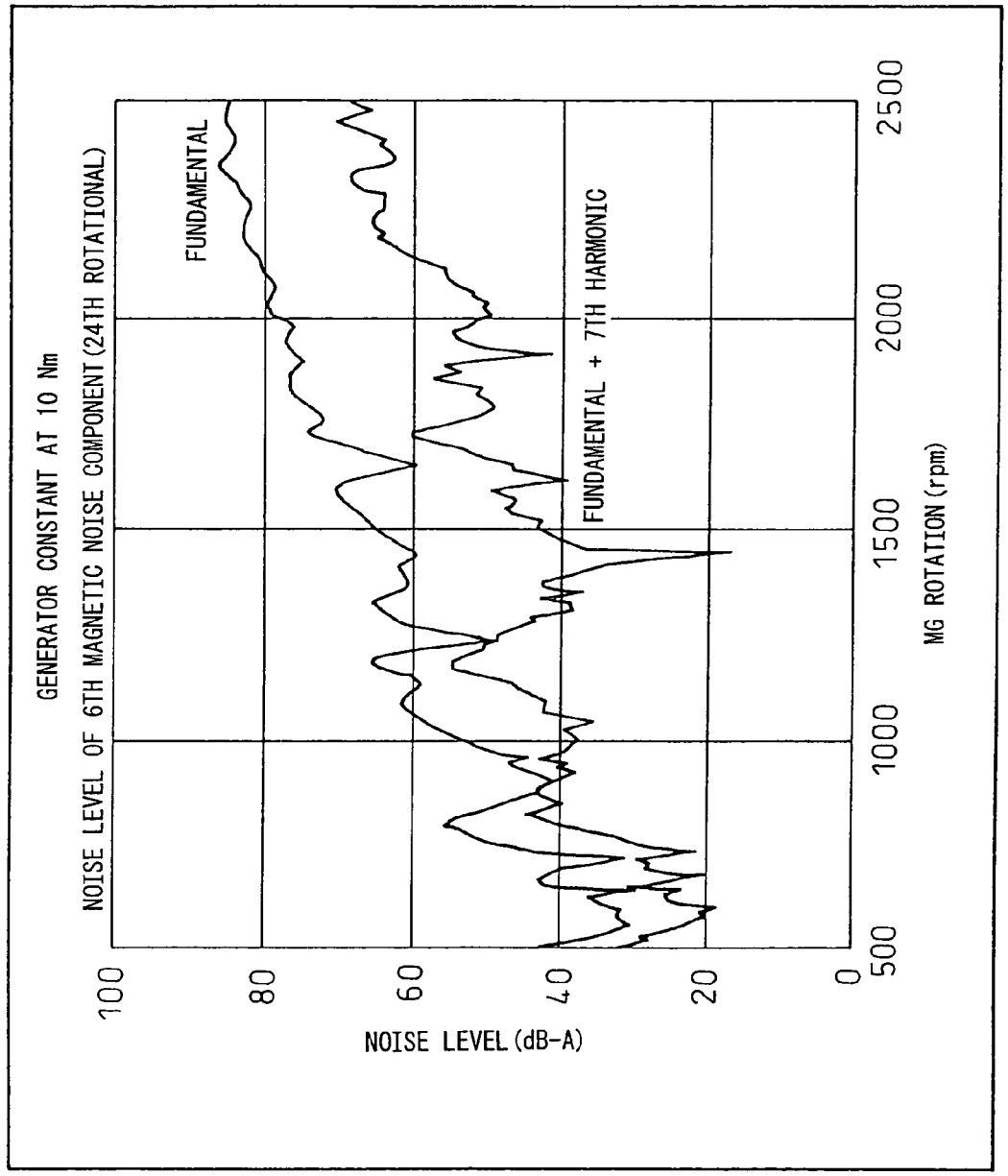
FIG. 15 is a diagram showing the result of the measurement (in generator mode) taken of the magnetic noise (sound) of the three-phase synchronous machine depicted in FIG. 8.

FIG. 14 shows the result of the measurement (in motor mode) taken of the sixth component (frequency 6θ) of the magnetic noise as a function of the number of revolutions (rpm) of the experimental machine described above. From FIG. 14, it can be seen that the sixth component of the magnetic noise can be effectively reduced in the high rpm range (higher than about 1500 rpm) where the magnetic noise is uncomfortable to the ear. FIG. 15 shows the result of the measurement (in generator mode) taken of the sixth component (frequency 6θ) of the magnetic noise as a function of the number of revolutions (rpm) of the experimental machine described above. From FIG. 15, it can be seen that the sixth component of the magnetic noise can be reduced over almost the entire rpm range. It is also shown that, in the rpm range where the magnetic noise is the greatest, the sixth magnetic noise component can be reduced as much as 20 dB when the magnetic noise reducing harmonic current is superimposed. In FIGS. 14 and 15, the sixth magnetic noise component increases in certain rpm ranges due to the superimposition of the magnetic noise reducing seventh harmonic current, but this is because the setting of the control constant is not optimized, and this is not an essential issue. Further, as this reversal of the magnetic noise occurs in the region where the level of the sixth magnetic noise component is small, and as its absolute value is small, this does not present a problem. In the above synchronous machine, it is of course possible to halt the operation of superimposing the magnetic noise reducing seventh harmonic current in the rpm range where a satisfactory reduction in the magnetic noise cannot be expected.

(Modified Mode)

Instead of performing the magnetic noise reduction operation, the operation mode can be switched, as needed, to a torque ripple reduction mode to reduce torque ripple by utilizing the harmonic superimposition technique implemented in the circuit of the embodiment described above, that is, by superimposing on the fundamental frequency component a harmonic current whose order is higher by one than that of the circumferential vibration. More specifically, this can be accomplished by altering the amplitude and phase angle of the harmonic current.

(Modified Mode)

A modified mode of each of the above circuit examples will be described below. The harmonic circuit block in each circuit example includes a temperature compensating circuit block for compensating for the temperature characteristics of the permanent magnet contained in the rotor. The temperature compensating circuit block reads the output of the temperature sensor built into the AC rotary electric machine 107, and changes the corresponding constant in the equation (35), (36), or (37) in order to compensate for the temperature-dependent variation of the residual flux of the permanent magnet.

Figure 16:
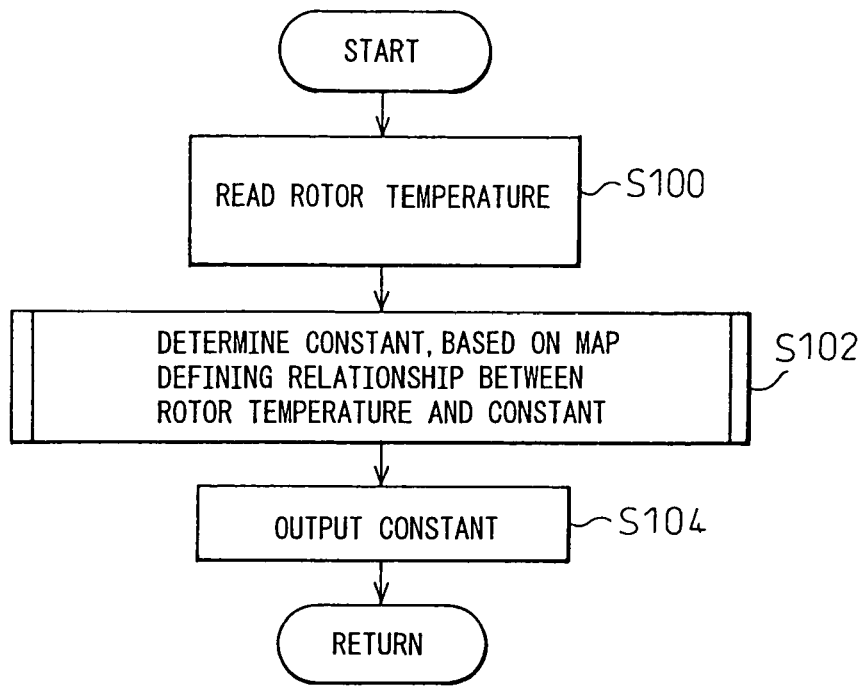
FIG. 16 is a flowchart for compensating for temperature variations of rotor magnetic flux.

A temperature compensation control operation routine for the case where the temperature compensating circuit block is implemented in a microcomputer will be described below with reference to the flowchart of FIG. 16. This routine is executed at regular intervals of time.

First, rotor temperature is read from the output signal of the temperature sensor (not shown) built into the AC rotary electric machine 107 (S100); then, a constant is obtained by entering this rotor temperature into a map which prestores the relationship between the rotor temperature and the constant (S102), and the thus obtained constant is output (S104). An existing temperature sensor mounted in a vehicle may be used instead of the temperature sensor built into the AC rotary electric machine 107.

The constant in the equation, which is to be changed as the rotor magnetic flux $\phi$ changes as a function of the temperature of the permanent magnet, is thus determined; therefore, using this constant, the equation is calculated to determine the phase and amplitude of the harmonic current.

(Modified Mode)

A modified mode of each of the above circuit examples will be described below. In this modified mode, the magnetic noise level is changed according to the operation mode of the AC rotary electric machine.

Figure 17:
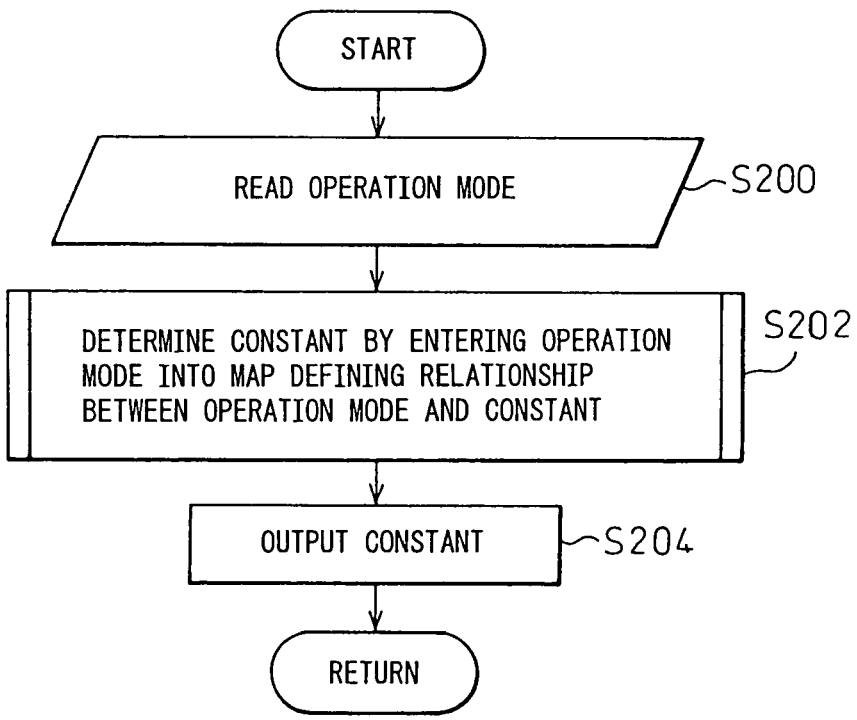
FIG. 17 is a flowchart for reducing the amplitude of magnetic sound in accordance with the operation mode of an AC rotary electric machine.

The routine for the case where the circuit block for changing the magnetic noise level is implemented in a microcomputer will be described below with reference to the flowchart of FIG. 17. This routine is executed at regular intervals of time.

First, the operation mode of the AC rotary electric machine 107, or the rotational speed of the AC rotary electric machine 107, which is supplied externally, is read (S200); then, a constant is obtained by entering this data (i.e., the operation mode of the AC rotary electric machine 107) into a map which prestores the relationship between the operation mode and the constant (S202), and the thus obtained constant is output (S204). Then, using the thus obtained constant, the equation is calculated to determine the amplitude and phase of the harmonic current of the designated order; in this way, the amplitude of the magnetic noise can be changed according to the operation mode of the AC rotary electric machine 107.

A low rpm operation mode and a high rpm operation mode can each be set as the above operation mode. In this case, the constant may be set so as to reduce primarily the 12th magnetic sound component in the low rpm operation mode and to reduce primarily the sixth magnetic sound component in the high rpm operation mode, or vice versa. That is, the order of the primary magnetic sound component to be reduced may be changed rather than changing the amplitude of the magnetic noise according to the operation mode. In the figures so far given, the circuit blocks, excluding the inverter 106, constitute the inverter control circuit.

(Modified Mode)

The equation (35), (36), or (37) shows an example of canceling or altering the harmonics of the rotor magnetomotive force Fmag by superimposing the harmonic currents on the fundamental stator current, but in actual PWM control of the AC rotary electric machine, harmonics are inevitably superimposed on the fundamental current due to inverter switching, resulting in the generation of magnetic sound. To additionally reduce this magnetic sound, computations should be performed so as to superimpose on the fundamental current the harmonic currents obtained by vector-subtracting the harmonic currents inevitably superimposed on the stator current due to inverter switching from the magnetic sound altering harmonic currents obtained by the above equations.

(Modified Mode)

Figure 18:
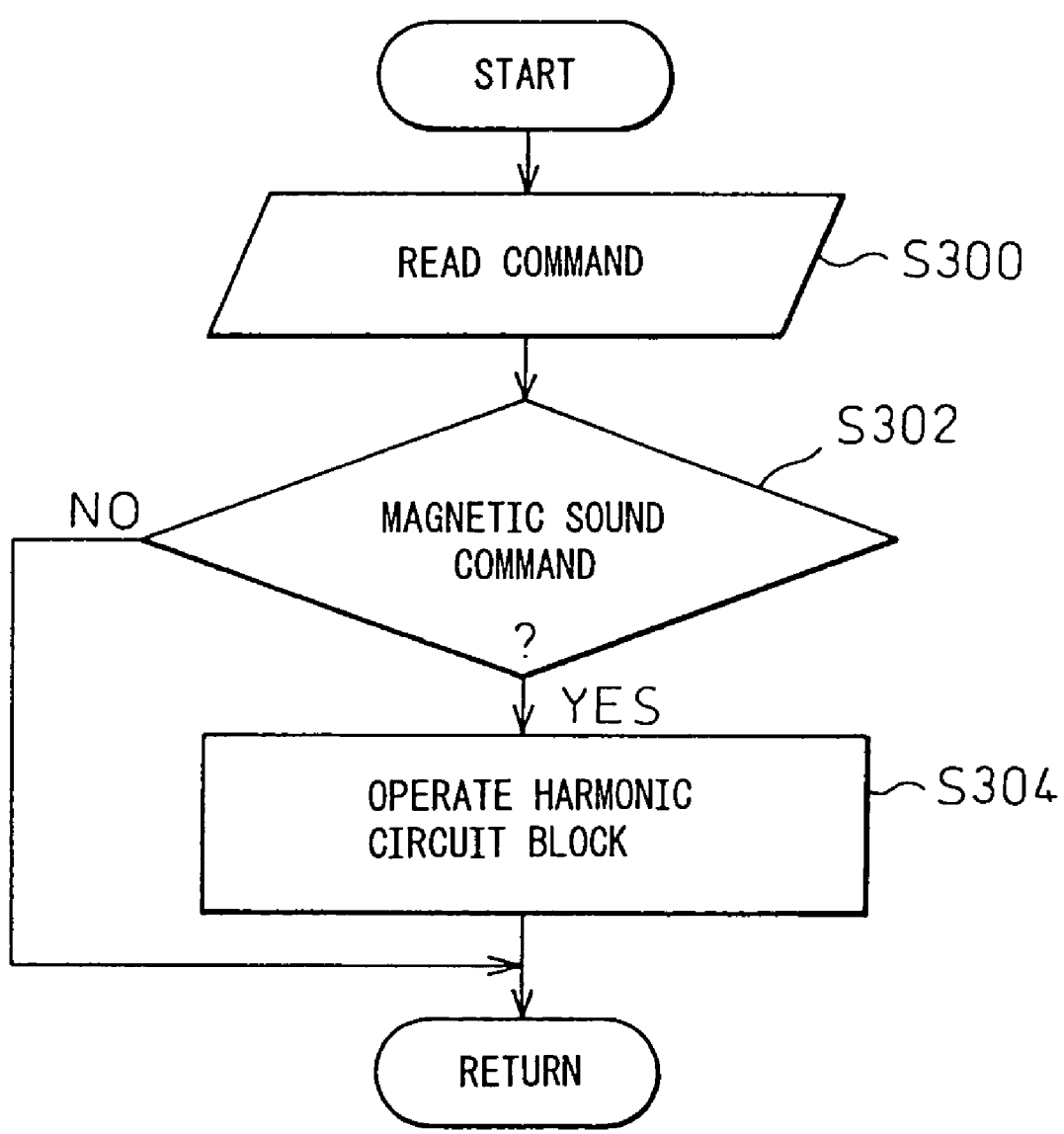
FIG. 18 is a flowchart for reducing the magnetic noise of the three-phase AC rotary electric machine and producing magnetic sound of a designated frequency.

Control operation for reducing the inherent magnetic noise of the three-phase AC rotary electric machine and producing magnetic sound of a designated frequency will be described with reference to the flowchart of FIG. 18.

First, a command is read from an external automotive electronic control unit (S300), and it is determined whether the command thus read is a command for generating a desired magnetic sound different from the inherent magnetic sound that the three-phase AC rotary electric machine is currently generating (S302); if the answer is yes, the previously described harmonic circuit block is operated. In this embodiment, the harmonic circuit block is a circuit block that superimposes the seventh harmonic current with a prescribed phase and amplitude. The phase and amplitude of the seventh harmonic current are set to such values that, when the harmonic current is superimposed, the sixth harmonic component of the radially acting inherent magnetic excitation force (magnetic sound) of the three-phase AC rotary electric machine is canceled in accordance with the above equation.

(Modified Mode)

Figure 19:
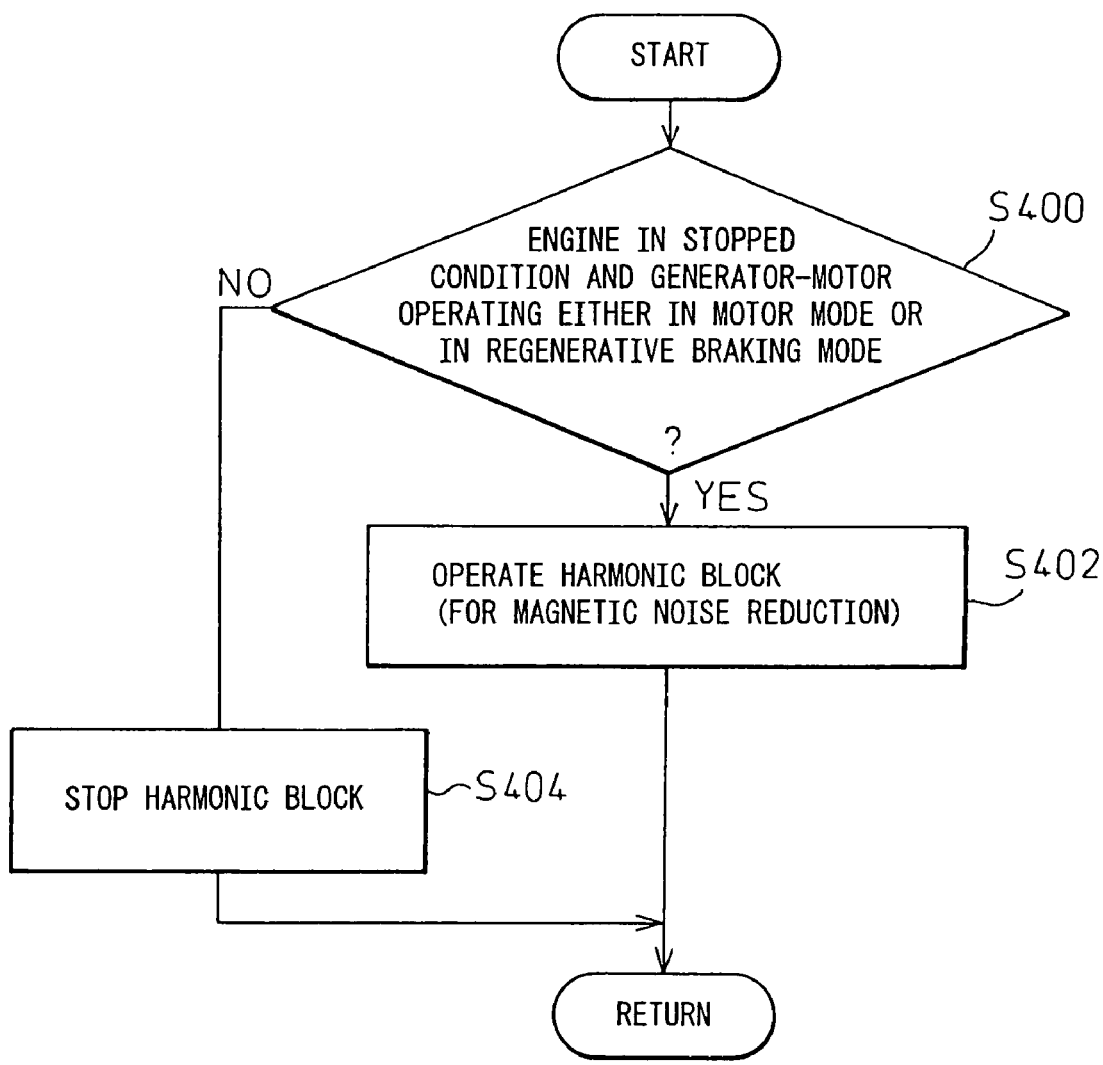
FIG. 19 is a flowchart for reducing, under advantageous conditions, the inherent magnetic noise of the three-phase AC rotary electric machine mounted in an engine-powered vehicle.

Control operation will be described with reference to the flowchart of FIG. 19 for the case where the above-described magnetic noise reducing type rotary electric machine is mounted in an engine-powered vehicle. This type of rotary electric machine is well known and widely used as a generator-motor or an electric air conditioner or the like in a vehicle such as a hybrid vehicle or a torque-assisted vehicle.

First, in step S400, it is checked whether or not the engine is stopped and the electric machine is operating as a motor, or the electric machine is operating as a generator imposing regenerative braking; if the answer is yes, the harmonic circuit block is operated (S402), but if the answer is no, the harmonic circuit block is not operated (S404). The harmonic circuit block is a circuit block that superimposes the seventh harmonic current with a prescribed phase and amplitude. The phase and amplitude of the seventh harmonic current are set to such values that, when the harmonic current is superimposed, the sixth harmonic component of the radially acting inherent magnetic excitation force (magnetic sound) of the three-phase AC rotary electric machine is canceled in accordance with the above equation. In this way, noise inside the vehicle can be reduced by reducing the magnetic noise during motor operation (motor mode) or regenerative braking (generator mode) in an engine stopped condition in which engine noise is not generated and the magnetic noise of the generator-motor tends to become uncomfortable to the ear. In other driving conditions, the operation of the circuit for harmonic current superimposition control can be stopped.

CIRCUIT CONFIGURATION EXAMPLE 6

Figure 20:
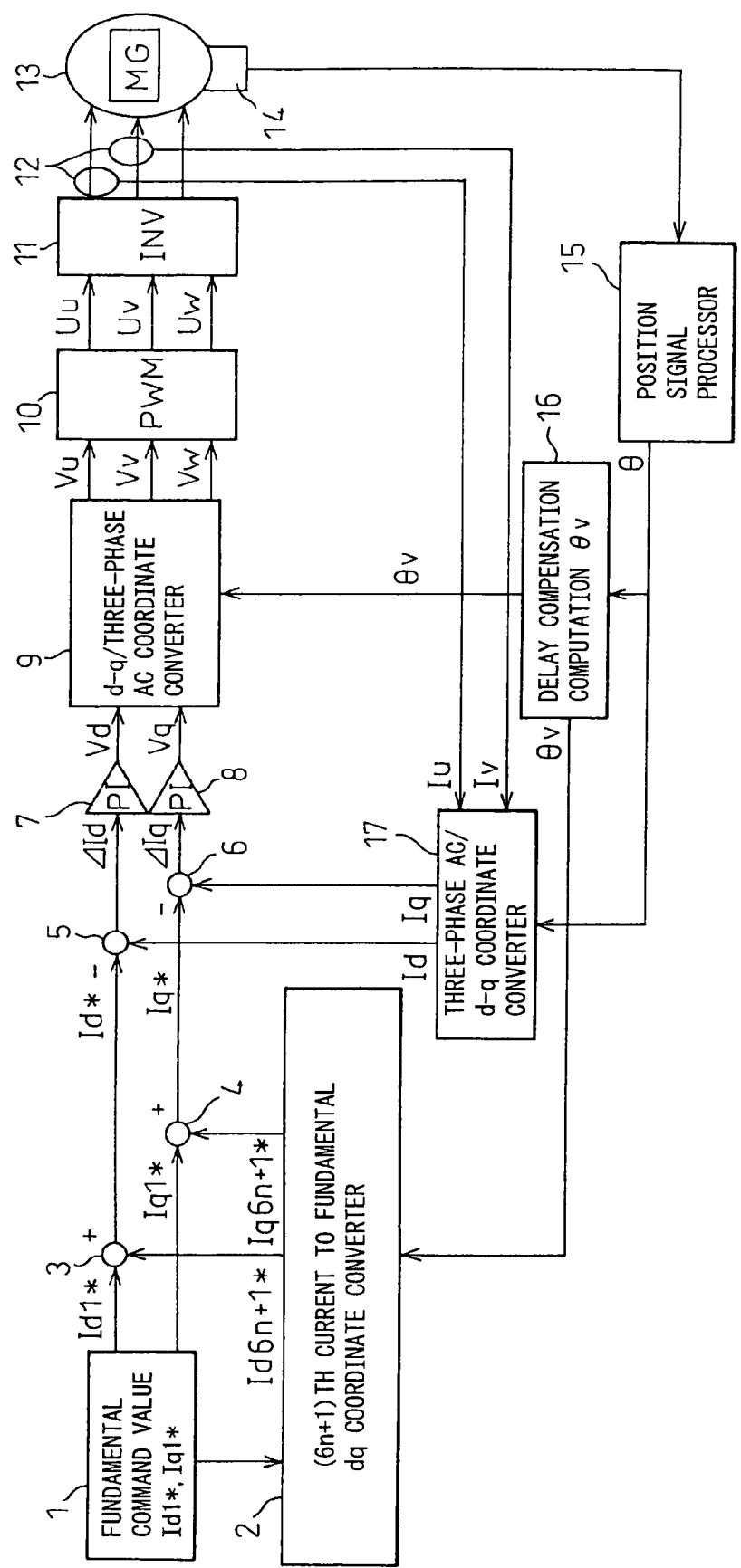
FIG. 20 is a block circuit diagram showing another circuit example.
Figure 21:
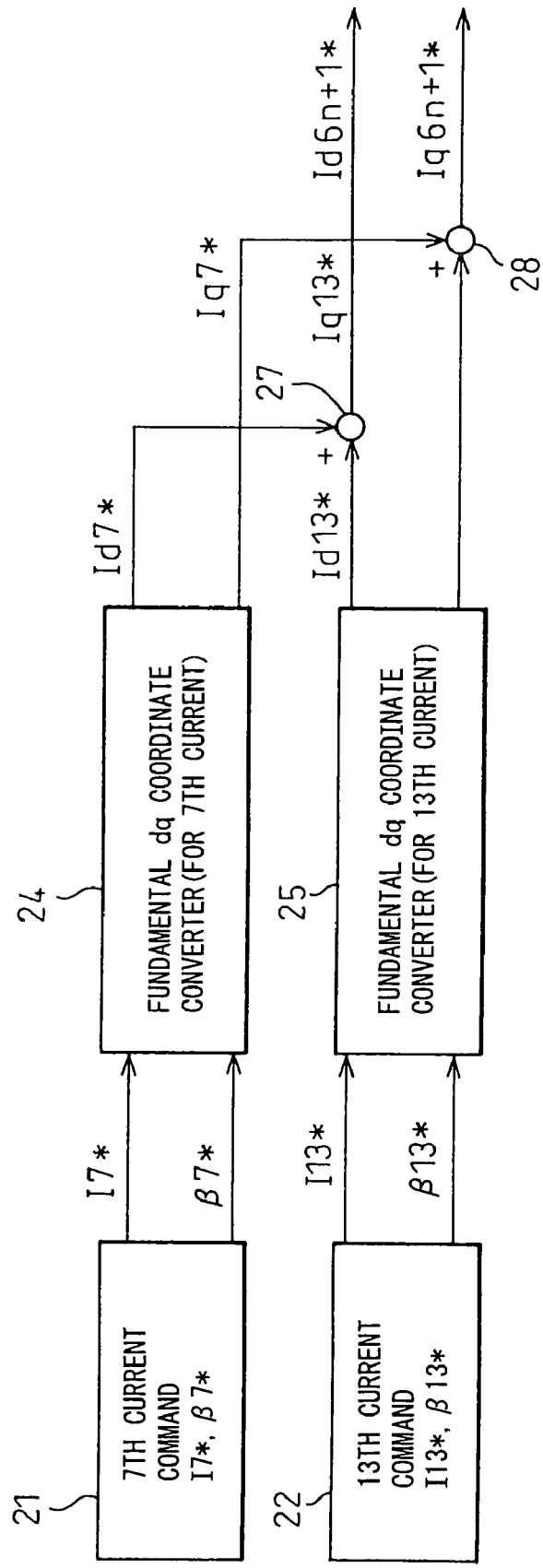
FIG. 21 is a block circuit diagram showing one example of the circuit shown in FIG. 20.
Figure 22:
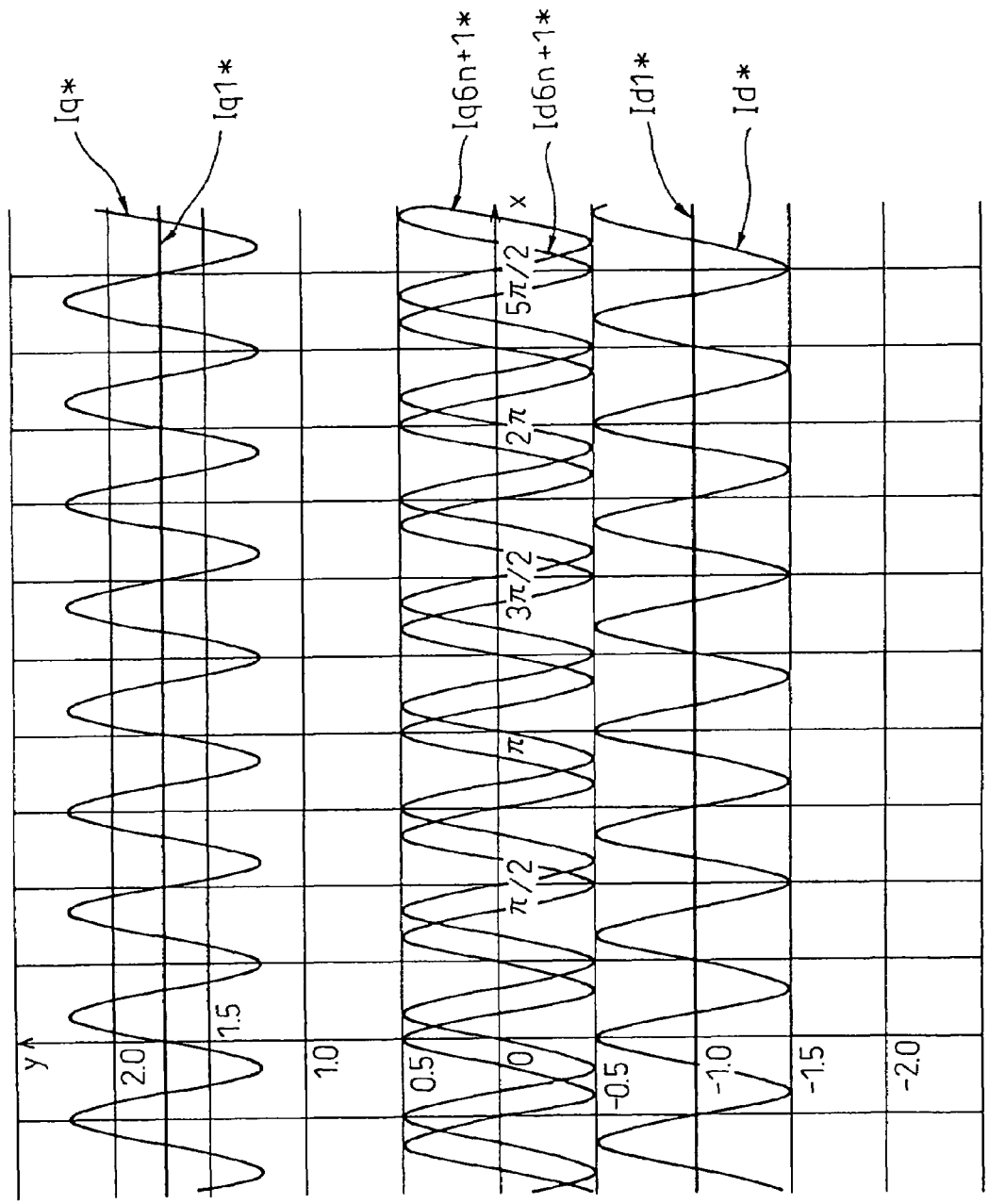
FIG. 22 is a waveform diagram showing signal waveforms (in a coordinate system rotating at the fundamental frequency) in various parts in FIG. 20.
Figure 23:
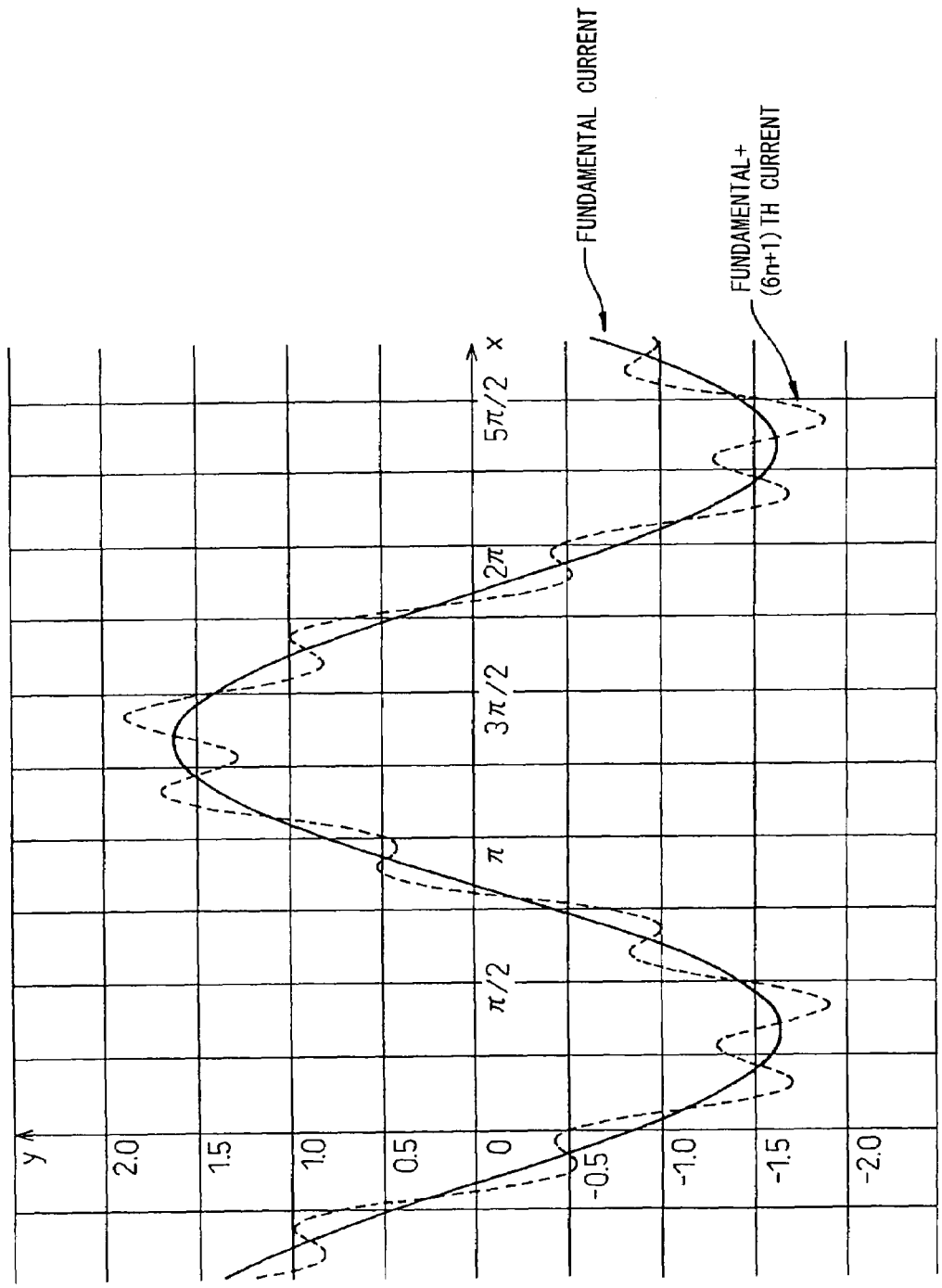
FIG. 23 is a waveform diagram showing signal waveforms (in a stationary coordinate system) in various parts in FIG. 20.

Another example of the harmonic current superimposition control will be described with reference to FIGS. 20 to 23. FIG. 20 is a block circuit diagram showing the motor control apparatus of this embodiment, FIG. 21 is a block circuit diagram showing one example of a coordinate conversion circuit 2, FIG. 22 is a waveform diagram showing signal waveforms (in a rotating coordinate system) in various circuit parts, and FIG. 23 is a waveform diagram showing signal waveforms (in a stationary coordinate system) in various circuit parts.

The motor control apparatus is an embodiment that performs feedback control of the motor current, wherein reference numeral 1 is a fundamental command value generating circuit, 2 is a harmonic command value generating circuit, 3 and 4 are adders, 5 and 6 are subtractors, 7 and 8 are PI amplifiers (proportional-integral circuits), 9 is a coordinate conversion circuit, 10 is a PWM voltage generating circuit, 11 is a three-phase inverter, 12 is a pair of current sensors (phase current detecting elements), 13 is a three-phase synchronous motor-generator (automotive synchronous AC rotary electric machine), 14 is a resolver (rotation angle detecting element), 15 is a position signal processing circuit, 16 is a delay compensating circuit, and 17 is a coordinate conversion circuit.

Of the above constituent elements 1 to 17, the constituent elements excluding the three-phase synchronous motor-generator 13 constitute the motor control apparatus according to the present invention, and of the above constituent elements 1 to 17, the constituent elements (circuits) excluding the current sensors (phase current detecting elements) 12, three-phase synchronous motor-generator (automotive synchronous AC rotary electric machine) 13, and resolver (rotation angle detecting element) constitute the motor current control element or motor control means according to the present invention.

Further, the constituent element (circuit) 17 constitutes the phase current detection value coordinate system converting element according to the present invention, the constituent element (circuit) 1 constitutes the fundamental command value output element according to the present invention, the constituent element (circuit) 2 constitutes the harmonic command value output element according to the present invention, the constituent elements (circuits) 3 to 6 constitute the current deviation computing element according to the present invention, and the constituent elements (circuits) 7 to 11 constitute the phase voltage control element according to the present invention. Needless to say, the three-phase inverter 11 is fed from a DC power supply and generates a three-phase AC voltage.

The fundamental command value generating circuit (fundamental command value output element) 1 is a known circuit for converting the target value of the fundamental current, corresponding to the input torque command value and rpm command value, into a d-axis fundamental command value Id1* as its d-axis current component and a q-axis fundamental command value Iq1* as its q-axis current component. The torque command value is input from an external control apparatus such as a vehicle control ECU, and the fundamental command value generating circuit 1, based on the input value, determines the d-axis fundamental command value Id1* and the q-axis fundamental command value Iq1*. If necessary for determining the d-axis fundamental command value Id1* and the q-axis fundamental command value Iq1*, values other than the torque command value, such as the voltage of the three-phase inverter 11, the output signal of the resolver 14, etc., are also input to the fundamental command value generating circuit 1.

The harmonic command value generating circuit 2 (harmonic command value output element) is a circuit for converting the predetermined target value of the (6k+1)th harmonic current (k is an integer and is 0 for the fundamental frequency component) into a d-axis harmonic command value Id6k+1* as its d-axis current component and a q-axis harmonic command value Iq6k+1* as its q-axis current component. More specifically, the harmonic command value generating circuit 2 is a circuit that generates a harmonic current command value for reducing the radial vibration of the three-phase synchronous motor-generator 13.

A specific example of the harmonic command value generating circuit 2 will be described with reference to the block diagram of FIG. 21. In FIG. 21, reference numeral 21 is a seventh current command value generating circuit, 22 is a 13th current command value generating circuit, 24 and 25 are coordinate conversion circuits, and 27 and 28 are adders. In this embodiment, the harmonic command value generating circuit 2 generates only the seventh and 13th harmonic command values for reducing the sixth and 12th radial vibration components, but the circuit may be configured to further generate higher harmonic command values, in a like manner, for superimposition in the adders 27 and 28.

The seventh current command value generating circuit 21 is a table that describes the relationships between the d-axis command value Id* and q-axis command value Iq* supplied from the fundamental command value generating circuit 1 and the amplitude I7* and phase angle β7* of the seventh harmonic command value for canceling the sixth radial vibration component. That is, the amplitude I7* and phase angle β7* of the seventh harmonic command value are values that vary as functions of the d-axis command value Id* and q-axis command value Iq* defined in the rotating coordinate system rotating at the fundamental frequency. Here, the amplitude I7* and phase angle β7* of the seventh harmonic command value are values defined in the rotating coordinate system rotating at the fundamental frequency, but the values are the same in the stationary coordinate system.

Likewise, the 13th current command value generating circuit 22 is a table that describes the relationships between the d-axis command value Id* and q-axis command value Iq* supplied from the fundamental command value generating circuit 1 and the amplitude I13* and phase angle β13* of the 13th harmonic command value for canceling the 12th radial vibration component. That is, the amplitude I13* and phase angle β13* of the 13th harmonic command value are values that vary as functions of the d-axis command value Id* and q-axis command value Iq* in the rotating coordinate system rotating at the fundamental frequency. Here, the amplitude I13* and phase angle β13* of the 13th harmonic command value are values defined in the rotating coordinate system rotating at the fundamental frequency, but the values are the same in the stationary coordinate system. These data I7*, β7*, I13*, and β13* are stored in ROMs (not shown) in the seventh and 13th current command value generating circuits 21 and 22. Of the data obtained by entering the d-axis command value Id* and q-axis command value Iq* into the circuits 21 and 22, I7* and β7* are supplied to the coordinate conversion circuit 24, and I13* and β13* are supplied to the coordinate conversion circuit 25.

Based on the amplitude I7* and phase angle β7* (relative to the phase angle θ of the fundamental component) of the seventh harmonic current supplied from the seventh current command value generating circuit 21, the coordinate conversion circuit 24 computes the d-axis harmonic command value Id7* as the d-axis component of the seventh harmonic current command value defined in the rotating coordinate system rotating at the fundamental frequency (also called the d-q axis coordinate system or fundamental dq coordinate system) and the q-axis harmonic command value Iq7* as the q-axis component thereof.

Likewise, based on the amplitude I13* and phase angle β13* (relative to the phase angle θ of the fundamental component) of the 13th harmonic current supplied from the 13th current command value generating circuit 22, the coordinate conversion circuit 25 computes the d-axis harmonic command value Id13* as the d-axis component of the 13th harmonic current command value defined in the rotating coordinate system rotating at the fundamental frequency (also called the d-q axis coordinate system or fundamental dq coordinate system) and the q-axis harmonic command value Iq13* as the q-axis component thereof. This computation is performed using the following equation (38).

$$\begin{bmatrix} id_{6k+1} \\ iq_{6k+1} \end{bmatrix} = \sqrt{\frac{3}{2}} \begin{bmatrix} I_{6k+1}\cos(6k\theta\gamma + \beta_{6k+1}) \\ I_{6k+1}\sin(6k\theta\gamma + \beta_{6k+1}) \end{bmatrix} \qquad (38)$$

In the equation (38), θv is a phase-compensated rotation angle signal which is obtained by phase-compensating the motor rotation angle θ output from the delay compensating circuit (phase compensating circuit) 16 to be described later.

In the above explanation, the circuits 21 and 22 are each described as containing a table that defines the relationships between the d-axis command value Id* and q-axis command value Iq* and the amplitude and phase angle of the harmonic command value to be output, but instead, the detected rotation angle, voltage, and current and the amplitude and phase angle of the harmonic command value to be output may be stored in a table, and the amplitude and phase angle of the harmonic command value to be output may be computed by entering the detected values of the rotation angle, voltage, and current into this table.

Next, the seventh d-axis harmonic command value Id7* and the 13th d-axis harmonic command value Id13* are summed together by the adder 27 and output as the d-axis harmonic command value Id6n+1*, while the seventh q-axis harmonic command value Iq7* and the 13th q-axis harmonic command value Iq13* are summed together by the adder 28 and output as the q-axis harmonic command value Iq6n+1*. Of course, higher harmonic command values such as a 19th harmonic command value may be further generated and summed together in like manner in the adders 27 and 28.

The thus obtained d-axis harmonic command value Id6n+1* is summed with the d-axis fundamental command value Id1* in the adder 3 and output as the d-axis command value Id* and, likewise, the q-axis harmonic command value Iq6n+1* is summed with the q-axis fundamental command value Iq1* in the adder 4 and output as the q-axis command value Iq*. In this way, the noise canceling current command values can be determined by simple computation. That is, each harmonic command value is easy to compute because only a single frequency component need be computed as shown in the equation (38).

The position signal processing circuit 15 computes the rotation angle θ in the stationary coordinate system based on the rotation angle signal supplied from the resolver 14, and supplies it to the delay compensating circuit 16 and the coordinate conversion circuit 17. The delay compensating circuit 16, which is a phase compensating circuit, supplies the phase-compensated rotation angle θv to the coordinate conversion circuits 24 and 25 and the coordinate conversion circuit 9 described below, to compensate for computational delays, etc. occurring in these circuits. The coordinate conversion circuit 17 performs the coordinate conversion on the U-phase current Iu and V-phase current Iv detected by the current sensors 12, and outputs a d-axis detection value Id and a q-axis detection value Iq as the current detection values defined in the rotating coordinate system.

The subtractor 5 obtains an deviation ΔId by subtracting the d-axis detection value Id from the d-axis command value Id* obtained by the above computation, while the subtractor 6 obtains a deviation ΔIq by subtracting the q-axis detection value Iq from the q-axis command value Iq*. The PI amplifier 7 applies a PI (proportional-integral) amplification operation to the deviation ΔId in order to asymptotically reduce the deviation ΔId to zero, and outputs the corresponding d-axis voltage Vd, while the PI amplifier 8 applies a PI (proportional-integral) amplification operation to the deviation ΔIq in order to asymptotically reduce the deviation ΔIq to zero, and outputs the corresponding q-axis voltage Vq.

Using the supplied phase-compensated rotation angle θv, the coordinate conversion circuit 9 converts the voltages Vd and Vq into three phase voltages Vu, Vv, and Vw defined in the rotating coordinate system; then, the PWM voltage generating circuit 10 converts the three phase voltages Vu, Vv, and Vw into PWM signal voltages Uu, Uv, and Uw, and the three-phase inverter 11 creates a three-phase AC voltage by controlling its six built-in switching devices based on the input PWM signal voltages Uu, Uv, and Uw, and applies it to each phase terminal of the three-phase synchronous generator-motor 13. The motor control apparatus described above is the same as a conventional motor control system, except for the inclusion of the harmonic command value generating circuit 2 and, as this type of PWM feedback control is well known in the art, a detailed description will not be given here.

In this way, the sixth and 12th harmonics of the magnetic noise, which are major causes of the motor noise, can be greatly reduced.

Advantages of this embodiment will be described below.

First, according to this embodiment, as the constituent elements (circuits) 5 to 11 and 17 are configured to perform feedback control on both the fundamental command value and the harmonic command value simultaneously, the circuit configuration can be simplified. As a result, the coordinate conversion circuit 17 can perform the coordinate conversion directly on the detected three-phase AC currents Iu and Iv without first separating them into the fundamental frequency component and the harmonic frequency component; this can avoid phase delays associated with the filtering for the frequency separation and can thus prevent the degradation of the noise canceling effect due to computational errors, and control delays, that would otherwise occur.

Furthermore, as the table for the amplitude and phase angle of the harmonic command value is set so as to define their correspondence to the d-axis fundamental command value Id1* and the q-axis fundamental command value Iq1* which do not vary much, the frequency of reading can be reduced.

CIRCUIT CONFIGURATION EXAMPLE 7

Figure 24:
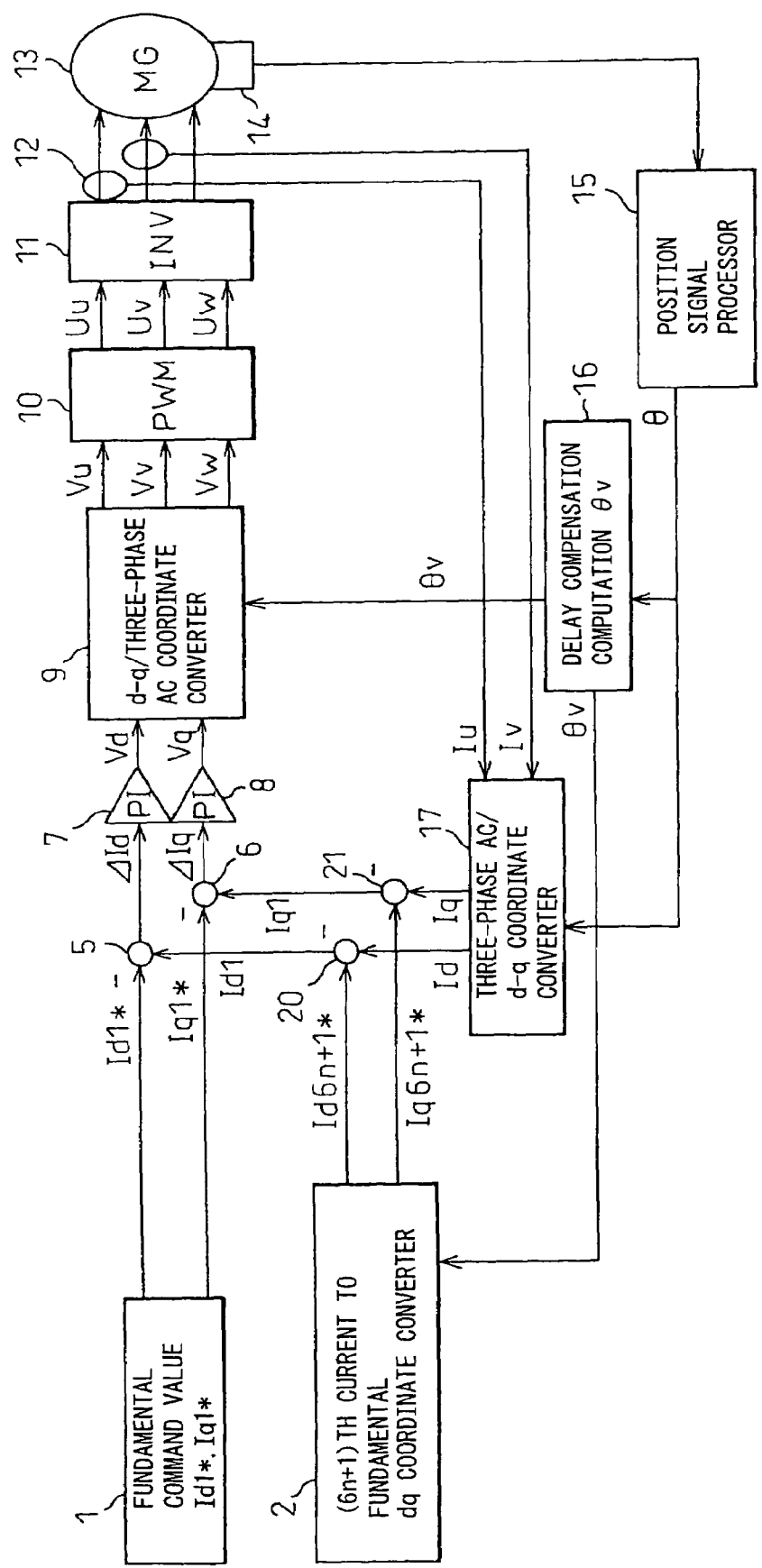
FIG. 24 is a block circuit diagram showing another embodiment.

Another embodiment will be described below with reference to FIG. 24. In this circuit configuration example, the d-axis harmonic command value Id6k1* and its q-axis current component, i.e., the q-axis harmonic command value Iq6k1*, generated by the harmonic command value generating circuit 2 in the sixth circuit configuration example of feedback type shown in FIG. 20, are respectively input to subtractors 20 and 21 where the respective command values are subtracted from the d-axis detection value Id and the q-axis detection value Iq generated by the coordinate conversion circuit 17 as the current detection values in the rotating coordinate system, and the results Id1 and Iq1 are output as the current detection values. The values Id1 and Iq1 generated by the above means are respectively input to the subtractors 5 and 6 for subtraction, to generate ΔId and ΔIq. The process thereafter is the same as that in the sixth circuit configuration example, and will not be further described here.

CIRCUIT CONFIGURATION EXAMPLE 8

Figure 25:
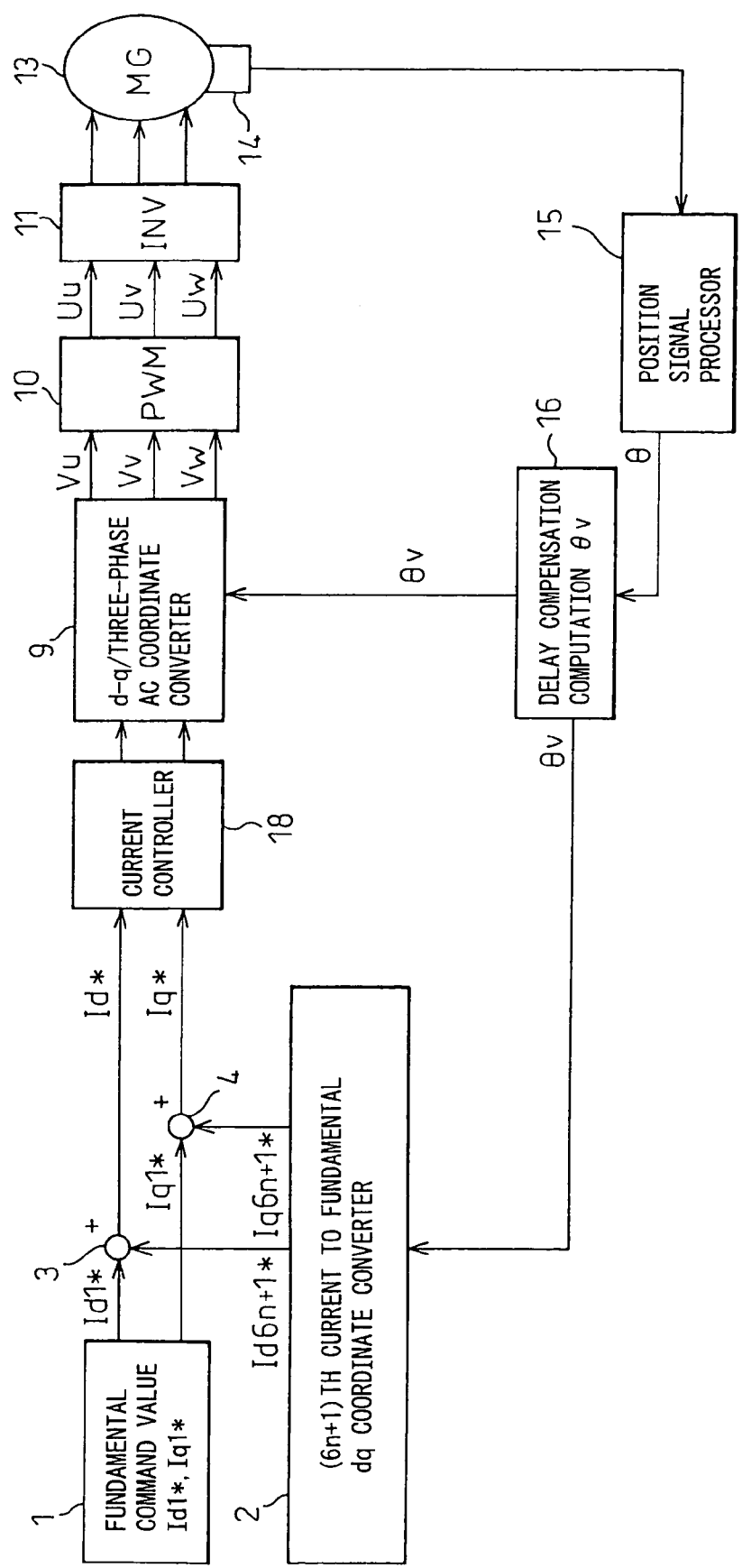
FIG. 25 is a block circuit diagram showing another embodiment.

Another embodiment will be described below with reference to FIG. 25. In this circuit configuration example, the current sensors 12 and the coordinate conversion circuit 17 are omitted from the sixth circuit configuration example of feedback type shown in FIG. 20, and the subtractors 5 and 6 and the PI amplifiers 7 and 8 are replaced by a current controller 18, thus changing the circuit configuration to an open-loop control type; in this example, the current controller 18 converts the d-axis command value Id* and the q-axis command value Iq* into the d-axis voltage command value and the q-axis voltage command value, each of prescribed magnitude, and the coordinate conversion circuit 9 converts these voltage command values in the rotating coordinate system into the voltage command values Vu, Vv, and Vw in the stationary coordinate system.

CIRCUIT CONFIGURATION EXAMPLE 9

Figure 26:
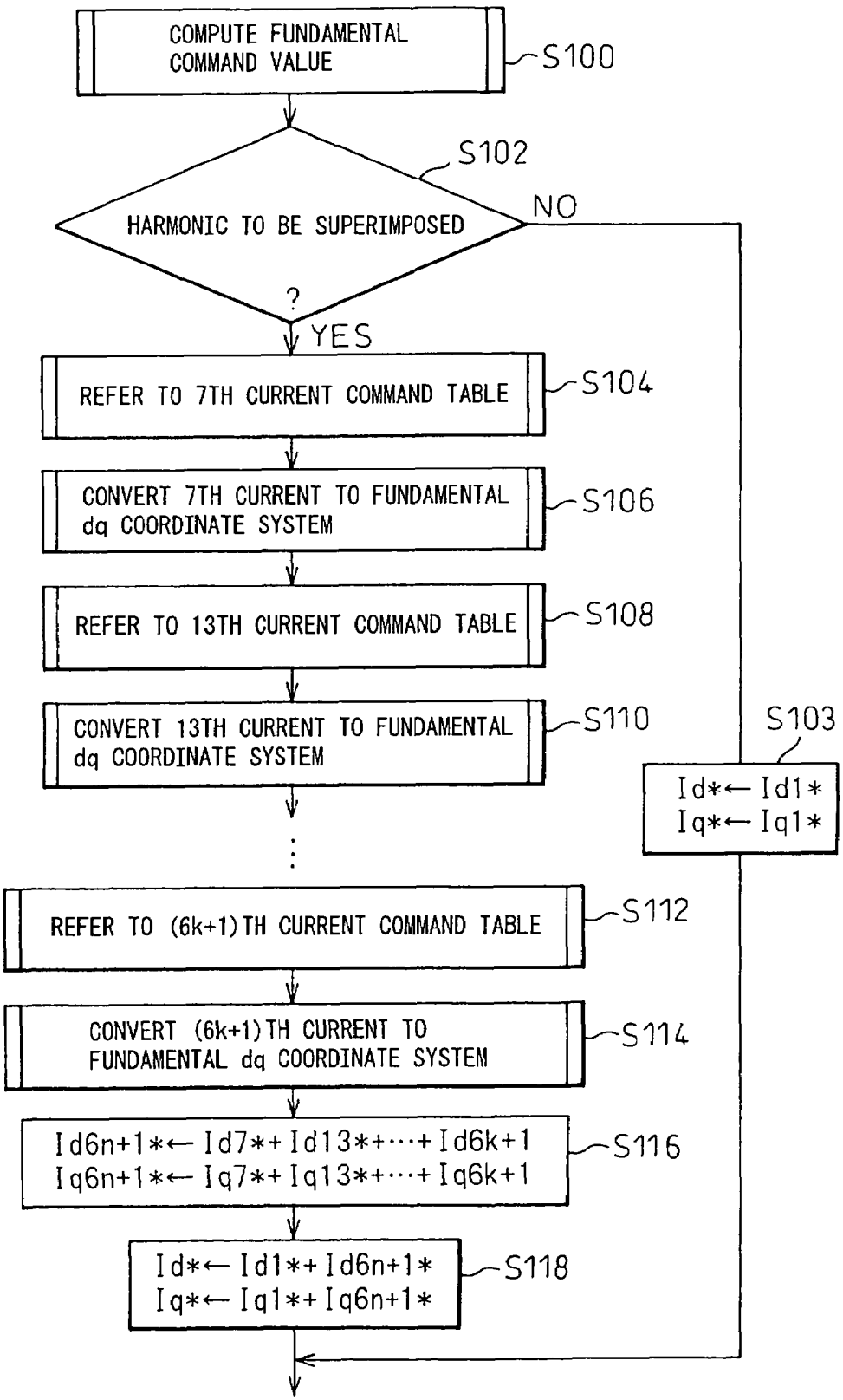
FIG. 26 is a flowchart showing another embodiment.

Another embodiment will be described below with reference to the flowchart shown in FIG. 26.

In this circuit configuration example, the fundamental command value generating circuit 1 and the harmonic command value generating circuit 2 shown in FIG. 21 are implemented in microcomputer software, and the harmonic command value (defined in the rotating coordinate system) is superimposed as needed on the fundamental command value (defined in the rotating coordinate system) in accordance with a prescribed condition.

First, in step S100, the fundamental command value is computed, and then, based on a prescribed decision result computed separately, a decision is made as to whether the harmonic superimposition for radial vibration reduction should be performed or not (S102). If it is decided not to perform the harmonic superimposition, then in step S103 the d-axis command value Id* is set to the d-axis command value Id1* and the q-axis command value Iq* to the q-axis command value Iq1*, and the harmonic superimposition process described hereinafter is skipped. If it is decided to perform the harmonic superimposition, the process proceeds to step S104.

Here, the decision as to whether to perform or not to perform the harmonic superimposition is made, for example, by checking whether the number of revolutions is lower than a prescribed value; if the answer is yes, the harmonic superimposition is implemented, but if no, the harmonic superimposition is skipped. By so doing, noise can be reduced by performing the harmonic superimposition in the low rpm range where radial vibration noise becomes noticeable, while in other rpm regions, reductions in power consumption, etc. can be achieved. Further, maximum motor torque can be increased by prohibiting the harmonic superimposition when a torque greater than a prescribed value is required, for example, during engine cranking.

In step S104, the obtained fundamental command value (d-axis command value Id1* and q-axis command value Iq1*) is entered into the table to obtain the amplitude and phase angle of the seventh harmonic command value and, based on the amplitude and phase angle of the seventh harmonic command value thus obtained and the compensated rotation angle θv separately input, the seventh harmonic command value in the rotating coordinate system rotating at the frequency of the fundamental command value is obtained.

In steps S108 and S110, the 13th harmonic command value is obtained in a like manner, and further, in steps S112 and S114, the (6k+1)th harmonic command value is obtained in a like manner; then, in step S116, these harmonic command values are summed together to obtain the combined d-axis harmonic command value Id6n+1* and the combined q-axis harmonic command value Iq6n+1*.

Next, in step S118, the d-axis fundamental command value Id1* is added to the combined d-axis harmonic command value Id6n+1*, and the q-axis fundamental command value Iq1* is added to the combined q-axis harmonic command value Iq6n+1*, to obtain the d-axis command value Id* and the q-axis command value Iq*. The computations in steps S116 and S118 may be performed together, or may be performed using dedicated hardware. Further, the computations in the steps S104 and S106 and the steps S108 and S110 may be performed in parallel using dedicated hardware or may be performed using analog circuits.

(Modified Mode)

In the above explanation using the mathematical equations, the sixth and 12th magnetic sound components caused by the rotor magnetomotive force Fmag containing the third, fifth, and seventh harmonics have been canceled or reduced by superimposing the seventh and 13th harmonic current components. As a result of performing calculations similar to those described above, it has been found that, by superimposing a harmonic current of a given order, at least the magnetic noise whose order is lower by one than that given order, or the magnetic noise of a different order in addition to the magnetic noise whose order is lower by one than that given order, can be canceled or reduced.

For example, by performing computations similar to those described above, the 18th magnetic sound component can be canceled or reduced by superimposing the 19th harmonic current component, and the 24th magnetic sound component can be canceled or reduced by superimposing the 25th harmonic current component. In the equations previously given, only the 6th or the 12th magnetic sound component can be selectively canceled or reduced easily by setting the corresponding terms in the equations (26), (27), and (28) to zero. As a result, the dominant magnetic noise components in the three-phase rotary electric machine, i.e., the 6th, 12th, 18th, and 24th magnetic noise components, can be effectively reduced.

Further, in the above explanation using the mathematical equations, to simplify the theoretical explanation, only the fundamental frequency component has been assumed for the stator (armature) current, and the description has been given by assuming the case where the harmonic currents for reduction of the m-th and n-th magnetic noise components are superimposed on that fundamental frequency component. However, generally (that is, when the control of the embodiment is not performed) the actual stator current contains harmonics as does the rotor magnetomotive force; therefore, if the stator current contains, for example, the j-th, k-th, and L-th harmonics, the stator currents in the equations (16), (17), and (18) can be expressed as equations (39), (40), and (41) below. When these equations are expanded by using the previously given equations, it becomes apparent that excitation forces due to the originally contained harmonic currents are generated like the excitation forces generated by the harmonic components of the rotor magnetomotive force. It is therefore apparent that the magnetic sound can be reduced or canceled by determining, with the above point in mind, the orders, amplitudes, and phases of the harmonic currents to be superimposed in the present invention. (Expansion of these equations will not be given here as one can easily understand the above by inserting the values into the above equations.)

U-Phase Current $$I_{cmd} = I_1 \sin(\theta+s) + I_j \sin j(\theta+\beta) + I_k \sin k(\theta+\gamma) + I_l \sin l(\theta+\delta) \tag{39}$$

V-Phase Current $$I_{cmd} = I_1 \sin(\theta+s-120) + I_j \sin j(\theta+\beta-120) + I_k \sin k(\theta+\gamma-120) + I_l \sin l(\theta+\delta-120) \tag{40}$$

W-Phase Current $$I_{cmd} = I_1 \sin(\theta+s-240) + I_j \sin j(\theta+\beta-240) + I_k \sin k(\theta+\gamma-240) + I_l \sin l(\theta+\delta-240) \tag{41}$$

When the order of a harmonic current contained in the original armature current is higher by one than that of the harmonic component of the radial vibration to be reduced, it is advantageous to subtract that harmonic current contained in the original armature current from the magnetic noise reducing harmonic current computed by the above equations and to superimpose the result on the fundamental frequency component of the original armature current.

In the case of a polyphase AC rotary electric machine different than the three-phase AC rotary electric machine, if one modifies the above equations according to the change in the number of phases, one can easily understand that the notion that when a harmonic current of a given order is superimposed, the magnetic noise (magnetic sound) whose order is lower by one than that given order can be reduced will also hold for any polyphase AC rotary electric machine.

It will also be recognized that the embodiment can also be applied to a multi-slot configuration called a distributed winding (for example, two or more slots per pole per phase).

In the above explanation, the stator current Icoil has been described as being defined in the stationary coordinate system (angle $\theta$), but it will be appreciated that the stator current Icoil can also be described using the rotating coordinate system (d, q axes).

Furthermore, instead of computing, using the above equations, the magnetic noise reducing harmonic current to be superimposed on the armature current, it is of course possible to prestore, in a table, the variable parameters used in the above equations in association with the amplitude and phase of the magnetic noise reducing harmonic current of a prescribed order and to determine the amplitude and phase of the magnetic noise reducing harmonic current by entering the variable parameters into the table. It will also be appreciated that the above process for magnetic noise reduction can be implemented not only in hardware but also in software.

While the preferred modes of the present invention have been described in detail above, it should be understood by those skilled in the art that various modifications and changes can be made by anyone skilled in the art, and that all of such modifications and changes that come within the range of the true spirit and purpose of the present invention fall within the scope of the present invention as defined by the appended claims.

What is claimed is:

1. A magnetic noise reduction method for an AC rotary electric machine, wherein a radial vibration reducing harmonic current, whose frequency is n times (n is a natural number) the frequency of the fundamental frequency component of a polyphase AC current fed to an armature of a polyphase AC rotary electric machine, is input into said armature by superimposing the radial reducing harmonic current on said polyphase AC current, thereby attenuating an (n−1)th harmonic component, having a frequency (n−1) times the frequency of said fundamental frequency component, that is contained in a radial vibration occurring radially about an axial center of a rotating shaft of said AC rotary electric machine due to an excitation force generated by said AC rotary electric machine or externally applied to said AC rotary electric machine.

2. A magnetic noise reduction method for an AC rotary electric machine as set forth in claim 1, wherein a radial vibration reducing harmonic current, whose frequency is 6k+1 times (k is a natural number) the frequency of the fundamental frequency component of a stator current of a three-phase AC rotary electric machine as said AC rotary electric machine, is superimposed on said stator current, thereby reducing the radial vibration of said AC rotary electric machine that has a frequency 6k times the frequency of said fundamental frequency component, as compared to the case where said superimposition is not performed.

3. A magnetic noise reduction method for an AC rotary electric machine as set forth in claim 2 wherein, by superimposing said radial vibration reducing harmonic current of order 7, a sixth harmonic component of said radial vibration is attenuated as compared to the case where said superimposition is not performed.

4. A magnetic noise reduction method for an AC rotary electric machine as set forth in claim 2 wherein, by superimposing said radial vibration reducing harmonic current of order 13, a 12th harmonic component of said radial vibration is attenuated as compared to the case where said superimposition is not performed.

5. A magnetic noise reduction method for an AC rotary electric machine as set forth in claim 2 wherein, by superimposing said radial vibration reducing harmonic currents of orders 7 and 13, sixth and 12th harmonic components of said radial vibration are simultaneously attenuated as compared to the case where said superimposition is not performed.

6. A magnetic noise reduction method for an AC rotary electric machine as set forth in claim 2, wherein the phases and amplitudes of the radial vibration reducing seventh and 13th harmonic currents are set so that the amplitude of a vector sum, taken between the sixth and 12th harmonic components of said radial vibration occurring due to the radial vibration reducing fundamental, seventh, and 13th harmonic currents and the sixth and 12th harmonic components of said radial vibration induced in said AC rotary electric machine, becomes smaller than a predetermined value.

7. A magnetic noise reduction method for an AC rotary electric machine as set forth in claim 2 wherein, by superimposing said radial vibration reducing harmonic current of order 19, an 18th harmonic component of said radial vibration is attenuated as compared to the case where said superimposition is not performed.

8. A magnetic noise reduction method for an AC rotary electric machine as set forth in claim 2 wherein, by superimposing said radial vibration reducing harmonic current of order 25, a 24th harmonic component of said radial vibration is attenuated as compared to the case where said superimposition is not performed.

9. A magnetic noise reduction method for an AC rotary electric machine as set forth in claim 1 wherein, when I1 denotes the amplitude of said fundamental frequency, In denotes the amplitude of said harmonic current, and t, x, and y respectively denote prescribed phase angles, the fundamental frequency component of said polyphase AC current contains at least a first phase fundamental frequency component Iu1 (=I1 sin ($\theta$)), a second phase fundamental frequency component Iv1 (=I1 sin ($\theta$−x)), and a third phase fundamental frequency component Iw1 (=I1 sin ($\theta$−y)), and said radial vibration reducing harmonic current whose frequency is n times contains at least a first phase harmonic component Iun (=In sin n($\theta$+t)), a second phase harmonic component Ivn (=In sin {n($\theta$+t)−x}), and a third phase harmonic component Iwn (=In sin {n($\theta$+t)−y}), and wherein said first phase harmonic component Iun is superimposed on said first phase fundamental frequency component Iu1, said second phase harmonic component Ivn is superimposed on said second phase fundamental frequency component Iv1, and said third phase harmonic component Iwn is superimposed on said third phase fundamental frequency component Iw1.

10. A motor control apparatus comprising:
a rotational position detector which detects the rotational position of an automotive M-phase synchronous AC rotary electric machine (M is a positive integer not smaller than 3); and
a motor current controller which applies, based on said detected rotational position, a prescribed phase current having a prescribed fundamental frequency and amplitude to each individual phase winding of an armature of said AC rotary electric machine, wherein
said motor current controller applies a radial vibration reducing harmonic current having a frequency n times (n is a natural number) the frequency of the fundamental frequency component of said phase current to the each individual phase winding by superimposing said radial vibration reducing harmonic current on said phase current, and thereby attenuates an (n−1)th harmonic component, having a frequency (n−1) times the frequency of said fundamental frequency component, that is contained in a radial vibration occurring radially about an axial center of a rotating shaft of said AC rotary electric machine due to an excitation force generated by said AC rotary electric machine or externally applied to said AC rotary electric machine.

11. A motor control apparatus as set forth in claim 10, wherein said motor current controller superimposes at least either one of the seventh and 13th harmonic components on said phase current, and thereby attenuates the sixth or 12th harmonic component of said radial vibration occurring in a three-phase AC rotary electric machine as said AC rotary electric machine, as compared to the case where said superimposition is not performed.

12. A motor control apparatus as set forth in claim 11, wherein by superimposing said radial vibration reducing harmonic current of order 19, said motor current controller attenuates an 18th harmonic component of said radial vibration as compared to the case where said superimposition is not performed.

13. A motor control apparatus as set forth in claim 11, wherein by superimposing said radial vibration reducing harmonic current of order 25, said motor current controller attenuates a 24th harmonic component of said radial vibration as compared to the case where said superimposition is not performed.

14. A motor control apparatus as set forth in claim 10, wherein
said AC rotary electric machine is coupled to an automotive engine so as to be decouplable therefrom, and
said motor current controller superimposes said radial vibration reducing harmonic current on said polyphase AC current when said automotive engine is in a stopped condition.

15. A motor control apparatus as set forth in claim 10, wherein
said AC rotary electric machine is coupled to an automotive engine and/or to an axle so as to be capable of regenerative braking, and
said motor current controller superimposes said radial vibration reducing harmonic current on said polyphase AC current at least either when said automotive engine is in a stopped condition or when regenerative braking is being imposed.

16. A motor control apparatus as set forth in claim 10, wherein said motor current controller
obtains said radial vibration reducing harmonic current of order n that reduces or minimizes the radial vibration having a frequency (n−1) times the frequency of said fundamental frequency component and occurring due to the application of said phase current containing at least said fundamental frequency component and a harmonic current whose frequency is n times the frequency of said fundamental frequency component, and
superimposes said radial vibration reducing harmonic current on said phase current.

17. A motor control apparatus as set forth in claim 10, wherein said motor current controller
detects as an introduced harmonic current a harmonic current contained in said phase current and having a frequency n times the frequency of said fundamental frequency component,
obtains said radial vibration reducing harmonic current of order n as a feedback control target value for reducing or minimizing the (n−1)th harmonic component of said radial vibration for the case where said phase current does not contain said introduced harmonic current but contains only said fundamental frequency component, and
performs feedback control to asymptotically reduce the difference between said introduced harmonic current and said target value to zero.

18. An AC rotary electric machine apparatus comprising:
an AC rotary electric machine having M-phase stator coils (M is a positive integer not smaller than 3);
an inverter having a transistor device for controlling on and off a stator current for each phase of said synchronous machine; and
an inverter control circuit which controls said transistor device on and off based on a detected or estimated rotation angle of said AC rotary electric machine, wherein
said inverter control circuit includes harmonic PWM signal generator for performing processing to output to said inverter a harmonic PWM signal having a frequency n times (n is an integer not smaller than 2) the frequency of the fundamental frequency component of said stator current, and thereby a harmonic current having a frequency n times greater than the frequency of said fundamental frequency component is superimposed on said stator current and input into each of said rotor coils, and thus altering the amplitude of the magnetic sound of said AC rotary electric machine that has a frequency (n−1) times the frequency of said fundamental frequency component, as compared to the case where said processing is not performed.

19. An AC rotary electric machine apparatus as set forth in claim 18, wherein
said harmonic PWM signal generator performs processing to output to said inverter a first harmonic PWM signal having a frequency n1 times the frequency of the fundamental frequency component of said stator current and a second harmonic PWM signal having a frequency n2 times the frequency of said fundamental frequency component, and thereby increases (or reduces) the magnetic sound of said AC rotary electric machine that has a frequency (n1−1) times the frequency of said fundamental frequency component, as compared to the case where said processing is not performed, while at the same time, reducing (or increasing) the magnetic sound of said AC rotary electric machine that has a frequency (n2−1) times the frequency of said fundamental frequency component, as compared to the case where said processing is not performed.

20. An AC rotary electric machine apparatus as set forth in claim 18, wherein said inverter control circuit includes fundamental PWM signal generator for outputting to said inverter a fundamental PWM signal for feeding said fundamental frequency component to each of said stator coils.

21. An AC rotary electric machine apparatus as set forth in claim 18, wherein said harmonic PWM signal generator increases the noise generated by said AC rotary electric machine when said harmonic PWM signal generator is in an operating condition, as compared to when said harmonic PWM signal generator is in an stopped condition.

22. An AC rotary electric machine apparatus as set forth in claim 18, wherein said harmonic PWM signal generator reduces the magnetic sound of said AC rotary electric machine when said harmonic PWM signal generator is in an operating condition, as compared to when said harmonic PWM signal generator is in an stopped condition.

23. An AC rotary electric machine apparatus as set forth in claim 21, wherein said harmonic PWIVI signal generator increases or reduces said magnetic sound as compared to when said harmonic PWM signal generator is in an stopped condition, by altering the phase and/or amplitude of the harmonic current to be added to said stator current in accordance with the number of revolutions.

24. An AC rotary electric machine apparatus as set forth in claim 18, wherein said harmonic PWM signal generator performs processing to output to said inverter a harmonic PWM signal having a frequency 6k+1 times (k is a natural number) the frequency of the fundamental frequency component of said stator current, and thereby alters the magnetic sound of a three-phase AC rotary electric machine as said AC rotary electric machine that has a frequency 6k times the frequency of said fundamental frequency component, as compared to the case where said processing is not performed.

25. An AC rotary electric machine apparatus as set forth in claim 24, wherein said harmonic PWM signal generator outputs a harmonic PWM signal for superimposing a seventh harmonic current on the fundamental frequency component of said stator current, and thereby alters a sixth harmonic component of said magnetic sound as compared to the case where said superimposition is not implemented.

26. An AC rotary electric machine apparatus as set forth in claim 23, wherein said harmonic PWM signal generator outputs a harmonic PWM signal for superimposing a 13th harmonic current on the fundamental frequency component of said stator current, and thereby alters a 12th harmonic component of said magnetic sound as compared to the case where said superimposition is not implemented.

27. An AC rotary electric machine apparatus as set forth in claim 23, wherein said harmonic PWM signal generator outputs a harmonic PWM signal for superimposing seventh and 13th harmonic currents on the fundamental frequency component of said stator current, and thereby alters sixth and 12th harmonic components of said magnetic sound as compared to the case where said superimposition is not implemented.

28. An AC rotary electric machine apparatus as set forth in claim 23, wherein said harmonic PWM signal generator outputs a harmonic PWM signal for superimposing 19th and/or 25th harmonic currents on the fundamental frequency component of said stator current, and thereby alters 18th and/or 24th harmonic components of said magnetic sound as compared to the case where said superimposition is not implemented.

29. An AC rotary electric machine apparatus as set forth in claim 19, wherein
said n1 is 6k1+1 (k1 is a natural number),
said n2 is 6k2+1 (k2 is a natural number), and
said harmonic PWM signal generator, as compared to the case where said processing is not performed, reduces the magnetic sound of a three-phase AC rotary electric machine as said AC rotary electric machine that has a frequency 6k1 times the frequency of said fundamental frequency component and, at the same time, increases the magnetic sound of the three-phase AC rotary electric machine as said AC rotary electric machine that has a frequency 6k2 times the frequency of said fundamental frequency component.

30. An AC rotary electric machine apparatus as set forth in claim 29, wherein k1 is 1.

31. An AC rotary electric machine apparatus as set forth in claim 29, wherein k1 is 2.

32. An AC rotary electric machine apparatus as set forth in claim 29, wherein k1 is 3.

33. An AC rotary electric machine apparatus as set forth in claim 29, wherein k1 is 4.

34. An AC rotary electric machine apparatus as set forth in claim 24, wherein said harmonic PWM signal generator performs processing to output to said inverter a harmonic PWM signal having frequencies 7 and 13 times the frequency of the fundamental frequency component of said stator current and a harmonic PWM signal having at least either one of frequencies 19 and 25 times the frequency of said fundamental frequency component, and thereby attenuates the magnetic sound of said three-phase AC rotary electric machine as said AC rotary electric machine that has frequencies 6 and 12 times the frequency of said fundamental frequency component and the magnetic sound of said three-phase AC rotary electric machine as said AC rotary electric machine that has at least either one of frequencies 18 and 24 times the frequency of said fundamental frequency component, as compared to the case where said processing is not performed.

35. An AC rotary electric machine apparatus as set forth in claim 18, wherein when I1 denotes the amplitude of the fundamental frequency of said stator current, In denotes the amplitude of the harmonic current of said stator current, and t, x, and y respectively denote prescribed phase angles,
the fundamental frequency component of said stator current contains at least a first phase fundamental frequency component $Iu1$ ($=I1 \sin(\theta)$), a second phase fundamental frequency component $Iv1$ ($=I1 \sin(\theta-x)$), and a third phase fundamental frequency component $Iw1$ ($=I1 \sin(\theta-y)$), and
said harmonic current whose frequency is n times contains at least a first phase harmonic component $Iun$ ($=In \sin n(\theta+t)$), a second phase harmonic component $Ivn$ ($=In \sin\{n(\theta+t)-x\}$), and a third phase harmonic component $Iwn$ ($=In \sin\{n(\theta+t)-y\}$), and wherein
said first phase harmonic component $Iun$ is superimposed on said first phase fundamental frequency component $Iu1$, said second phase harmonic component $Ivn$ is superimposed on said second phase fundamental frequency component $Iv1$, and said third phase harmonic component $Iwn$ is superimposed on said third phase fundamental frequency component $Iw1$.

36. An AC rotary electric machine apparatus as set forth in claim 18, wherein said AC rotary electric machine is coupled to an automotive engine so as to be decouplable therefrom, and said inverter control circuit causes said magnetic sound to vary by performing processing to output said harmonic PWM signal to said inverter when said automotive engine is in a stopped condition.

37. An AC rotary electric machine apparatus as set forth in claim 18, wherein said AC rotary electric machine is coupled to an automotive engine and/or to an axle so as to be capable of regenerative braking, and said inverter control circuit causes said magnetic sound to vary by performing processing to output said harmonic PWM signal to said inverter at least either when said automotive engine is in a stopped condition or when regenerative braking is being imposed.

38. A motor control apparatus comprising:

a rotation angle detecting element which detects the rotational position of an automotive m-phase synchronous AC rotary electric machine (m is a positive integer not smaller than 3); and a motor current control element which applies, based on said detected rotational position, a phase current having a prescribed fundamental frequency and amplitude to each individual phase winding of an armature of said AC rotary electric machine, wherein said motor control apparatus further includes a phase current detecting element which detects the phase current flowing in each phase winding, and said motor current control element comprises:

a phase current detection value coordinate system converting element which converts the detection value (in a stationary coordinate system) of each phase current into a d-q axis coordinate system (rotating coordinate system) rotating synchronously with the fundamental frequency component of said phase current specified by an output signal of said rotation angle sensor, and outputs a d-axis detection value Id and a q-axis detection value Iq;

a fundamental command value output element which outputs a d-axis fundamental command value Id1* and a q-axis fundamental command value Iq1* as d- and q-axis components in said d-q axis coordinate system defining a fundamental command value as a target value of the fundamental frequency component of said phase current;

a harmonic command value output element which outputs a d-axis harmonic command value Id6k+1* and a q-axis harmonic command value Iq6k+1* as d- and q-axis components in said d-q axis coordinate system defining a harmonic command value as a target value of a (6k+1)th harmonic current component (k is an integer and is 0 for said fundamental frequency component);

a current deviation computing element which computes a d-axis current deviation ΔId and a q-axis current deviation ΔIq by calculating (Id1*)+(Id6k+1*)−(Id) and (Iq*)+(Iq6k+1*)−(Iq), respectively; and a phase voltage control element which asymptotically reduces said d-axis current deviation ΔId and said q-axis current deviation ΔIq toward zero by controlling the phase current to be applied to each phase winding, based on said d-axis current deviation ΔId and said q-axis current deviation ΔIq, and wherein said harmonic command value output element superimposes said d-axis harmonic command value Id6k+1* and said q-axis harmonic command value Iq6k+1* on said d-axis fundamental command value Id* and said q-axis fundamental command value Iq*, respectively, and thereby attenuates a 6k-th harmonic component, having a frequency 6k times the frequency of said fundamental frequency component, that is contained in a radial vibration occurring radially about an axial center of a rotating shaft of said AC rotary electric machine due to an excitation force generated by said AC rotary electric machine or externally applied to said AC rotary electric machine.

39. A motor control apparatus comprising:

a rotation angle detecting element which detects the rotational position of an automotive m-phase synchronous AC rotary electric machine (m is a positive integer not smaller than 3); and a motor current control element which applies, based on said detected rotational position, a phase current having a prescribed fundamental frequency and amplitude to each individual phase winding of an armature of said AC rotary electric machine, wherein said motor current control element comprises:

a fundamental command value output element which outputs a d-axis fundamental command value Id1* and a q-axis fundamental command value Iq1* as d- and q-axis components in a d-q axis coordinate system defining a fundamental command value as a target value of the fundamental frequency component of said phase current;

a harmonic command value output element which outputs a d-axis harmonic command value Id6k+1 * and a q-axis harmonic command value Iq6k+1* as d- and q-axis components in said d-q axis coordinate system defining a harmonic command value as a target value of a (6k+1)th harmonic current component (k is an integer and is 0 for said fundamental frequency component);

a current command value computing element which computes a d-axis current command value Id* and a q-axis current command value Iq* by calculating (Id1*)+(Id6k+1*) and (Iq1*)+(Iq6k+1*), respectively; and a phase voltage control element which supplies to each phase winding the phase current corresponding to said d-axis current command value Id* and said q-axis current command value Iq* by controlling the phase current to be applied to said phase winding, based on said d-axis current command value Id* and said q-axis current command value Iq*, and wherein said harmonic command value output element superimposes said d-axis harmonic command value Id6k+1 * and said q-axis harmonic command value Iq6k+1* on said d-axis fundamental command value Id* and said q-axis fundamental command value Iq*, respectively, and thereby attenuates a 6k-th harmonic component, having a frequency 6k times the frequency of said fundamental frequency component, that is contained in a radial vibration occurring radially about an axial center of a rotating shaft of said AC rotary electric machine due to an excitation force generated by said AC rotary electric machine or externally applied to said AC rotary electric machine.

40. A motor control apparatus as set forth in claim 38, wherein said k is 1 and/or 2.

* * * * *